US008238042B2

(12) United States Patent
DeWitt et al.

(10) Patent No.: US 8,238,042 B2
(45) Date of Patent: Aug. 7, 2012

(54) REFLECTIVE AXICON SYSTEMS AND METHODS

(75) Inventors: Frank DeWitt, Lima, NY (US); Georg Nadorff, Victor, NY (US)

(73) Assignee: CVI Melles Griot, Inc., Rochester, NY (US)

( * ) Notice: Subject to any disclaimer, the term of this patent is extended or adjusted under 35 U.S.C. 154(b) by 655 days.

(21) Appl. No.: 12/455,807

(22) Filed: Jun. 5, 2009

(65) Prior Publication Data

US 2010/0309566 A1    Dec. 9, 2010

(51) Int. Cl.
*G02B 17/00* (2006.01)
(52) U.S. Cl. .................. 359/726; 359/709; 359/727
(58) Field of Classification Search .............. 359/709, 359/726, 727
See application file for complete search history.

(56) References Cited

U.S. PATENT DOCUMENTS

| 4,579,427 A * | 4/1986 | Clegg ........................... 359/660 |
| 4,753,520 A * | 6/1988 | Silverglate .................... 359/365 |
| 7,461,960 B2 * | 12/2008 | Opolka et al. ................. 362/545 |

* cited by examiner

*Primary Examiner* — Scott J Sugarman
(74) *Attorney, Agent, or Firm* — Steven R. Scott

(57) ABSTRACT

A reflaxicon system comprising two or more reflaxicons, either, neither, or both of which can be formed of solid light transmitting material, is provided and described for use and implementation as objectives, relays, and beam expanders. Each reflaxicon features a central substantially cone shaped surface and a distal surface shaped like a truncated cone with both of said surfaces aligned with and symmetrically arranged around a central axis. In the system provided said central axes are aligned and form the optical axis of the system and further curvatures can be provided to any of said surfaces as well as to incident and exiting system surfaces to provide additional optical effects as required for different applications. Further, the conical surfaces forming the central reflectors can each or both be convex or concave, with ease of construction mitigating in favor of dual concave central reflectors as the preferred embodiment.

44 Claims, 52 Drawing Sheets

FIG. 24A

Hollow

EFL = 4.0 mm  poly chromatic F,d,C  diameter = 70 mm
mag = 50 x  RMS wavefront = 0.0204 waves  thickness = 32 mm
EPD = 4.0 mm  RMS spot diam = 0.63 μm  working dist = 17.3 mm
NA = 0.45  Strehl ratio = 0.9783
FOV = +/- 0.4°

| Surf | Type | Curvature (c) | Thickness | Glass | Diameter | Conic (k) | \multicolumn{8}{c}{Odd Asphere coefficients} |
|------|------|---------------|-----------|-------|----------|-----------|----|----|----|----|----|----|----|----|
| | | | | | | | a1 | a2 | a3 | a4 | a5 | a6 | a7 | a8 |
| OBJ | Sphere | 0 | Infinity | AR | 0 | 0 | 0 | 0 | 0 | 0 | 0 | 0 | 0 | 0 |
| 1 | Sphere | 0 | 10.0000 | AR | 4.140 | 0 | 0 | 0 | 0 | 0 | 0 | 0 | 0 | 0 |
| Stop | Sphere | 0 | 6.0000 | AIR | 4.000 | 0 | 0 | 0 | 0 | 0 | 0 | 0 | 0 | 0 |
| 3 | Odd Asphere | 0 | -15.5083 | Mirror | 4.112 | 0 | 6.903E-01 | 1.172E-01 | 6.810E-02 | -9.023E-02 | 6.773E-02 | -2.712E-02 | 5.126E-03 | -3.102E-04 |
| 4 | Odd Asphere | 0 | 52.4651 | Mirror | 70.317 | 0 | 1.610E-01 | 9.552E-03 | 1.846E-04 | 1.331E-05 | -4.753E-08 | 1.452E-10 | -4.970E-11 | 1.959E-12 |
| 5 | Odd Asphere | 0 | -15.7890 | Mirror | 69.593 | 0 | -6.850E-01 | 3.820E-04 | -2.620E-05 | -3.353E-06 | -1.078E-07 | 1.018E-08 | -9.643E-11 | -9.236E-13 |
| 6 | Odd Asphere | 0 | 2.0000 | Mirror | 34.144 | 0 | -7.976E-01 | 9.411E-03 | -1.105E-04 | 7.147E-06 | -4.94E-08 | -2.092E-08 | 1.636E-09 | -3.671E-11 |
| 7 | Sphere | 0.051342926 | 2.2251 | AR | 18.080 | 0 | 0 | 0 | 0 | 0 | 0 | 0 | 0 | 0 |
| 8 | Sphere | 0 | 17.2518 | AR | 18.090 | 0 | 0 | 0 | 0 | 0 | 0 | 0 | 0 | 0 |
| IMA | Sphere | 0 | | AR | 0.055 | 0 | 0 | 0 | 0 | 0 | 0 | 0 | 0 | 0 |

Solid

EFL = 4.0 mm  poly chromatic F,d,C  diameter = 67 mm
mag = 50 x  RMS wavefront = 0.0196 waves  thickness = 32 mm
EPD = 4.0 mm  RMS spot diam = 0.46 μm  working dist = 19.6 mm
NA = 0.45  Strehl ratio = 0.9798
FOV = +/- 0.4°

| Surf | Type | Curvature (c) | Thickness | Glass | Diameter | Conic (k) | \multicolumn{8}{c}{Odd Asphere coefficients} |
|------|------|---------------|-----------|-------|----------|-----------|----|----|----|----|----|----|----|----|
| | | | | | | | a1 | a2 | a3 | a4 | a5 | a6 | a7 | a8 |
| OBJ | Sphere | 0 | Infinity | AR | 0 | 0 | 0 | 0 | 0 | 0 | 0 | 0 | 0 | 0 |
| 1 | Sphere | 0 | 10.0000 | AR | 4.140 | 0 | 0 | 0 | 0 | 0 | 0 | 0 | 0 | 0 |
| Stop | Sphere | 0 | 6.0000 | Acrylic | 40.000 | 0 | 0 | 0 | 0 | 0 | 0 | 0 | 0 | 0 |
| 3 | Odd Asphere | 0 | -15.0999 | Mirror | 4.076 | 0 | 7.323E-01 | 1.126E-01 | 8.290E-02 | -1.027E-01 | 7.446E-02 | -3.160E-02 | 6.704E-03 | -5.232E-04 |
| 4 | Odd Asphere | 0 | 52.5835 | Mirror | 66.997 | 0 | 2.442E-01 | 7.506E-03 | 1.874E-04 | 1.577E-06 | -4.494E-08 | -5.615E-11 | -5.541E-11 | 2.216E-12 |
| 5 | Odd Asphere | 0 | -17.2059 | Mirror | 64.804 | 0 | -5.765E-01 | 2.298E-04 | -4.426E-05 | -3.913E-06 | -1.204E-07 | 1.035E-08 | -8.263E-11 | -3.205E-13 |
| 6 | Odd Asphere | 0 | 2.0000 | Mirror | 36.784 | 0 | -7.977E-01 | 9.211E-03 | -1.602E-03 | 8.414E-06 | 1.714E-07 | -5.195E-07 | 2.234E-08 | -3.260E-11 |
| 7 | Sphere | 0.045299149 | 2.5121 | AR | 20.456 | 0 | 0 | 0 | 0 | 0 | 0 | 0 | 0 | 0 |
| 8 | Sphere | 0 | 19.5634 | AR | 20.456 | 0 | 0 | 0 | 0 | 0 | 0 | 0 | 0 | 0 |
| IMA | Sphere | 0 | | AR | 0.075 | 0 | 0 | 0 | 0 | 0 | 0 | 0 | 0 | 0 |

FIG. 25A

Hollow

EFL = 2.5 mm
mag = 80 x
EPD = 2.5 mm
NA = 0.45
FOV = +/- 0.4° poly chromatic F,d,C
RMS wavefront = 0.0146 waves
RMS spot diam = 0.33 μm
Strehl ratio = 0.9887 diameter = 46 mm
thickness = 21 mm
working dist = 11.2 mm

| Surf | Type | Curvature (c) | Thickness | Glass | Diameter | Conic (k) | c1 | a2 | a3 | a4 | a5 | a6 | a7 | a8 |
|---|---|---|---|---|---|---|---|---|---|---|---|---|---|---|
| OBJ | Sphere | 0 | Infinity | AIR | 0 | 0 | 0 | 0 | 0 | 0 | 0 | 0 | 0 | 0 |
| 1 | Sphere | 0 | 10.0000 | AIR | 2.640 | 0 | 0 | 0 | 0 | 0 | 0 | 0 | 0 | 0 |
| Stop | Sphere | 0 | 3.7500 | AIR | 2.500 | 0 | 0 | 0 | 0 | 0 | 0 | 0 | 0 | 0 |
| 3 | Odd Asphere | 0 | -9.0131 | Mirror | 2.571 | 0 | 7.241E-01 | 2.019E-01 | 1.634E-01 | -3.324E-01 | 4.111E-01 | -2.809E-01 | 9.318E-02 | -1.078E-02 |
| 4 | Odd Asphere | 0 | 34.9123 | Mirror | 45.656 | 0 | 1.179E-01 | 2.156E-02 | 2.311E-04 | -1.376E-05 | -8.178E-09 | 7.334E-09 | -7.113E-10 | 3.225E-11 |
| 5 | Odd Asphere | 0 | -11.0606 | Mirror | 45.225 | 0 | -6.833E-01 | 2.796E-03 | -2.140E-04 | -1.776E-05 | -6.950E-07 | 1.143E-07 | -1.646E-09 | -2.490E-11 |
| 6 | Odd Asphere | 0 | 0.6250 | AIR | 21.175 | 0 | -7.867E-01 | 1.257E-02 | -3.269E-02 | 1.348E-05 | 4.033E-07 | -3.168E-07 | 2.838E-08 | -9.830E-10 |
| 7 | Sphere | 0.079085018 | 1.4466 | AIR | 11.753 | 0 | 0 | 0 | 0 | 0 | 0 | 0 | 0 | 0 |
| 8 | Sphere | 0 | 11.1961 | AIR | 11.753 | 0 | 0 | 0 | 0 | 0 | 0 | 0 | 0 | 0 |
| IMA | Sphere | 0 | | | 0.041 | 0 | 0 | 0 | 0 | 0 | 0 | 0 | 0 | 0 |

Solid

EFL = 2.5 mm
mag = 80 x
EPD = 2.5 mm
NA = 0.45
FOV = +/- 0.4° poly chromatic F,d,C
RMS wavefront = 0.0117 waves
RMS spot diam = 0.57 μm
Strehl ratio = 0.9927 diameter = 46 mm
thickness = 21 mm
working dist = 11.6 mm

| Surf | Type | Curvature (c) | Thickness | Glass | Diameter | Conic (k) | c1 | a2 | a3 | a4 | a5 | a6 | a7 | a8 |
|---|---|---|---|---|---|---|---|---|---|---|---|---|---|---|
| OBJ | Sphere | 0 | Infinity | AIR | 0 | 0 | 0 | 0 | 0 | 0 | 0 | 0 | 0 | 0 |
| 1 | Sphere | 0 | 10.0000 | AIR | 2.640 | 0 | 0 | 0 | 0 | 0 | 0 | 0 | 0 | 0 |
| Stop | Sphere | 0 | 3.7500 | Acrylic | 25.000 | 0 | 0 | 0 | 0 | 0 | 0 | 0 | 0 | 0 |
| 3 | Odd Asphere | 0 | -9.0229 | Mirror | 2.348 | 0 | 7.665E-01 | 2.142E-01 | 1.528E-01 | -3.217E-01 | 4.195E-01 | -3.133E-01 | 1.165E-01 | -1.606E-02 |
| 4 | Odd Asphere | 0 | 35.9113 | Mirror | 45.749 | 0 | 1.363E-01 | 2.135E-02 | 2.363E-04 | -9.322E-07 | -2.714E-09 | 7.193E-09 | -7.234E-10 | 3.248E-11 |
| 5 | Odd Asphere | 0 | -11.2267 | Mirror | 44.956 | 0 | -6.761E-01 | 2.864E-03 | -2.175E-04 | -1.787E-05 | -7.023E-07 | 1.147E-07 | -1.616E-09 | -2.481E-11 |
| 6 | Odd Asphere | 0 | 0.6250 | AIR | 21.350 | 0 | -7.909E-01 | 1.247E-02 | 1.184E-02 | 9.364E-07 | 1.960E-06 | -4.563E-07 | 3.230E-08 | -8.634E-10 |
| 7 | Sphere | 0.076592609 | 1.4670 | AIR | 12.026 | 0 | 0 | 0 | 0 | 0 | 0 | 0 | 0 | 0 |
| 8 | Sphere | 0 | 11.5891 | AIR | 12.026 | 0 | 0 | 0 | 0 | 0 | 0 | 0 | 0 | 0 |
| IMA | Sphere | 0 | | | 0.040 | 0 | 0 | 0 | 0 | 0 | 0 | 0 | 0 | 0 |

FIG. 26A

EFL = 2.2 mm          poly-chromatic F.d.C                  diameter = 47 mm
mag = 92.2 x          RMS wavefront = 0.0142 waves          thickness = 25 mm
EPD = 2.5 mm          RMS spot diam = 0.32 μm               working dist = 8.6 mm
NA = 0.50             Strehl ratio = 0.9694
FOV = +/- 0.4°

Hollow

| Surf | Type | Curvature (c) | Thickness | Glass | Diameter | Conic (k) | Odd Asphere coefficients |||||||||
|---|---|---|---|---|---|---|---|---|---|---|---|---|---|---|
| | | | | | | | $c_1$ | $c_2$ | $c_3$ | $c_4$ | $c_5$ | $c_6$ | $c_7$ | $c_8$ |
| OBJ | Sphere | 0 | Infinity | AIR | 0 | 0 | | | | | | | | |
| 1 | Sphere | 0 | 10.0000 | AIR | 2.640 | 0 | | | | | | | | |
| Stop | Sphere | 0 | 3.7500 | AIR | 2.500 | 0 | | | | | | | | |
| 3 | Odd Asphere | 0 | -9.1639 | Mirror | 2.572 | 0 | 7.68E-01 | 2.175E-01 | 0 | 0 | 0 | 0 | 0 | 0 |
| 4 | Odd Asphere | 0 | 37.7327 | Mirror | 47.473 | 0 | 1.44E-01 | 2.050E-02 | 2.174E-04 | -7.998E-07 | 3.032E-08 | 7.680E-09 | -7.381E-10 | 2.902E-11 |
| 5 | Odd Asphere | 0 | -11.2323 | Mirror | 47.011 | 0 | -6.79E-01 | 1.399E-03 | -2.236E-04 | -1.799E-05 | -6.725E-07 | 1.142E-07 | -1.620E-09 | -2.366E-11 |
| 6 | Odd Asphere | 0 | 2.0000 | AIR | 24.509 | 0 | -8.314E-01 | 1.541E-02 | 5.920E-06 | -6.854E-06 | 2.040E-06 | -4.023E-06 | 2.891E-07 | -7.737E-10 |
| 7 | Sphere | 0.097059392 | 1.4946 | AIR | 10.689 | 0 | | | | | | | | |
| 8 | Sphere | 0 | 8.8084 | AIR | 10.689 | 0 | | | | | | | | |
| IMA | Sphere | 0 | | AIR | 0.036 | 0 | | | | | | | | |

EFL = 2.2 mm          poly-chromatic F.d.C                  diameter = 47 mm
mag = 92.2 x          RMS wavefront = 0.0104 waves          thickness = 25 mm
EPD = 2.5 mm          RMS spot diam = 0.26 μm               working dist = 8.9 mm
NA = 0.50             Strehl ratio = 0.9543
FOV = +/- 0.4°

Solid

| Surf | Type | Curvature (c) | Thickness | Glass | Diameter | Conic (k) | Odd Asphere coefficients |||||||||
|---|---|---|---|---|---|---|---|---|---|---|---|---|---|---|
| | | | | | | | $c_1$ | $c_2$ | $c_3$ | $c_4$ | $c_5$ | $c_6$ | $c_7$ | $c_8$ |
| OBJ | Sphere | 0 | Infinity | AIR | 0 | 0 | | | | | | | | |
| 1 | Sphere | 0 | 10.0000 | AIR | 2.640 | 0 | | | | | | | | |
| Stop | Sphere | 0 | 3.7500 | Acrylic | 25.000 | 0 | | | | | | | | |
| 3 | Odd Asphere | 0 | -9.2457 | Mirror | 2.548 | 0 | 7.655E-01 | 2.236E-01 | 1.426E-01 | -2.995E-01 | 4.055E-01 | -3.247E-01 | 1.301E-01 | -1.920E-02 |
| 4 | Odd Asphere | 0 | 37.5127 | Mirror | 47.239 | 0 | 1.39E-01 | 2.049E-02 | 2.124E-04 | -3.873E-07 | 3.147E-08 | 7.836E-09 | -7.268E-10 | 2.882E-11 |
| 5 | Odd Asphere | 0 | -11.3119 | Mirror | 46.578 | 0 | -6.79E-01 | 1.364E-03 | -2.231E-04 | -1.799E-05 | -6.647E-07 | 1.145E-07 | -1.615E-09 | -2.391E-11 |
| 6 | Odd Asphere | 0 | 2.0000 | Mirror | 24.173 | 0 | -8.324E-01 | 1.561E-02 | 7.543E-06 | -5.785E-06 | 2.006E-06 | -4.145E-06 | 2.960E-07 | -7.711E-10 |
| 7 | Sphere | 0.096272521 | 1.4780 | AIR | 10.681 | 0 | | | | | | | | |
| 8 | Sphere | 0 | 8.9092 | AIR | 10.681 | 0 | | | | | | | | |
| IMA | Sphere | 0 | | AIR | 0.035 | 0 | | | | | | | | |

FIG. 27A

EFL = 1.9 mm  
mag = 105.3 x  
EPD = 2.5 mm  
NA = 0.55  
FOV = +/- 0.4° poly chromatic F d C  
RMS wavefront = 0.0187 waves  
RMS spot diam = 0.62 μm  
Strehl ratio = 0.9616 diameter = 53 mm  
thickness = 31 mm  
working dist = 8.2 mm

Hollow

| Surf | Type | Curvature (c) | Thickness | Glass | Diameter | Conic (k) | c1 | a2 | a3 | a4 | a5 | a6 | a7 | a8 |
|---|---|---|---|---|---|---|---|---|---|---|---|---|---|---|
| OBJ | Sphere | 0 | Infinity | AIR | 0 | 0 | | | | | | | | |
| 1 | Sphere | 0 | 10.0000 | AIR | 2.640 | 0 | | | | | | | | |
| Stop | Sphere | 0 | 3.7500 | AIR | 2.500 | 0 | | | | | | | | |
| 3 | Odd Asphere | 0 | -9.6370 | Mirror | 2.574 | 0 | -- | 2.921E-01 | 0 | -1.202E-01 | 2.945E-01 | -3.638E-01 | 2.263E-01 | -4.683E-02 |
| 4 | Odd Asphere | 0 | 45.8883 | Mirror | 52.748 | 0 | 1.673E-01 | 1.786E-02 | 2.186E-04 | -6.980E-06 | 7.597E-08 | 7.363E-09 | -7.859E-10 | 2.528E-11 |
| 5 | Odd Asphere | 0 | -12.6257 | Mirror | 50.567 | 0 | -6.823E-01 | 1.390E-03 | -2.379E-04 | -1.825E-05 | -6.899E-07 | 1.141E-07 | -1.585E-09 | 2.102E-11 |
| 6 | Odd Asphere | 0 | 2.0000 | Mirror | 28.540 | 0 | -8.691E-01 | 2.048E-02 | 0 | -1.654E-05 | -2.665E-06 | -3.778E-07 | 2.453E-08 | -5.940E-10 |
| 7 | Sphere | 0.099879046 | 1.7694 | AIR | 11.367 | 0 | | | | | | | | |
| 8 | Sphere | 0 | 6.2427 | AIR | 11.367 | 0 | | | | | | | | |
| IMA | Sphere | 0 | | AIR | 0.035 | 0 | | | | | | | | |

EFL = 1.8 mm  
mag = 113.0 x  
EPD = 2.5 mm  
NA = 0.56  
FOV = +/- 0.4° poly chromatic F d C  
RMS wavefront = 0.0120 waves  
RMS spot diam = 0.60 μm  
Strehl ratio = 0.9924 diameter = 54 mm  
thickness = 34 mm  
working dist = 8.1 mm

Solid

| Surf | Type | Curvature (c) | Thickness | Glass | Diameter | Conic (k) | c1 | a2 | a3 | a4 | a5 | a6 | a7 | a8 |
|---|---|---|---|---|---|---|---|---|---|---|---|---|---|---|
| OBJ | Sphere | 0 | Infinity | AIR | 0 | 0 | | | | | | | | |
| 1 | Sphere | 0 | 10.0000 | AIR | 2.640 | 0 | | | | | | | | |
| Stop | Sphere | 0 | 3.7500 | Acrylic | 2.550 | 0 | | | | | | | | |
| 3 | Odd Asphere | 0 | -10.0903 | Mirror | 28.000 | 0 | -- | 2.748E-01 | 0 | -1.043E-01 | 2.909E-01 | -3.625E-01 | 2.217E-01 | -4.634E-02 |
| 4 | Odd Asphere | 0 | 46.7467 | Mirror | 53.870 | 0 | 1.933E-01 | 1.659E-02 | 2.093E-04 | -1.207E-06 | 1.266E-07 | 7.834E-09 | -8.327E-10 | 2.371E-11 |
| 5 | Odd Asphere | 0 | -13.5729 | Mirror | 51.663 | 0 | -6.905E-01 | 2.605E-03 | -2.441E-04 | -1.857E-05 | -7.822E-07 | 1.130E-07 | -1.573E-09 | 1.658E-11 |
| 6 | Odd Asphere | 0 | 2.0000 | Mirror | 30.518 | 0 | -8.790E-01 | 2.498E-02 | -2.800E-04 | -2.585E-05 | 3.938E-06 | -3.039E-07 | 1.303E-08 | -2.431E-10 |
| 7 | Sphere | 0.099975266 | 1.9420 | AIR | 11.845 | 0 | | | | | | | | |
| 8 | Sphere | 0 | 8.0605 | AIR | 11.845 | 0 | | | | | | | | |
| IMA | Sphere | 0 | | AIR | 0.031 | 0 | | | | | | | | |

*Odd Asphere coefficients*

EFL = 2.3 mm        poly chromatic F,d,C              diameter = 143 mm
mag = 87.0 x        RMS wavefront = 0.0106 waves      thickness = 87 mm
EPD = 5.0 mm        RMS spot diam = 0.60 μm           working dist = 10.6 mm
NA = 0.74           Strehl ratio = 0.9941
FOV = +/-0.4°

Hollow

| Surf | Type | Curvature (c) | Thickness | Glass | Diameter | Conic (k) | c1 | a2 | a3 | a4 | a5 | a6 | a7 | a8 |
|---|---|---|---|---|---|---|---|---|---|---|---|---|---|---|
| OBJ | Sphere | 0 | Infinity | AIR | 0 | 0 | 0 | 0 | 0 | 0 | 0 | 0 | 0 | 0 |
| 1 | Sphere | 0 | 20.0000 | AIR | 5.279 | 0 | 0 | 0 | 0 | 0 | 0 | 0 | 0 | 0 |
| Stop | Sphere | 0 | 7.5000 | AIR | 5.000 | 0 | 0 | 0 | 0 | 0 | 0 | 0 | 0 | 0 |
| 3 | Odd Asphere | 0 | -38.6324 | Mirror | 5.130 | 0 | -4.713E-01 | 8.594E-02 | -2.897E-02 | 5.459E-02 | -4.017E-02 | 1.371E-02 | -1.757E-03 | 1.626E-05 |
| 4 | Odd Asphere | 0 | 115.1814 | Mirror | 147.814 | 0 | 1.701E-02 | 6.368E-03 | -6.833E-06 | -4.624E-07 | 8.805E-09 | 3.588E-10 | -3.625E-12 | 5.526E-14 |
| 5 | Odd Asphere | 0 | -29.9692 | Mirror | 105.626 | 0 | -3.793E-01 | 1.139E-01 | -1.023E-02 | -3.313E-06 | -8.615E-08 | 5.046E-09 | -2.559E-11 | -2.613E-13 |
| 6 | Odd Asphere | 0 | 4.0000 | AIR | 69.533 | 0 | -7.653E-01 | 1.888E-02 | -3.422E-02 | 4.606E-06 | 1.167E-07 | -8.297E-09 | 1.879E-10 | -1.574E-12 |
| 7 | Sphere | 0.063839394 | 5.0499 | AIR | 23.039 | 0 | 0 | 0 | 0 | 0 | 0 | 0 | 0 | 0 |
| 8 | Sphere | 0 | 10.6144 | AIR | 23.039 | 0 | 0 | 0 | 0 | 0 | 0 | 0 | 0 | 0 |
| IMA | Sphere | 0 |  |  | 0.054 | 0 | 0 | 0 | 0 | 0 | 0 | 0 | 0 | 0 |

EFL = 2.3 mm        poly chromatic F,d,C              diameter = 147 mm
mag = 87.0 x        RMS wavefront = 0.0099 waves      thickness = 87 mm
EPD = 5.0 mm        RMS spot diam = 0.72 μm           working dist = 10.6 mm
NA = 0.74           Strehl ratio = 0.9948
FOV = +/-0.4°

Solid

| Surf | Type | Curvature (c) | Thickness | Glass | Diameter | Conic (k) | c1 | a2 | a3 | a4 | a5 | a6 | a7 | a8 |
|---|---|---|---|---|---|---|---|---|---|---|---|---|---|---|
| OBJ | Sphere | 0 | Infinity | AIR | 0 | 0 | 0 | 0 | 0 | 0 | 0 | 0 | 0 | 0 |
| 1 | Sphere | 0 | 20.0000 | AIR | 5.279 | 0 | 0 | 0 | 0 | 0 | 0 | 0 | 0 | 0 |
| Stop | Sphere | 0 | 7.5000 | Acrylic | 5.000 | 0 | 0 | 0 | 0 | 0 | 0 | 0 | 0 | 0 |
| 3 | Odd Asphere | 0 | -38.4611 | Mirror | 5.067 | 0 | -4.733E-01 | 8.566E-02 | -2.787E-02 | 5.225E-02 | -3.895E-02 | 1.368E-02 | -1.919E-03 | 5.214E-05 |
| 4 | Odd Asphere | 0 | 115.0111 | Mirror | 146.888 | 0 | 1.588E-02 | 6.402E-03 | -6.564E-06 | -4.639E-07 | 8.851E-09 | 3.562E-10 | -3.624E-12 | 5.341E-14 |
| 5 | Odd Asphere | 0 | -29.0556 | Mirror | 105.173 | 0 | -3.686E-01 | 1.129E-01 | -1.026E-02 | -3.313E-06 | -8.588E-08 | 5.046E-09 | -2.556E-11 | -2.613E-13 |
| 6 | Odd Asphere | 0 | 4.0000 | AIR | 69.650 | 0 | -7.663E-01 | 1.874E-02 | -3.473E-02 | 4.583E-06 | 1.225E-07 | -8.267E-09 | 1.810E-10 | -1.471E-12 |
| 7 | Sphere | 0.063905349 | 5.0700 | AIR | 23.062 | 0 | 0 | 0 | 0 | 0 | 0 | 0 | 0 | 0 |
| 8 | Sphere | 0 | 10.5780 | AIR | 23.062 | 0 | 0 | 0 | 0 | 0 | 0 | 0 | 0 | 0 |
| IMA | Sphere | 0 |  |  | 0.050 | 0 | 0 | 0 | 0 | 0 | 0 | 0 | 0 | 0 |

FIG. 28A

REFLECTIVE AXICON SYSTEMS AND METHODS

BACKGROUND AND SUMMARY

Our invention pertains to the field of lenses for use in optical and/or photonic apparatus. More particularly, it deals with novel reflective and catadioptric reflaxicon designs of our creation and their implementation in forms useful in such apparatus.

The term axicon generally refers to a specialized refractive lens type having a rotationally symmetric truly conical surface. Refractive axicons have been used in many optical applications and are relatively straightforward to fabricate. They have been used to image a point source as a line along the optical axis, or to transform a collimated laser beam into a ring. They have also been used to transform a Gaussian beam into an approximation of a Bessel beam.

A reflective axicon, termed "reflaxicon" was first proposed by Edmonds in 1973, who lightly explored it from a theoretical basis. ("The Reflaxicon, a New Reflective Optical Element, and Some Applications;" APPLIED OPTICS; Vol. 12, No. 8; August 1973). However, since then reflaxicons have found only limited tangible application in the optical arts.

From a theoretical standpoint, a reflaxicon is generally said to comprise a primary conical mirror 1 and a larger secondary conical mirror 2 located coaxially with respect to the primary mirror 1, as illustrated in FIG. 1A. The secondary mirror 2 is truncated so as to create an axial or central opening 2A with an inner diameter equal to or exceeding the base diameter 1A of the primary mirror 1. One of the usual functions of this combination, as illustrated in FIG. 1A, is to convert a solid light beam (such as a Gaussian intensity distribution laser beam) into a hollow beam in an essentially lossless manner. By converting a solid light beam into a ring, the reflaxicon accomplishes reflectively what an axicon accomplishes refractively. In addition, the half-angle theta 2 of the secondary cone 2 and the half-angle theta 1 of the primary cone 1, can be chosen so as to produce a converging, parallel, or diverging beam. Further, by pairing reflaxicons, a variety of other effects become theoretically possible, such as—for example—curving the initial secondary mirror 2 of a reflaxicon pair to compensate for non-diffraction limited beam divergence of incident light as illustrated in FIG. 1B. However, while the theoretical possibilities of reflaxicons have received some limited exploration, their practical application has been limited. Consequently, our designs represent a radical expansion in terms of the practical implementation and use of reflaxicons in optical systems as well as in their incorporation into optical and photonic apparatus.

To begin with, we have developed reflaxicons for practical use and implementation as both tightly or loosely toleranced optics for either imaging or non-imaging applications. Examples of applications for tightly toleranced optics for imaging include: diffraction limited relay objectives (finite conjugate imaging), diffraction limited microscope objectives (both finite and infinite conjugate imaging), diffraction limited high power laser focussing objectives, and laser beam delivery systems (afocal designs for beam expanders, pupil relays, and beam shaping systems). Examples of applications for loosely toleranced optics for imaging include: non-diffraction limited relay objectives (finite conjugate imaging), non-diffraction limited microscope objectives (both finite and infinite conjugate imaging), laser focussing objectives, and laser beam delivery systems. Examples of applications for loosely toleranced optics for non-imaging include: illumination and light concentration optics such as LED collection collimators, solar concentrators, and arrays of such elements. None of these applications for reflaxicons have received tangible development within the optical arts. In this context we have developed and invented structures based both on solid reflaxicons produced from optical glass (divided into either only purely reflective designs, or catadioptric designs operating on both refractive and reflective principles) and hollow reflaxicons (operating purely reflective), and various combinations of the foregoing.

The use of reflaxicons alone is an inherently beneficial development, as pure reflective optical systems are inherently free of chromatic aberrations. Moreover, our designs can, at their limits, be free of obscuration (a common problem in purely reflective systems). Alternatively, the amount of obscuration can be chosen to fit the application. In addition, our designs do not require beam splitters, tilted or decentered components, and are preferably axially symmetric, making them far simpler and easier to implement than typical all-reflective systems. Further details on the foregoing will be made plain in the drawing figures and detailed description that follow.

BRIEF DESCRIPTION OF THE DRAWINGS

FIG. 24A provides technical details related to hollow and solid reflaxicon systems produced in accordance with the invention having an effective focal length of 4.0 mm, a magnification of 50×, and numerical aperture of 0.45, the said systems being of particular interest and usefulness for application as microscope objectives.

FIG. 25A provides technical details related to hollow and solid reflaxicon systems produced in accordance with the invention having an effective focal length of 2.5 mm, a magnification of 80×, and numerical aperture of 0.45, the said systems being of particular interest and usefulness for application as microscope objectives.

FIG. 26A provides technical details related to hollow and solid reflaxicon systems produced in accordance with the invention having an effective focal length of 2.2 mm, a magnification of 92.2×, and numerical aperture of 0.50, the said systems being of particular interest and usefulness for application as microscope objectives.

FIG. 27A provides technical details related to hollow and solid reflaxicon systems produced in accordance with the invention having an effective focal lengths of 1.9 mm and 1.8 mm, magnifications of 105.3× and 113×, and numerical apertures of 0.55 and 0.58, the said systems being of particular interest and usefulness for application as microscope objectives.

FIG. 28A provides technical details related to hollow and solid reflaxicon systems produced in accordance with the invention having an effective focal length of 2.3 mm, a magnification of 87×, and numerical aperture of 0.74, the said systems being of particular interest and usefulness for application as microscope objectives.

DESCRIPTION

Figure 1A:
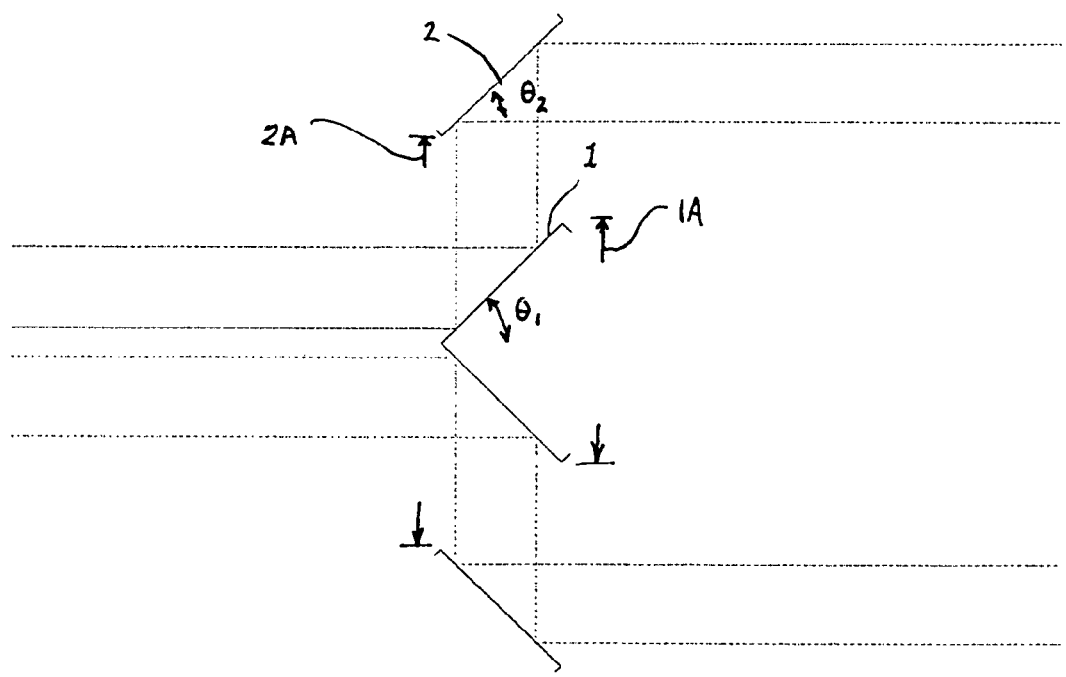
FIG. 1A provides a basic schematic side view of a reflaxicon.
Figure 1B:
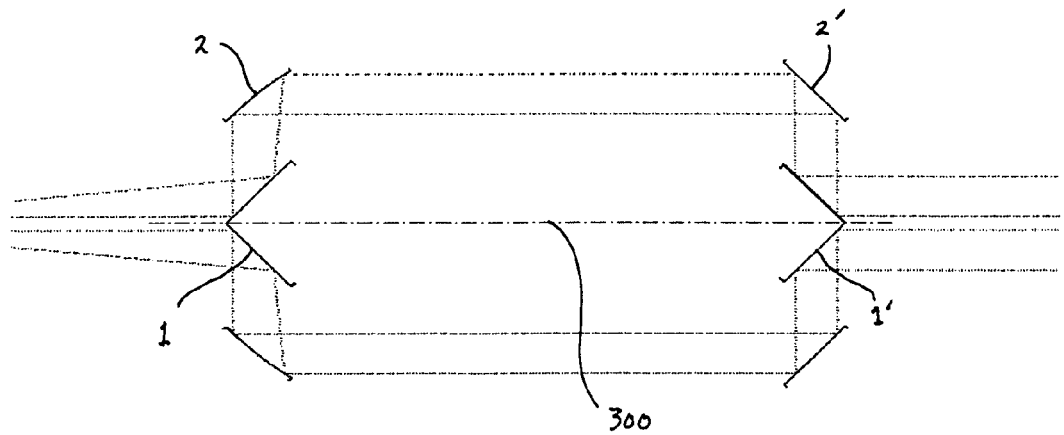
FIG. 1B provides a basic schematic side view of a reflaxicon system comprising a pair of reflaxicons.
Figure 2:
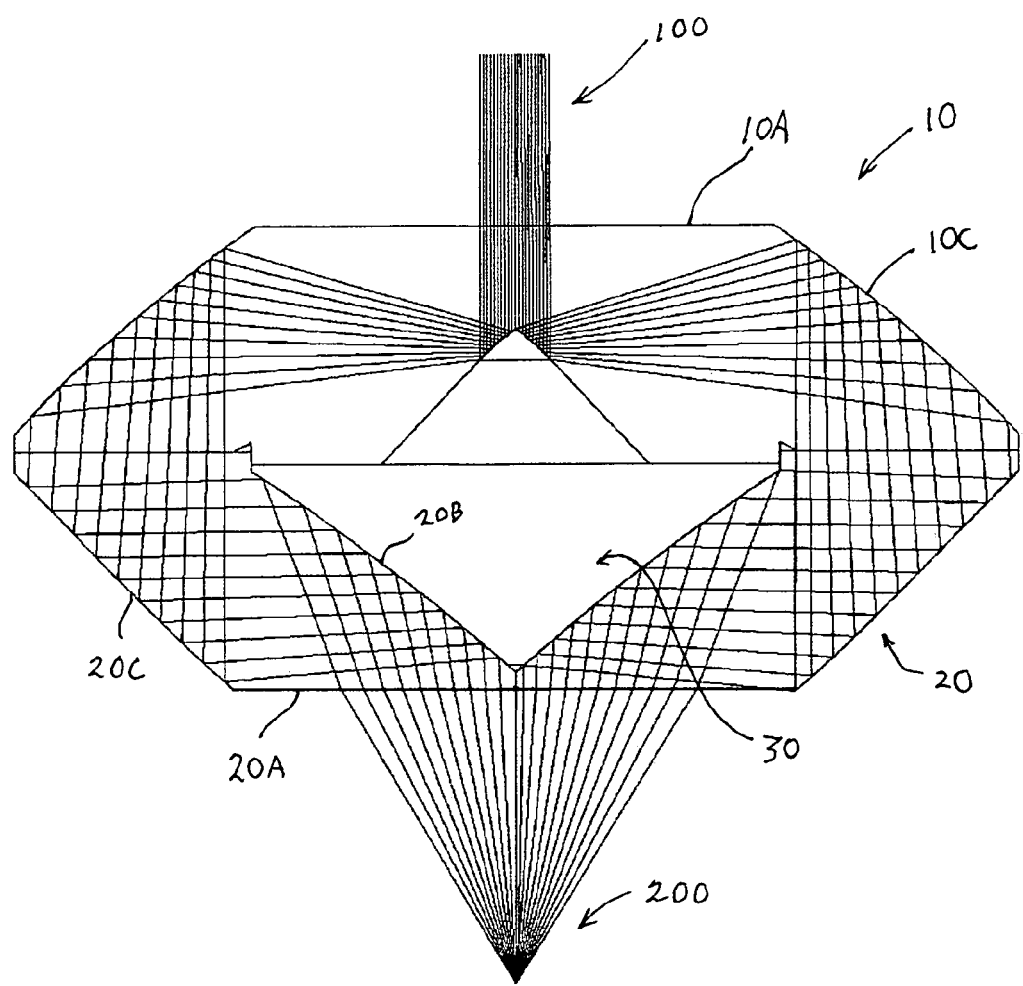
FIG. 2 provides a schematic side view of a basic solid internal reflaxicon system of our invention with a planar input/output.
Figure 3:
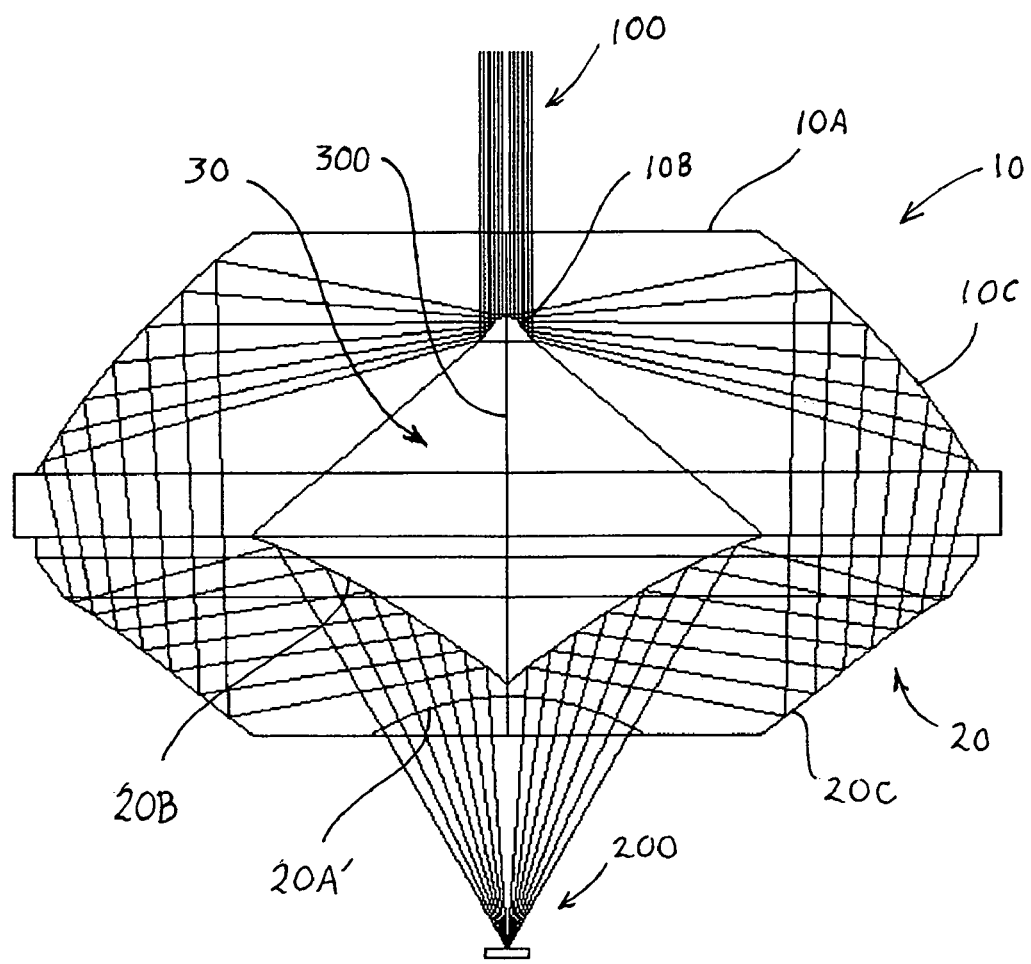
FIG. 3 provides a schematic side view of the solid basic internal reflaxicon system illustrated in FIG. 2 with a concentric output interface.

FIGS. 2 and 3 provide an initial introduction to some of the concepts underlying our basic solid internal reflaxicon system. In general in these figures, a collimated incident beam 100 enters the internal reflaxicon system and is emitted as a convergent beam 200. However, as will be appreciated by those skilled in the art, the illustrations would also be valid for a divergent beam entering along the opposite path and being emitted as a collimated beam. Nonetheless, in keeping with denomination of beam 100 as the incident beam, the basic system illustrated will be seen to have three basic components, an incident portion 10, an exiting portion 20, and a central portion comprising an air space 30. The incident portion 10 is characterized by a planar input surface 10A, an interior conical central reflective surface 10B (also referred to herein as a first reflaxicon interior central reflective surface), and an interior annular or surrounding inclined reflective side surface 10C (also referred to herein as a first reflaxicon interior distal reflective surface). It is noted at this point, however, that the term "conical"—while substantially and generally correct—should not be considered to restrict these surfaces to a purely conical shape as most have higher order aspheric terms added to the surfaces to optimize for a given application.

An important distinction between our invention making use of reflaxicons and other reflective or catadioptric systems is that the two or more conical reflective surfaces employed should be considered as "substantially conical." At the apex of a truly conical surface of revolution (being thus a rotationally symmetric surface), the partial derivatives of said surface are discontinuous. All sides of the cone come together to meet at a single point where the derivatives are undefined. In practice, this singularity cannot be truly manufactured due to manufacturing tolerances. Or it may be by design that the apex is purposefully chosen not to be discontinuous through the addition of higher order aspheric terms. In general, the sag, z(r), of a given reflective surface is to be described by an odd asphere model. This polynomial must contain both even as well as odd powers of the radial coordinate, r, as given by the following general expression, indicating a total of N even and odd terms modifying the non-aspherical equation for sag:

$$z(r) = \frac{cr^2}{1 + \sqrt{1 - (1+k)c^2 r^2}} + \sum_{i=1}^{N} \alpha_i r^i,$$

where c is the curvature, k is the conic constant, and $\alpha_i$ are the coefficients of the polynomial. A more restrictive form, limited to eight terms, could be written as:

$$z(r) = \frac{cr^2}{1 + \sqrt{1 - (1+k)c^2 r^2}} + \alpha_1 r^1 + \alpha_2 r^2 + \alpha_3 r^3 + \alpha_4 r^4 + \alpha_5 r^5 + \alpha_6 r^6 + \alpha_7 r^7 + \alpha_8 r^8.$$

In either case, it is the odd powered terms, and most especially the $r^1$ term, that gives the reflaxicon's surface its conical properties which are exploited in our invention.

As will be noted from review of the light paths illustrated in FIGS. 2 and 3, the central first conical surface 10B and the inclined first side conical surface 10C essentially serve as, respectively, the primary and secondary conical surfaces of a first reflaxicon in a reflaxicon pair. Likewise, the central second conical surface 20B (also referred to herein as a second reflaxicon interior central reflective surface) and the inclined second side conical surface 20C (also referred to herein as a second reflaxicon interior distal reflective surface) essentially serve as, respectively, the primary and secondary conical surfaces of a second reflaxicon in the said reflaxicon pair. However, this initial embodiment of our invention is distinctive over the previously described paired reflaxicon systems not only in its applications described herein, but in the fact that it is based on reflections and light paths that occur within a solid medium (the optical glass forming incident portion 10 and exiting portion 20), and the fact that it can, therefore, primarily rely on optical principles of total internal reflection (TIR) at the reflective surfaces bounding air space 30 (surfaces 10B, 10C, 20B, and 20C) rather than mirrors at these surfaces.

Total internal reflection ("TIR") is an optical phenomenon that occurs at a medium boundary such as surfaces 10B, 10C, 20B, and 20C where light is refracted enough at the boundary to prevent its transmission through the boundary, effectively sending it backwards—i.e., reflecting all of the light. When light crosses the boundary between materials with different refractive indexes, the light beam can be partially refracted at the boundary and partially reflected. Total internal reflection ("TIR") can only occur where light travels from a medium with a higher refractive index (typically a denser material such as the material forming incident portion 10 and exiting portion 20) to one with a lower refractive index (typically a less dense medium such as the air of air space 30). Thus, e.g., it can occur when passing from the material composing portions 10, 20 to the air in air space 30, but not when passing from air to glass as it initially enters incident portion 10.

The "critical angle" is the angle of incidence above which such total internal reflection occurs, as measured with respect to a "normal" at the refractive boundary (surfaces 10B, 10C, 20B, and 20C). Thus, if the angle of incidence is greater (i.e., closer to the boundary and farther from the normal) than the critical angle, the incident light will stop crossing the surface altogether and instead totally reflect back internally (as illustrated in FIGS. 2 and 3). For visible light traveling from glass into air (or vacuum), the critical angle is approximately 41.5 degrees. Thus, in the embodiments illustrated, the critical angle for incident light at each of surfaces 10B, 10C, 20B, and 20C will, as illustrated in these figures, always meet or exceed this figure.

A further refinement in our designs is illustrated in the distinction between FIG. 2 and FIG. 3. FIG. 2 has an exiting portion 20 having a planar output surface 20A. As will be noted, in this situation refraction will take place at planar output surface 20A, which forms the interface between the optical glass forming the exiting portion 20 and the less dense external ambient medium (air). The angle of incident light on surface 20A is less than the critical angle and, hence, is refracted slightly rather than reflected. This refraction can be calculated and compensated for and/or included in the design calculations relevant to different applications of the invention. However, we deem it preferable in most embodiments to avoid this issue by providing a spherical output surface 20A' concentric with the focal point as illustrated in FIG. 3 such that light incident on surface 20A' is normal to its surface and no refraction takes place. In this manner, the optical system, consisting of dispersive refractive optical material, is made completely achromatic for the axial beam, since all optical power in the system is imparted by non-dispersive reflective surfaces only.

Figure 4:
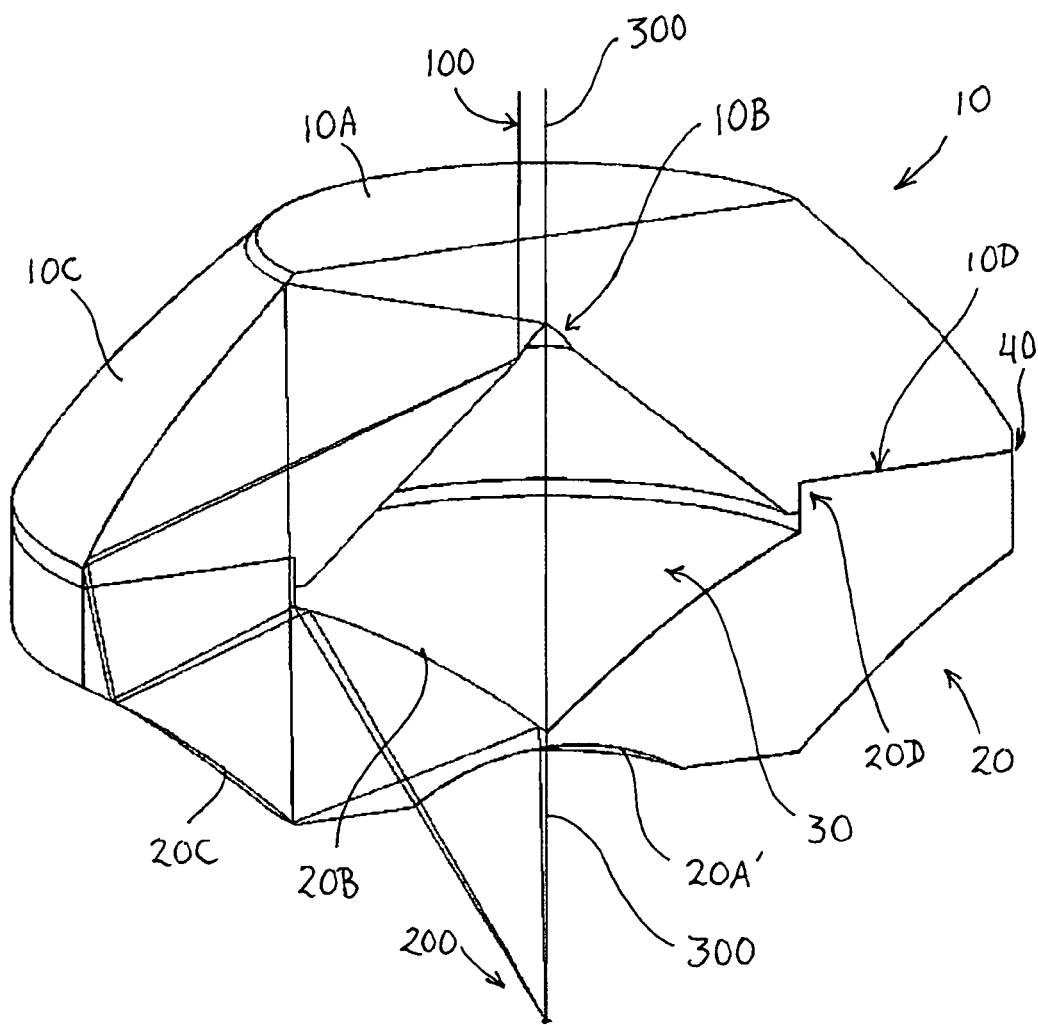
FIG. 4 provides a perspective cut-away side view of a basic internal reflaxicon system of our invention with a concentric output interface.
Figure 5A:
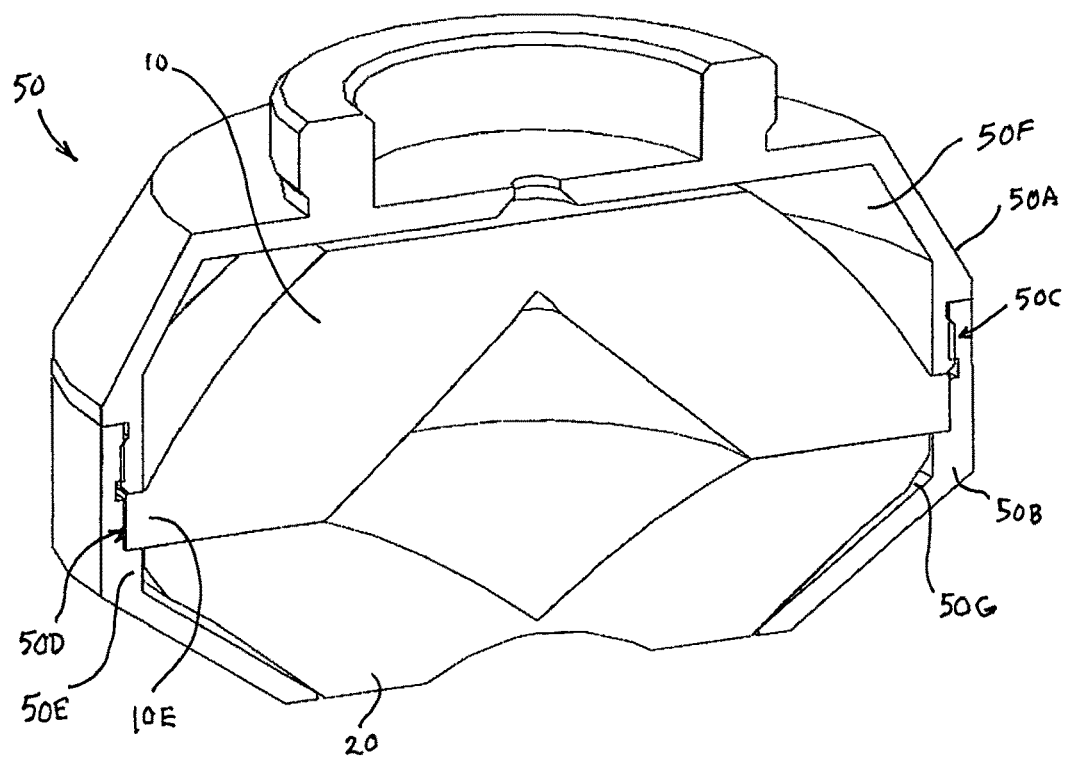
FIG. 5A provides a perspective cut-away side view of a basic solid internal reflaxicon system of our invention with a concentric output interface implemented in an external housing suitable for use as, e.g., a microscope objective.
Figure 5B:
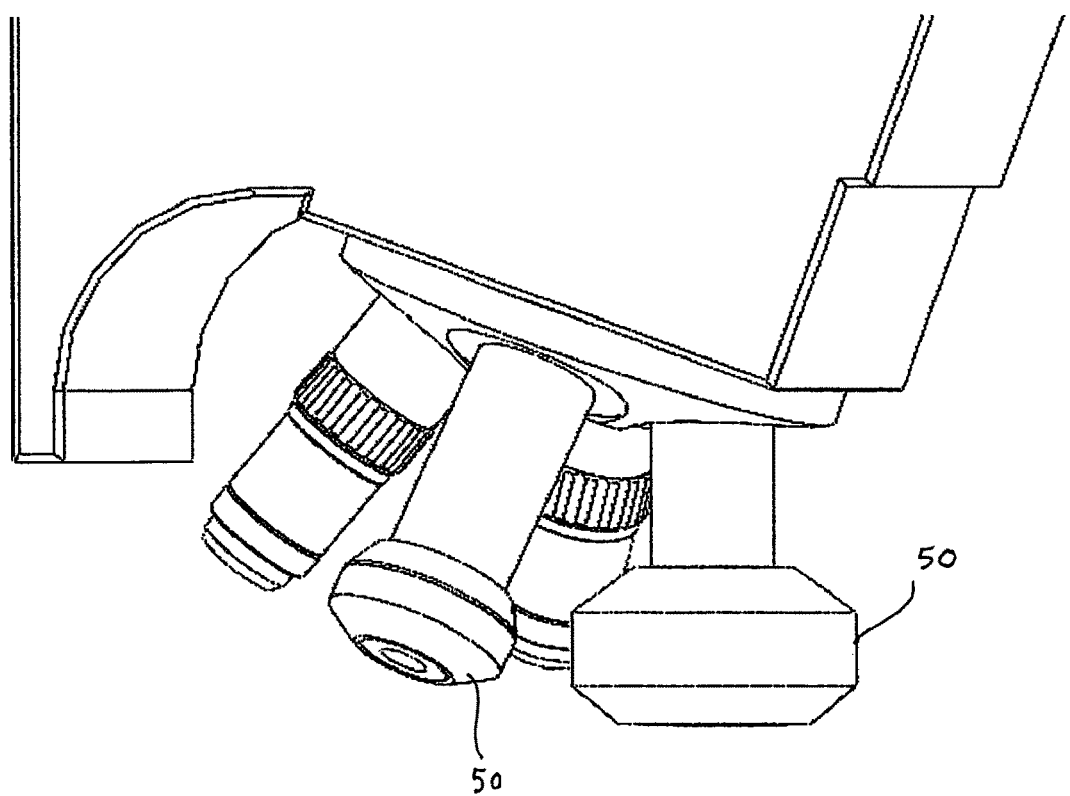
FIG. 5B provides a perspective side view of a reflaxicon system and housing of the general type illustrated in FIG. 5A in use as a microscope objective.

While FIGS. 2 and 3 are important in understanding the basic concepts underlying our invention, FIGS. 4 and 5A provide more tangible representations of the components of our invention in the form of perspective cut-away side views of the basic components of solid internal reflaxicon systems with concentric output interfaces. As will be noted from FIG. 4, which does not include an external housing for the axicon system, the incident portion 10 and exiting portion 20 can be provided with interlocking surfaces 10D and 20D at their juncture 40 in order to provide for a more solid construct when connecting incident portion 10 and exiting portion 20 via, e.g., an appropriate adhesive (such as an optical cement) and in order to assure that these two parts are properly aligned and centered on optical axis 300. However, as illustrated in FIG. 5A, it is preferable to provide the internal reflaxicon system of our invention with a housing 50 to protect the assembly, to assist in holding its parts together in properly spaced and aligned relationship, and to suit it for use in a particular application such as, e.g., for a microscope objective (as illustrated in FIG. 5B) or for some other use.

As will be further noted from FIG. 5A, the external configurations of the incident portion 10 and the exiting portion 20 and the internal configuration of the housing 50 are designed to mate in such a manner as to better assure that the exiting portion 20 and the incident portion 10 are in close contact and properly aligned and centered on optical axis 300. In this example, housing 50 has a first portion 50A and a second portion 50B joined at a snap locking juncture 50C. An annular slot 50D is formed in the internal surface of housing 50 which mates with an annular flange type extension 10E of incident portion 10, to hold this portion in proper axial alignment above exiting portion 20, while an inner wall 50E serves the same purpose with respect to exiting portion 20. Further, the portion of snap locking juncture 50C which is part of first portion 50A is designed to press the incident portion 10 firmly down onto the exiting portion 20 as it is snapped into position. In addition, in keeping with the principles of total internal reflection discussed, supra, the housing also provides interior spaces 50F, 50G adjacent the operative (reflective) portions of surfaces 10C and 20C.

Figure 6A:
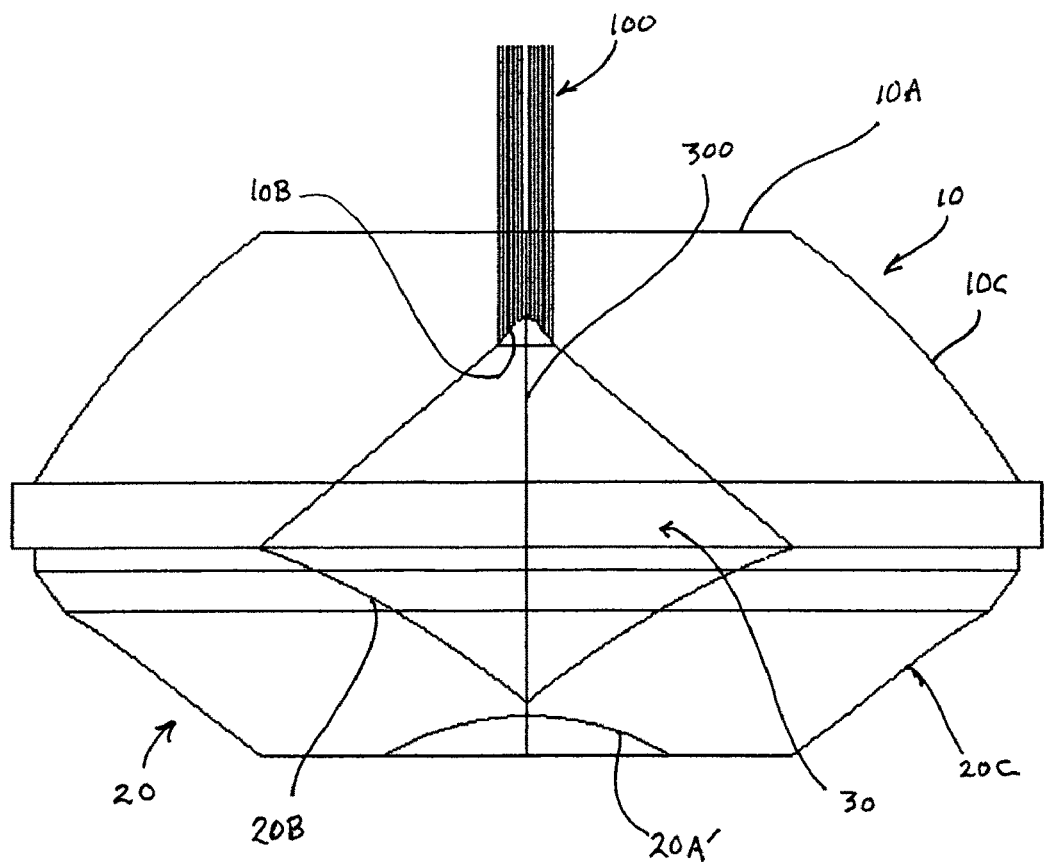
FIG. 6A provides a schematic side view illustrating a first step in the progression of incident light through a basic solid internal reflaxicon system of our invention with concentric output interface.
Figure 6B:
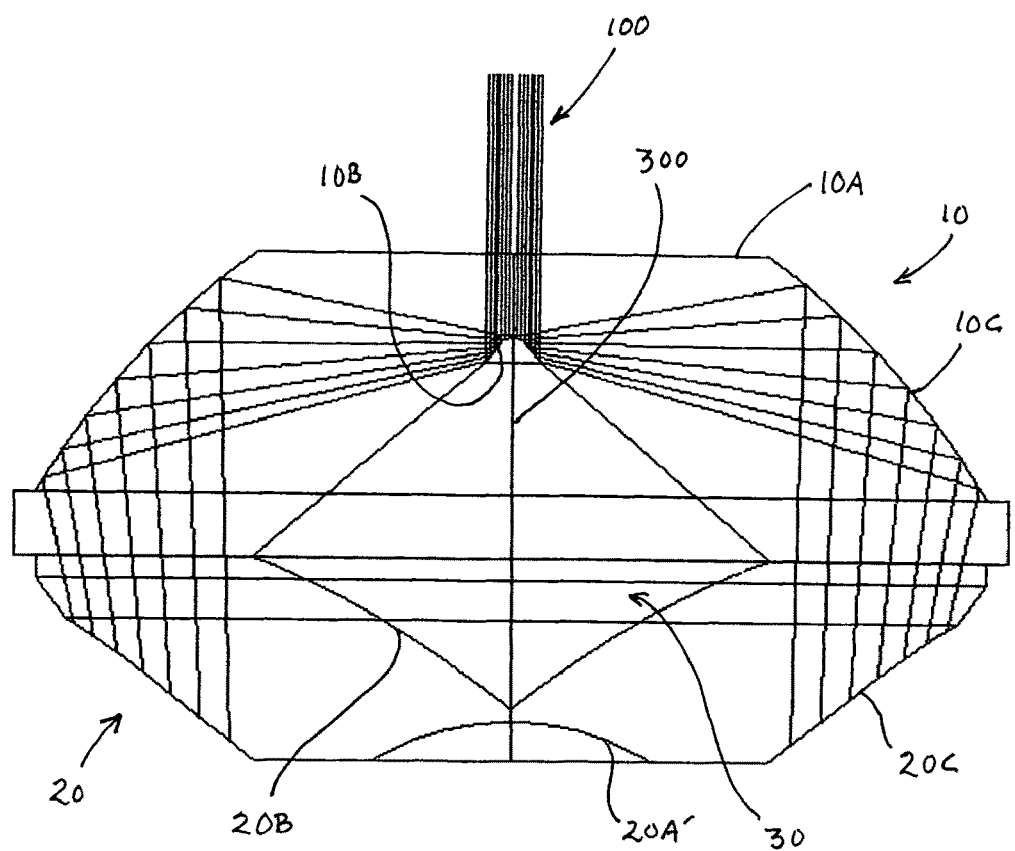
FIG. 6B provides a schematic side view illustrating a second step in the progression of incident light through the internal reflaxicon system illustrated in FIG. 6A.
Figure 6C:
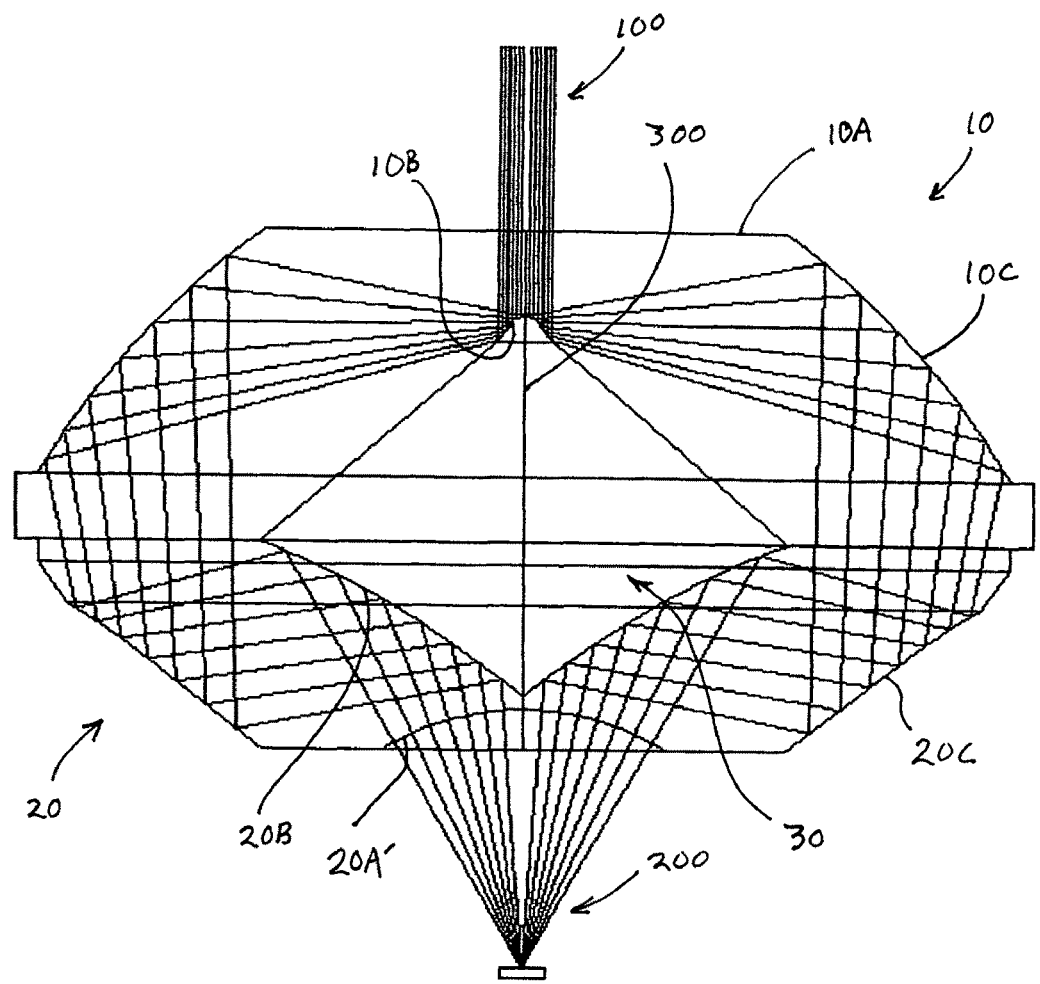
FIG. 6C provides a schematic side view illustrating a third step in the progression of incident light through the internal reflaxicon system illustrated in FIG. 6A.
Figure 7:
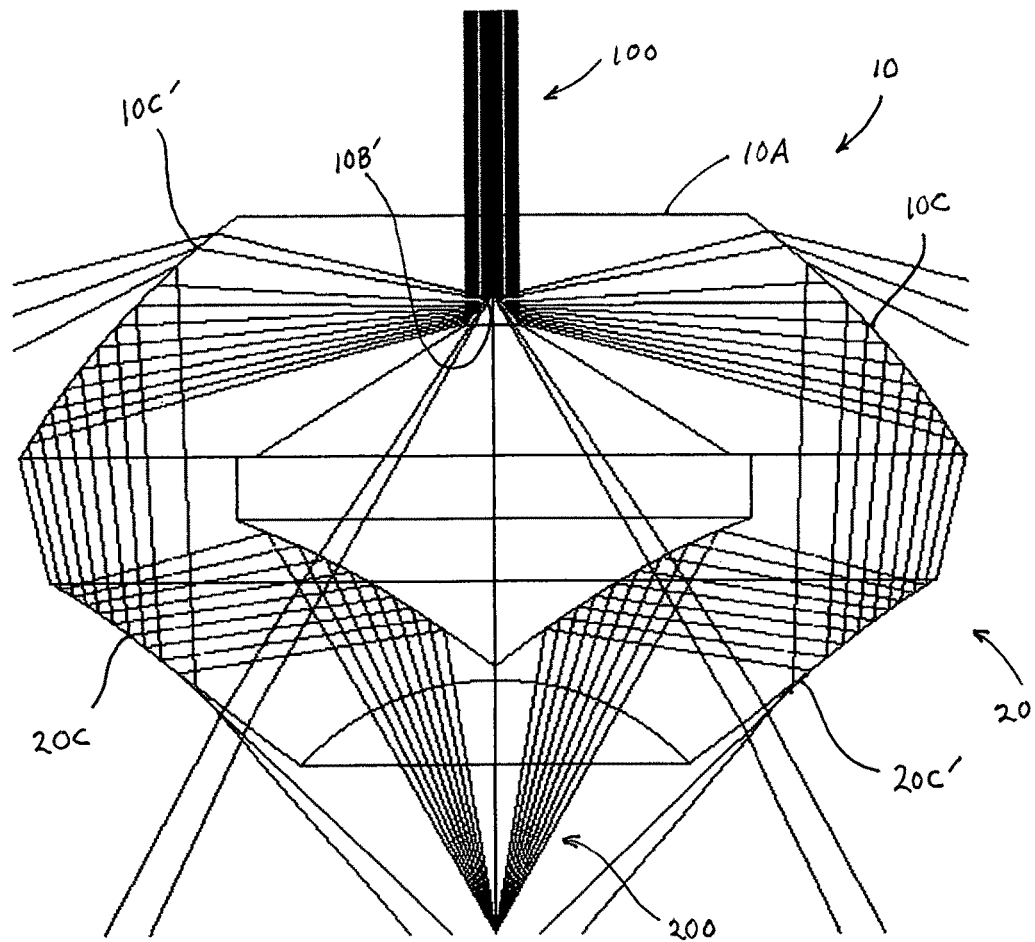
FIG. 7 provides a schematic side view illustrating the progression of incident light through a basic internal reflaxicon system of our invention with concentric output interface without added reflective coatings.
Figure 8:
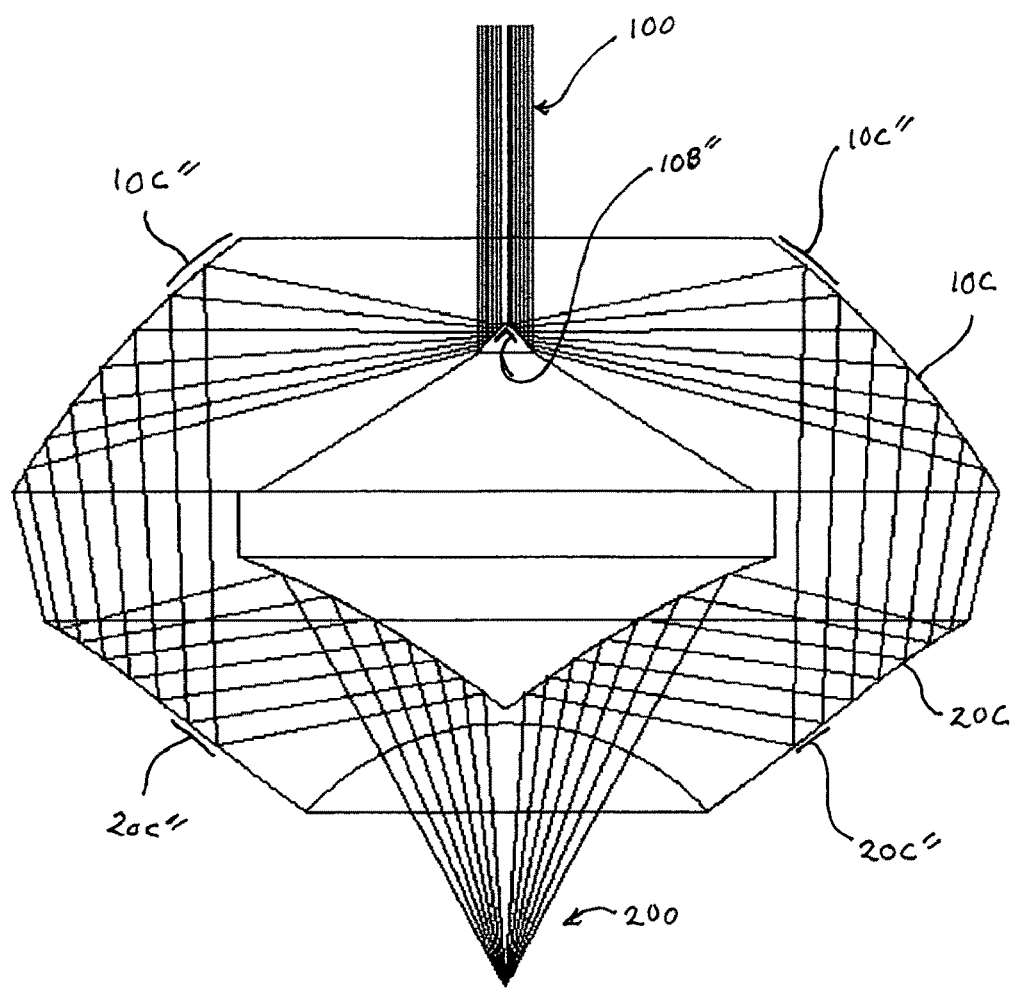
FIG. 8 provides a schematic side view illustrating the progression of incident light through the reflaxicon system of FIG. 7 after adding reflective coatings in areas where the angle of incident light is less than the critical angle.
Figure 9A:
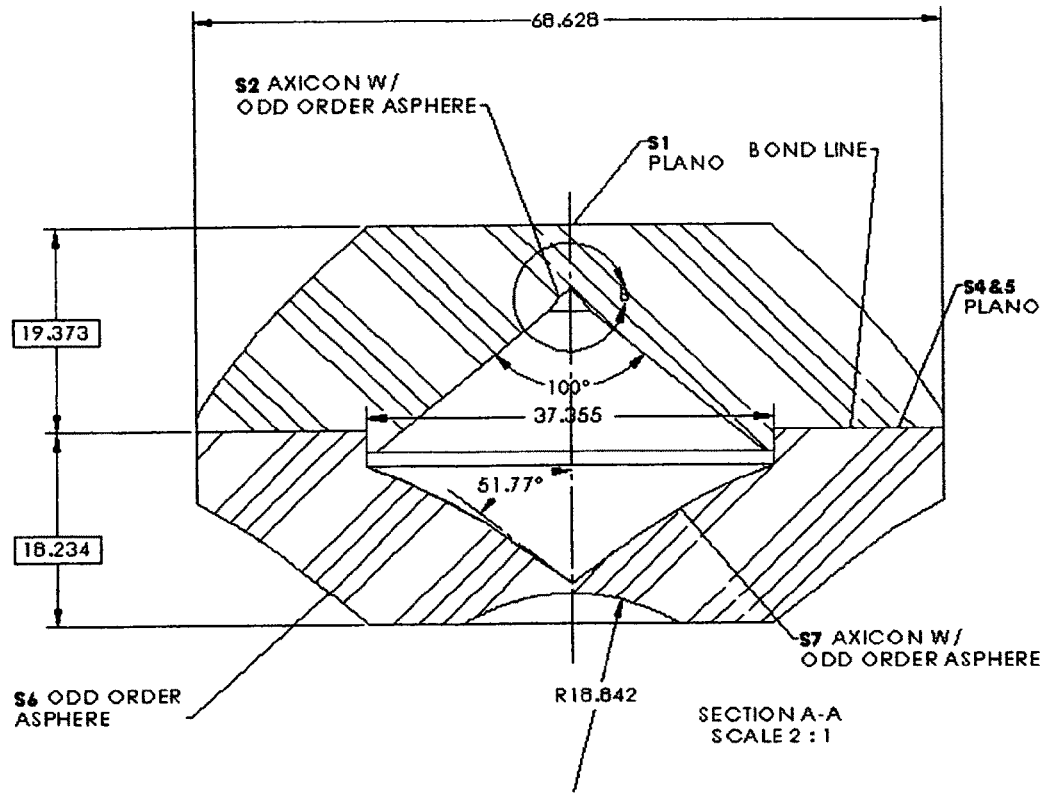
FIG. 9A provides a schematic cross-sectional view of a solid reflaxicon system including engineering details related thereto.
Figure 9B:
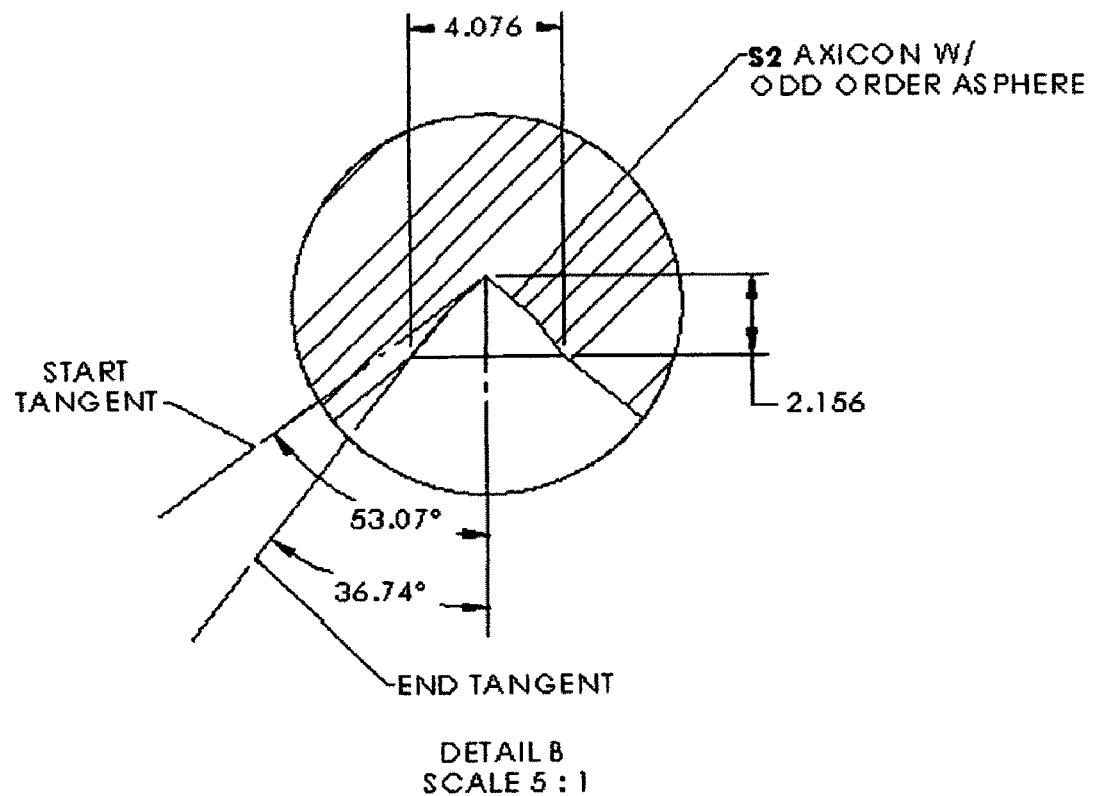
FIG. 9B provides a more detailed cross-sectional view of the conical central reflector 10B of FIG. 9A.

FIGS. 6A through 9B serve to further reinforce the discussion of the operations of our invention as well as to introduce additional details and refinements thereto. A step-by-step review of the operation of our invention and its reflective surfaces is initially provided in FIGS. 6A through 6C. In FIG. 6A, collimated incident beam 100 enters incident portion 10 via planar input surface 10A (which is normal to the beam and therefore causes no refraction) and impacts a conical central surface 10B. In FIG. 6B it is reflected to surrounding inclined side surface 10C and is, in turn, reflected to the inclined second side conical surface 20C of exiting portion 20. From 20C it is reflected to the central second conical surface 20B and from thence, via concentrically curved output surface 20A' it is emitted as a convergent beam 200. (See, FIG. 6C). Turning from the prior discussion to FIGS. 7 and 8, an additional design issue and its resolution are illustrated. In general, the surface shapes of the reflaxicon pairs can be constrained during the optimization process to yield total internal reflection over the entire used apertures on all four reflective surfaces. However, there may arise design situations where this constraint must be released (making use of additional degrees of freedom) in order to achieve enhanced optical performance. In FIG. 7, a schematic side view illustrating the progression of incident light through an internal reflaxicon system without added reflective coatings is illustrated whose reflective surface shapes where designed without regard to TIR occurring over the entire clear aperture. As shown in this figure, problems with embodiments of this type can arise in certain areas 10B', 10C', and 20C' of, respectively, reflective surfaces 10B, 10C, and 20C, where the angle of incident light is less than the critical angle and, therefore, total internal reflection does not occur. This problem can, however, be easily alleviated by the application of reflective coatings 10B", 10C", and 20C" as necessary to the affected areas 10B', 10C', and 20C' or, where advisable, to the entire reflective surfaces of which they are a part. (See, FIG. 8). Finally, having explored the theoretical and practical aspects of the solid design, FIGS. 9A and 9B provide an even more concrete example of its implementation, with FIG. 9A providing a schematic cross-sectional view of a solid reflaxicon system including engineering details related thereto, and FIG. 9B providing a more detailed cross-sectional view of its conical central reflector 10B.

An important consideration in the design of axially symmetric reflective or catadioptric optical systems is the percentage of central obscuration to be tolerated in such a design. At their limit, the reflaxicon systems of our invention can be designed and fabricated to be inherently free of central obscuration. Such a feature has heretofore been impossible to achieve with conventional axially symmetric reflective or catadioptric optical systems. For conventional axially symmetric reflective or catadioptric focal systems (objectives, imagers, relays, terrestrial or space-based telescopes), the central obscuration is a function of the desired output numerical aperture, and either the input beam diameter or the focal length. For conventional afocal systems, axially symmetric reflective or catadioptric optical systems (telescopes or beam expanders; these are less common), the central obscuration is a function of the desired output beam diameter and either input beam diameter or magnification ratio. There exists a fundamental limit as to the minimum obscuration ratio in either case: it is significantly greater than zero. In general such central obscuration is an undesirable necessity when implementing axially symmetric reflective or catadioptric systems because of a loss in light transmission, reduced imaging contrast at mid-range spatial frequencies, and other imaging artifacts. However, these negatives have historically been tolerated due to the otherwise beneficial attributes of axially symmetric reflective or catadioptric optical systems when compared to their equivalent all-refractive counterparts: namely, uniform performance over ultra-wide wavelength spectral regions, diffraction limited performance over high numerical apertures, compact mechanical envelopes, enhanced working distance, reduced complexity, and various other positive aspects. The reflaxicon designs of our invention retain all the benefits of conventional axially symmetric reflective or catadioptric designs, with the additional benefits of lossless transmission and superior diffraction limited performance as their equivalent all-refractive counterparts enjoy.

It is important to distinguish that unobscured reflective or catadioptric systems do exist (and are common) in prior art, but these must by force be employed either off-axis (using only partial apertures of an otherwise axially centered optical system), or they must use tilted, decentered, or otherwise free-form optical surfaces. Such surfaces destroy the axial symmetry of the optical system relative to the incoming bean. It is this loss of axial symmetry which results in the major drawback of such unobscured reflective or catadioptric systems. They can support only low numerical apertures which severely limit their general versatility for optical systems demanding high performance. Another major disadvantage of such systems is the difficulty in fabricating and aligning such tilted, decentered, off-axis, or freeform optical elements, resulting in high costs which could not realistically be transitioned to high volume production or to low cost applications. Our invention avoids all these disadvantages.

Figure 10A:
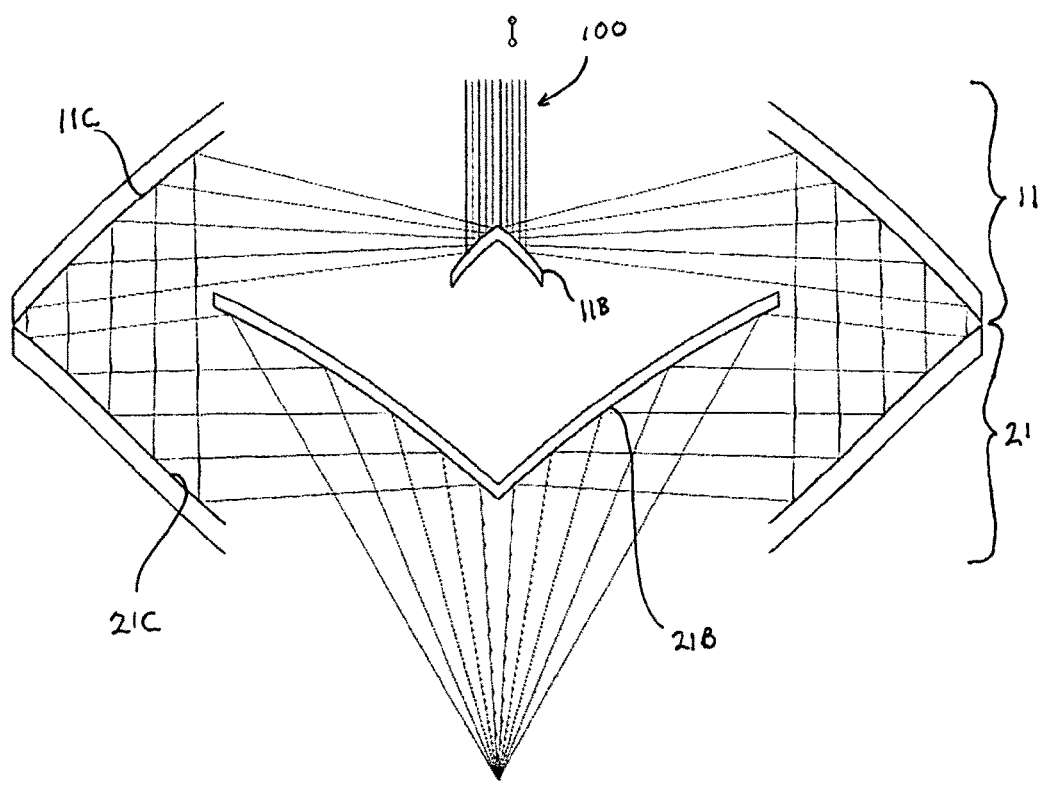
FIG. 10A provides a schematic side view of a hollow external reflaxicon system of our invention suitable for the same general types of uses as the previously described solid internal reflaxicon systems.

In addition, as illustrated in FIGS. 10A through 10D, our invention can also be implemented in a hollow externally reflective form. FIG. 10A provides a first schematic side view of a hollow external reflaxicon system using substantially conical mirrors to achieve the same general effects as the previously described solid internal systems. In FIG. 10A, collimated incident beam 100 enters the reflaxicon system and is, as in previous embodiments, emitted as a convergent beam 200. In this embodiment the incident portion (denoted generally by bracket 11) includes a substantially conical central reflector 11B (also referred to herein as a first reflaxicon exterior central reflective surface), and a surrounding inclined side reflector 11C (also referred to herein as a first reflaxicon exterior distal reflective surface). As before, the central first conical reflector 11B and the inclined first side conical reflector 11C serve as, respectively, the primary and secondary conical surfaces of a first reflaxicon in a reflaxicon pair. Likewise, the exiting portion (denoted generally by bracket 21) includes a central second conical reflector 21B (also referred to herein as a second reflaxicon exterior central reflective surface) and inclined second side conical reflector 21C (also referred to herein as a second reflaxicon exterior distal reflective surface) which serve as, respectively, the primary and secondary conical surfaces of a second reflaxicon in the said reflaxicon pair.

Figure 10B:
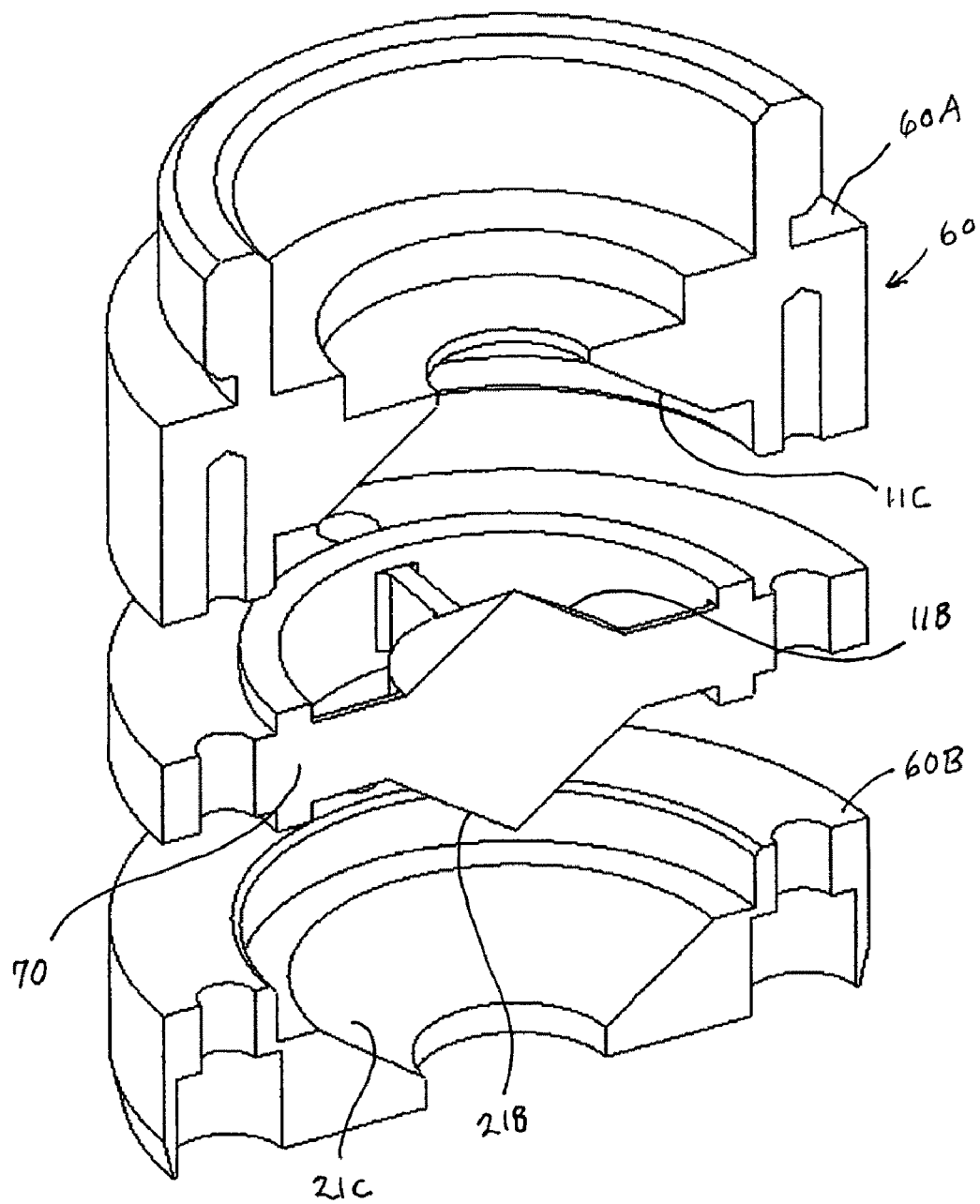
FIG. 10B provides an exploded partial cut-away perspective side view of a basic external reflaxicon system implemented in a suitable housing.
Figure 10C:
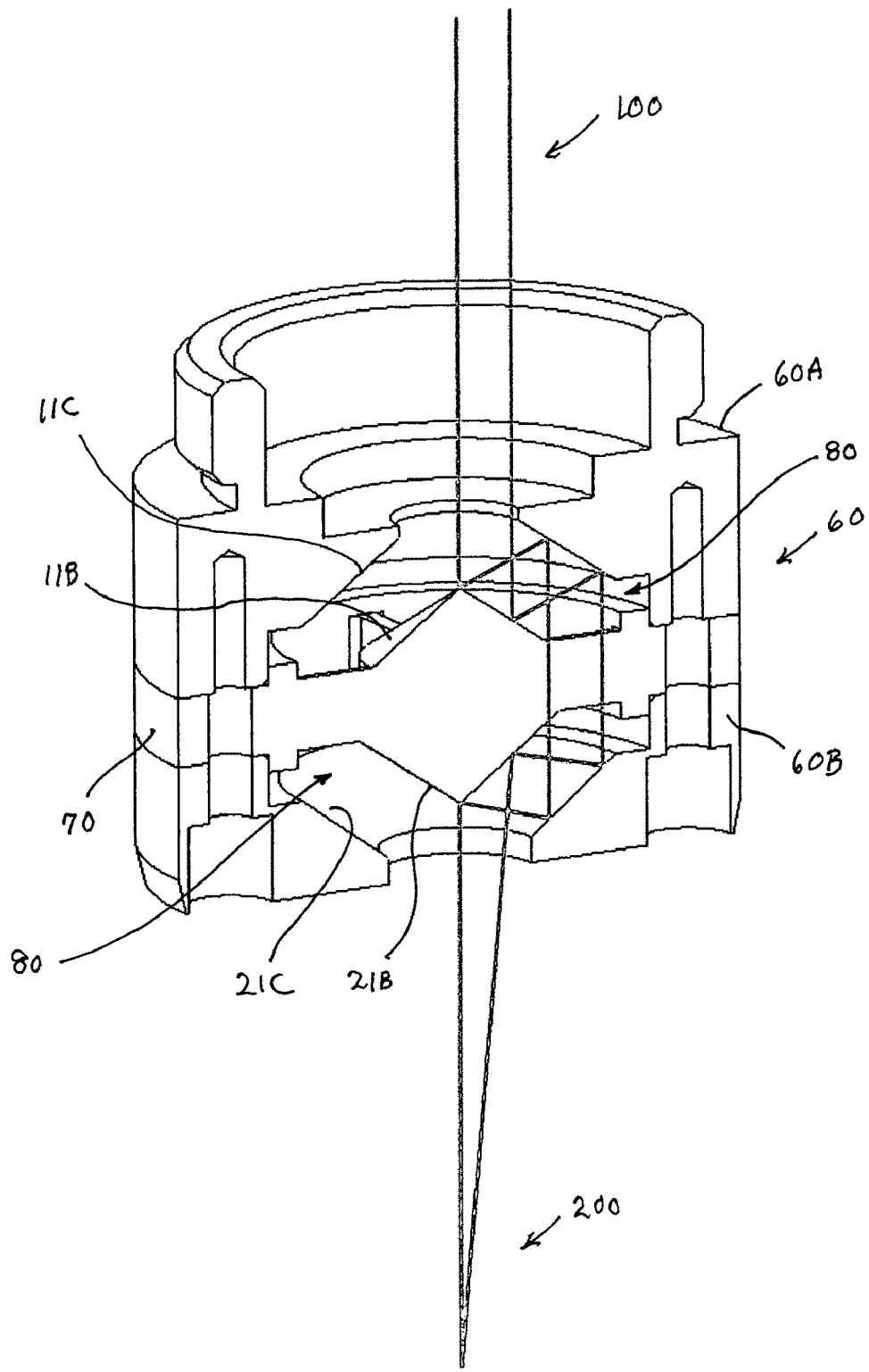
FIG. 10C provides an assembled partial cut-away perspective side view of the basic external reflaxicon system illustrated in FIG. 10B.
Figure 10D:
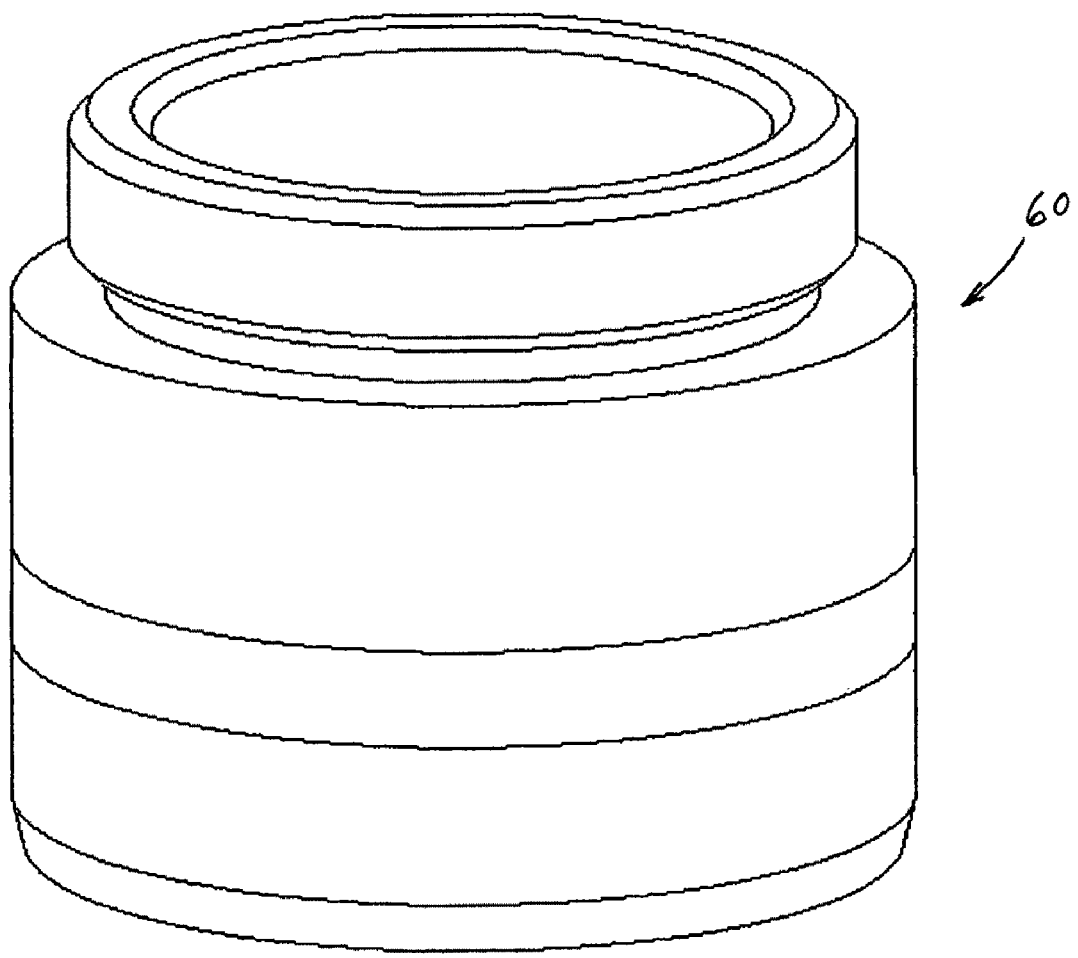
FIG. 10D provides an assembled side view of the basic external reflaxicon system illustrated in FIG. 10B.

A more concrete and tangible implementation of the design illustrated schematically in FIG. 10A is shown in FIGS. 10B, 10C and 10D, which provide, respectively, an exploded partial cut-away perspective side view, an assembled partial cut-away perspective side view, and an assembled side view of this hollow reflaxicon system implemented in a suitable housing 60. As will be noted, the system is preferably formed with mirrored surfaces 11C and 21C formed as, respectively, integral interior surfaces of the first exterior housing portion 60A and the second exterior housing portion 60B of housing 60. Central first conical 11B and central second conical reflector 21B are formed as integral parts of support member 70, which is suspended in the interior plenum 80 of housing 60.

In accordance with the foregoing solid and hollow reflaxicon descriptions, we present concrete design examples which serve to replace conventional all-refractive Long Working Distance microscope objectives. The examples following (see FIGS. 23-28) have similar first order properties (focal length, magnification, and field of view) as well as the diffraction limited optical performance of their all-refractive counterparts. In addition, all have a theoretical obscuration ratio of zero (100% transmission). All enjoy zero axial chromatic aberration over the entire ultraviolet, visible, and infrared wavelength spectrum, which is an impossiblity for all-refractive designs. One of the key features of all-reflective rotationally symmetric design forms is that they can achieve by their nature a longer working distance than their all-refractive counterparts. The reflaxicon designs shown have a working distance of three to four times longer than their all-refractive counterparts, which becomes a tremendous advantage for microscope objectives working at the higher magnification range from 50× to 200×.

Figure 11:
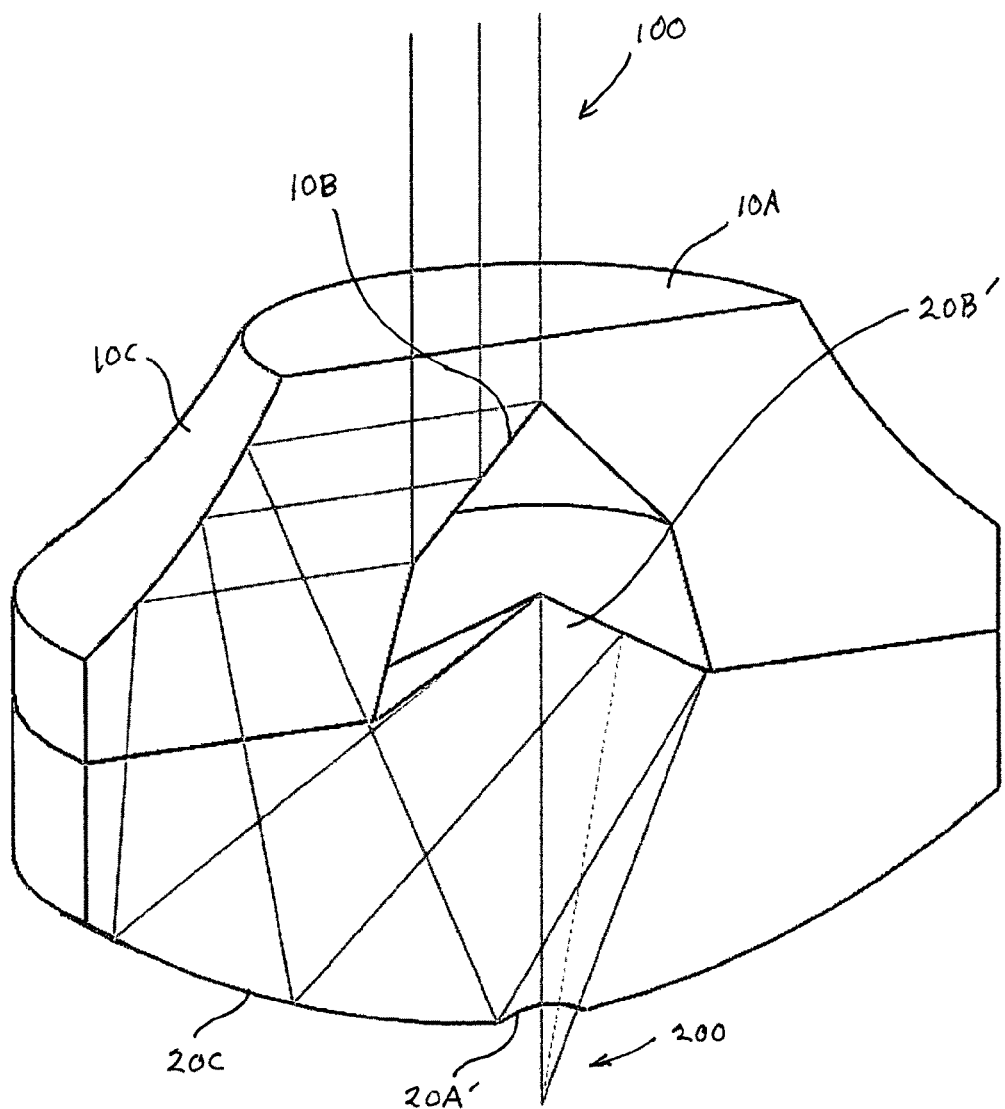
FIG. 11 provides a partially cut-away perspective side view of an internal reflaxicon system with concentric output interface and a concave second reflaxicon.
Figure 12:
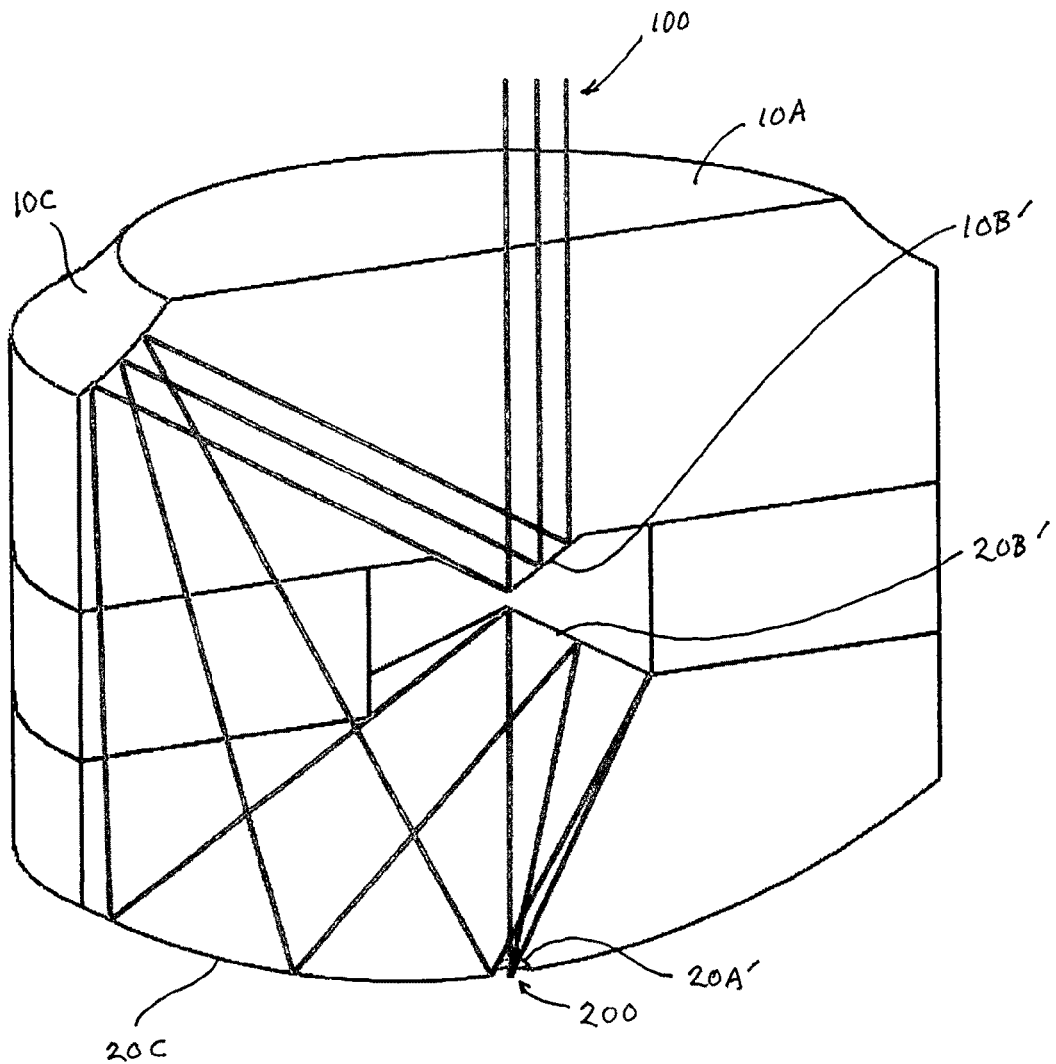
FIG. 12 provides a partially cut-away perspective side view of an internal reflaxicon system with concentric output interface using two concave reflaxicons.
Figure 13:
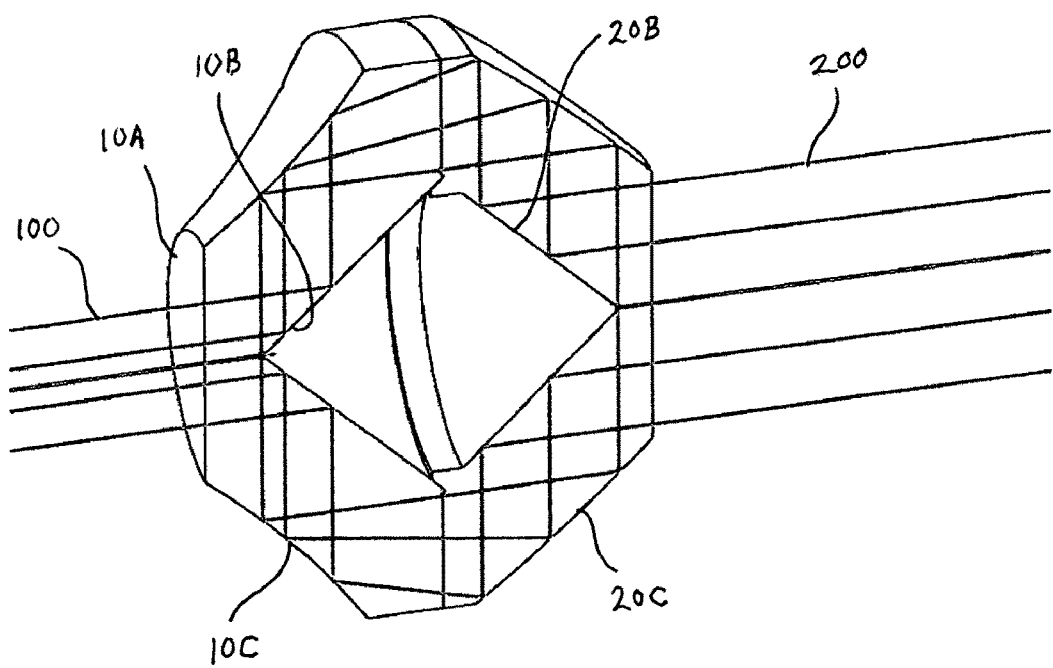
FIG. 13 provides a partially cut-away perspective side view of an internal reflaxicon system implemented for use as a beam expander including beam shaping.

The foregoing designs, while very extensive, by no means exhaust the possibilities of our invention. In this regard it should be noted that reflaxicon systems can, in accordance with the teachings of our invention, be implemented in forms in which either or both of the central conical reflective surfaces (heretofore variously referred to as surfaces 10B, 20B, 11B or 21B) can be inverted or "concave" (rather than "convex" as shown in the prior drawing figures) and that other changes to the baseline designs we have previously discussed can have specialized applications. In this regard, FIG. 11 provides a partially cut-away perspective side view of an internal reflaxicon system with a concave conical reflective surface 20B' and illustrates the light paths typical of this design. Likewise, FIG. 12 provides a partially cut-away perspective side view of an internal reflaxicon system using two concave central conical reflective surfaces 10B' and 20B' and illustrates the light paths typical of this design. In contrast to these, FIG. 13 provides a partially cut-away perspective side view of an internal reflaxicon system where the neither of the central conical reflective surfaces are reversed. However, in this embodiment the output surface 20A is planar (as the incident light thereon is parallel to collimated beam 100) and the design surface sags of the various reflective surfaces 10B, 10C, 20B, and 20C are chosen for use in allowing the reflaxicon system to function as a 2× beam expander including beam shaping (e.g. Gaussian light intensity profile to flat-top light intensity profile).

Having introduced the possibility of using concave central conical reflective surfaces 10B' and 20B' in our inventions, we must also note that such reflective surfaces are generally preferred because of their ease of construction. The convex-convex central cone configurations illustrated in, e.g, FIG. 9 is, in some respects, the easiest form to mass produce in that the negatives of the optical surfaces are created easily through Single Point Diamond Tuning (SPDT). Therefore, molds can be readily created that would allow many molded replications to be made of the spherical, aspherical and free-form surfaces thereof. However, creating prototypes of this type is difficult because creating the positive of the form requires a discontinuity at the apex of the convex reflective central conical surfaces (as their sharp points will, in reality, be compromised by the finite radius of the tip of the SPDT tool). Likewise, the hollow convex-convex form (as illustrated in, e.g., FIGS. 10A through 10D) is also readily fabricated through SPDT. Still, while it is conceivable that the parts comprising these systems could be molded, the mold would need to be the negative of the convex axicons and would again produce a compromised condition at the apex of the convex reflective central conical surfaces 11B and 21B. However, these problems can be avoided for both solid and hollow forms of our invention by the use of concave-concave central conical reflectors of the type illustrated in FIG. 12. This form lends itself to SPDT in the solid forms shown, and in the hollow form would lead itself to volume manufacturing through molding.

Figure 14A:
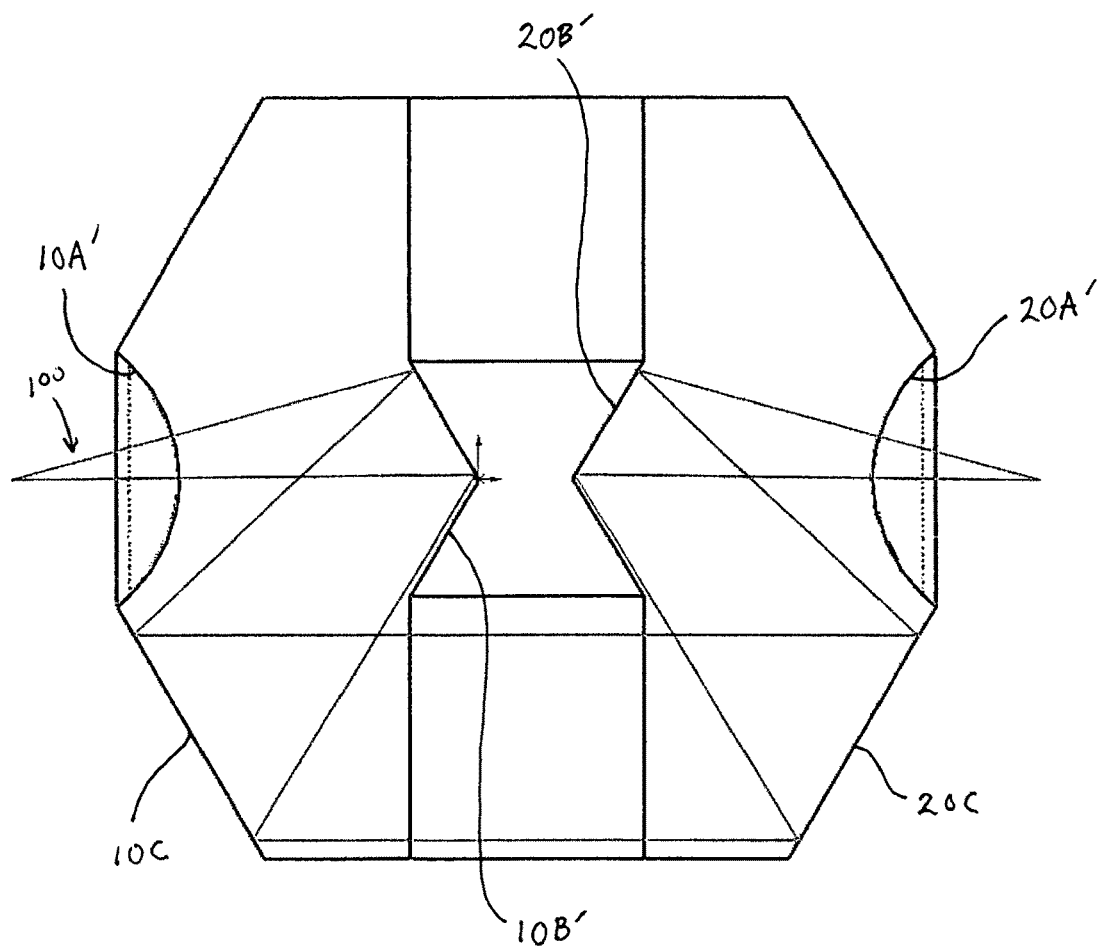
FIG. 14A provides a schematic side view of an internal reflaxicon system using two concave reflaxicons and with symmetric concentric input and output interfaces implemented for use as a relay.
Figure 14B:
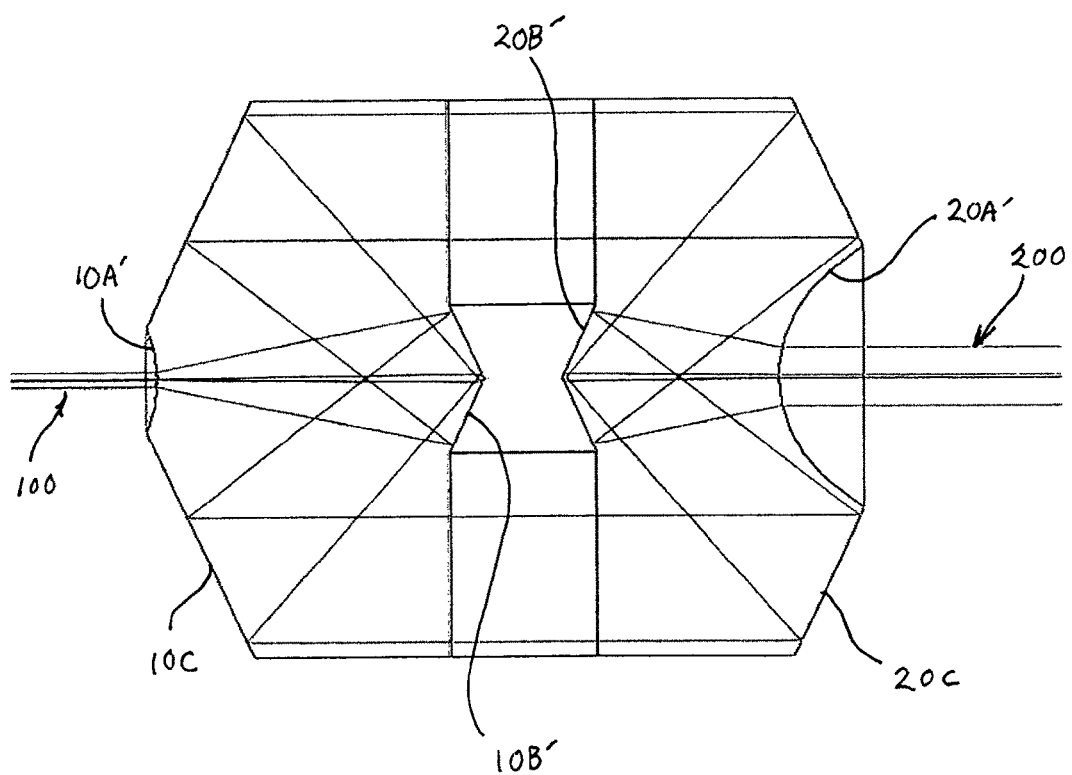
FIG. 14B provides a schematic side view of an internal reflaxicon system using two concave reflaxicons and with asymmetric concentric input and output interfaces implemented for use as a beam expander.
Figure 14C:
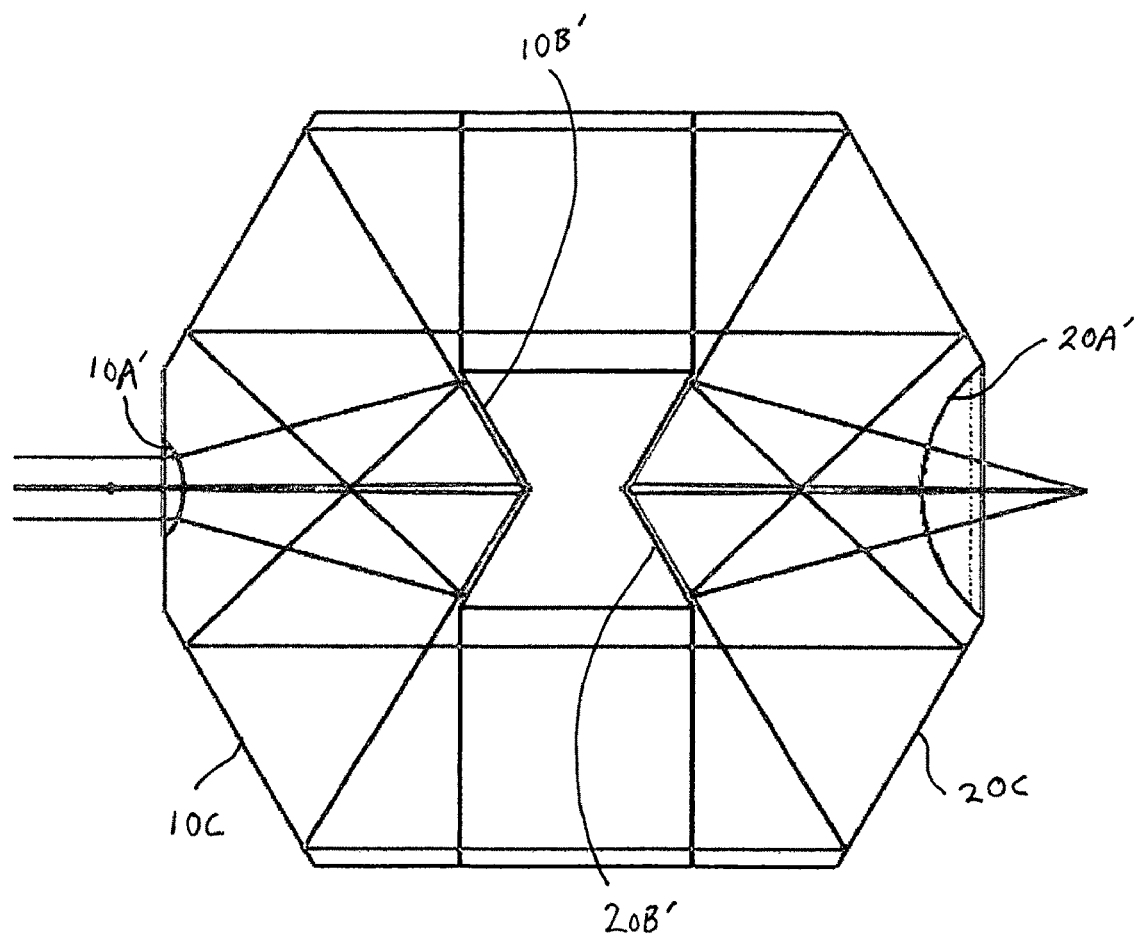
FIG. 14C provides a schematic side view of an internal reflaxicon system using two concave reflaxicons and with asymmetric concentric input and output interfaces implemented for use as a microscope objective.
Figure 14D:
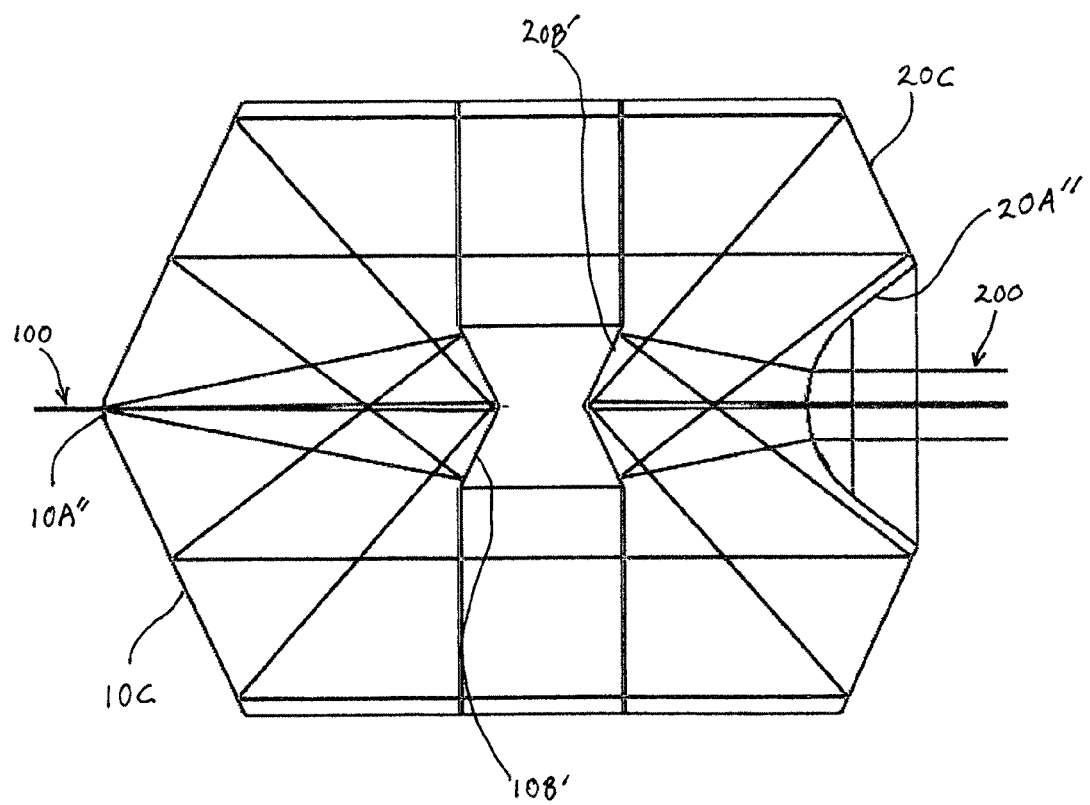
FIG. 14D provides a schematic side view of an internal reflaxicon system using two concave reflaxicons and with radically asymmetric concentric input and output interfaces implemented for use as a beam expander.

Further, in keeping with the prior discussion, FIGS. 14A, 14B and 14C provide further important examples of preferred embodiments where both of the central conical reflective surfaces 10B, and 20B are concave. FIG. 14A provides a schematic side view of an internal reflaxicon system using two concave reflaxicons and with symmetric concentric input and output interfaces implemented for use as a finite conjugate imaging relay. FIG. 14B provides a schematic side view of an internal reflaxicon system using two concave reflaxicons and with asymmetric concentric input and output interfaces implemented for use as a beam expander. FIG. 14C provides a schematic side view of an internal reflaxicon system using two concave reflaxicons and with asymmetric concentric input and output interfaces implemented for use as a microscope objective. FIG. 14D provides a schematic side view of an internal reflaxicon system using two concave reflaxicons and with radically asymmetric concentric input and output interfaces implemented for use as a beam expander. These figures also illustrate a technique where the reflective optical surfaces 10B, 10C, 20B, and 20C remain unchanged and only the incident surface 10A and the exiting surface 20A are adjusted to create very different optical systems. (The advantages and potential for cost savings in manufacturing and implementing designs of this type is self-evident).

Figure 15A:
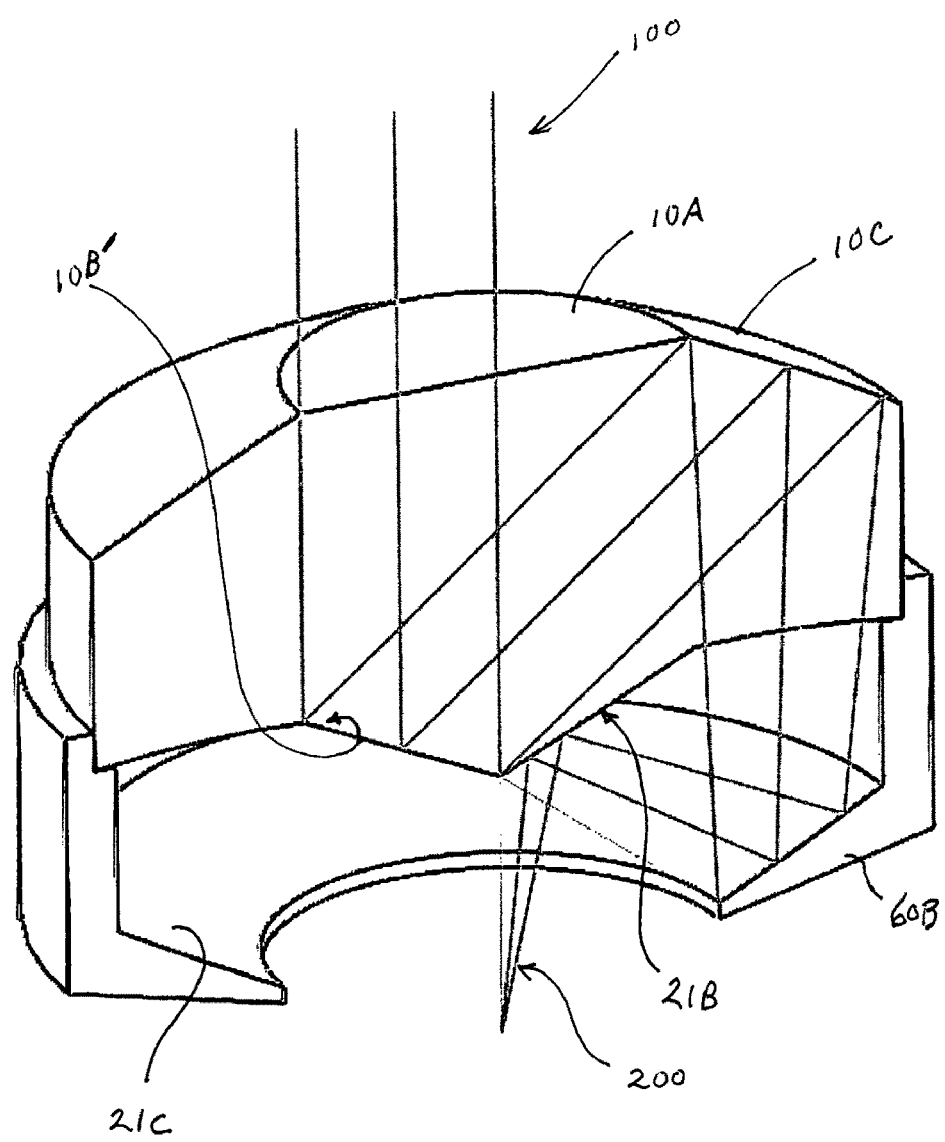
FIG. 15A provides a partially cut-away perspective side view of a reflaxicon system that combines both internal and external reflaxicons as well as using the same central cone as a convex reflector from one direction and a concave reflector from the other, with a solid upper half serving as an internal reflaxicon and having a concave central reflector surface coupled with a hollow lower half serving as an external reflaxicon having a convex central reflector surface.
Figure 15B:
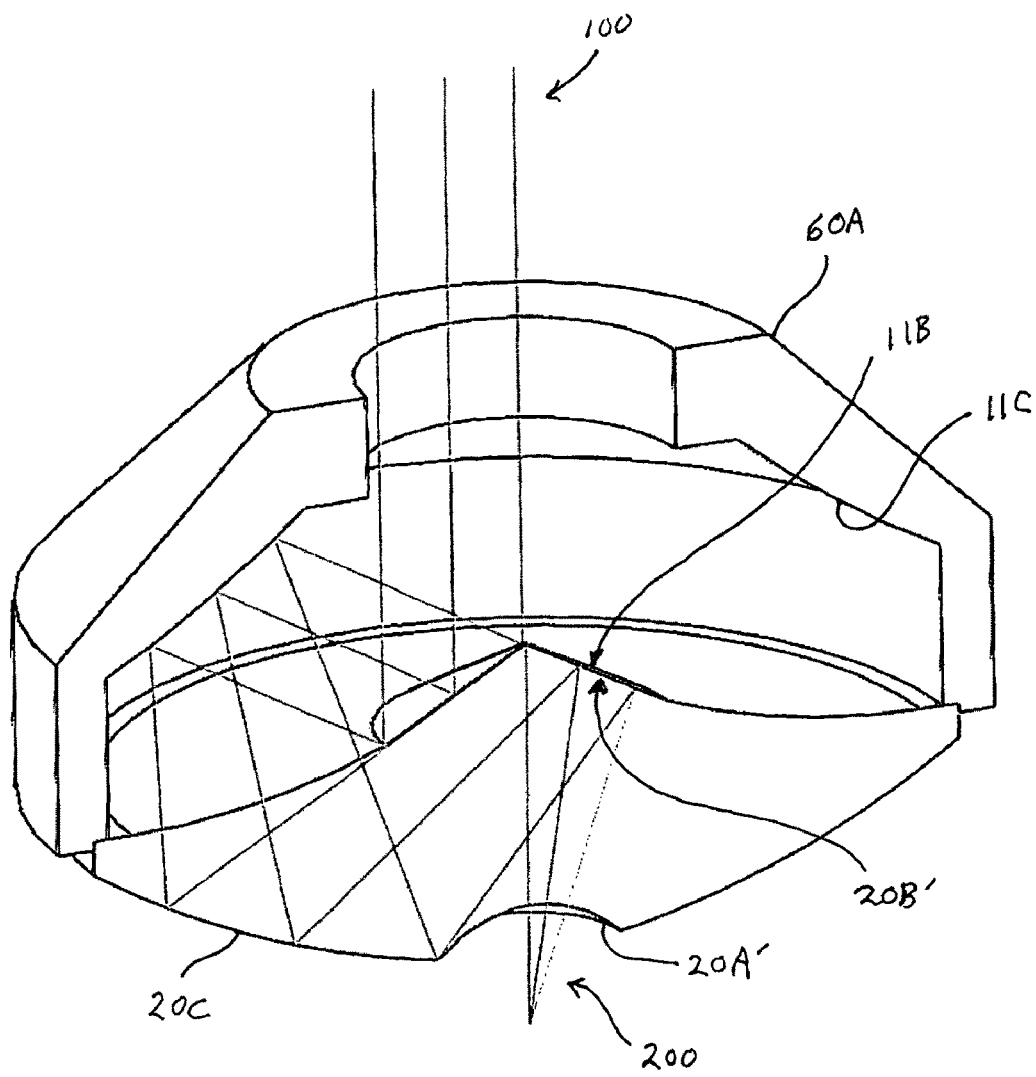
FIG. 15B provides a partially cut-away perspective side view of a reflaxicon system that combines both internal and external reflaxicons as well as using the same central cone as a convex reflector from one direction and a concave reflector from the other, with a hollow upper half serving as an external reflaxicon and having a convex central reflector surface coupled with a solid lower half serving as an internal reflaxicon having a concave central reflector surface.
Figure 16A:
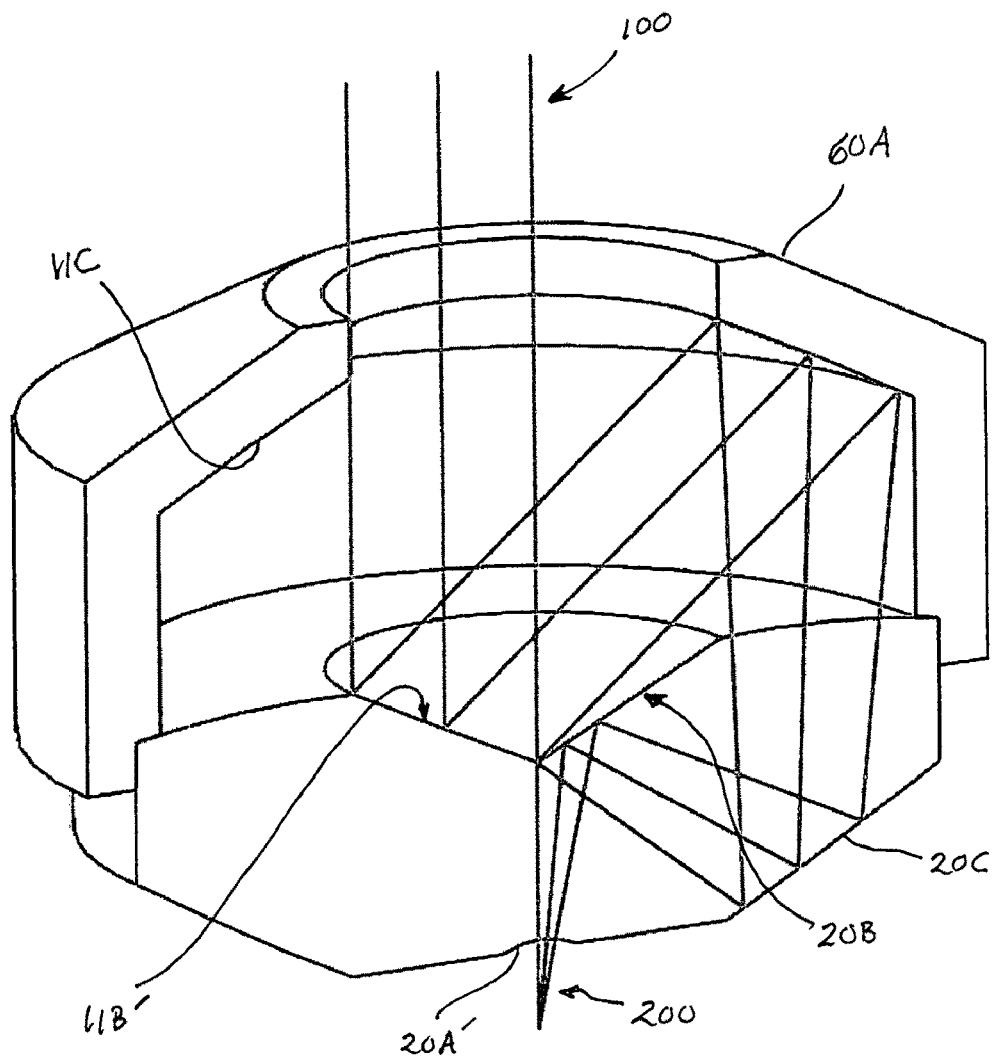
FIG. 16A provides a partially cut-away perspective side view of a reflaxicon system that combines both internal and external reflaxicons as well as using the same central cone as a convex reflector from one direction and a concave reflector from the other, with a hollow upper half serving as an external reflaxicon and having a concave central reflector surface coupled with a solid lower half serving as an internal reflaxicon having a convex central reflector surface.
Figure 16B:
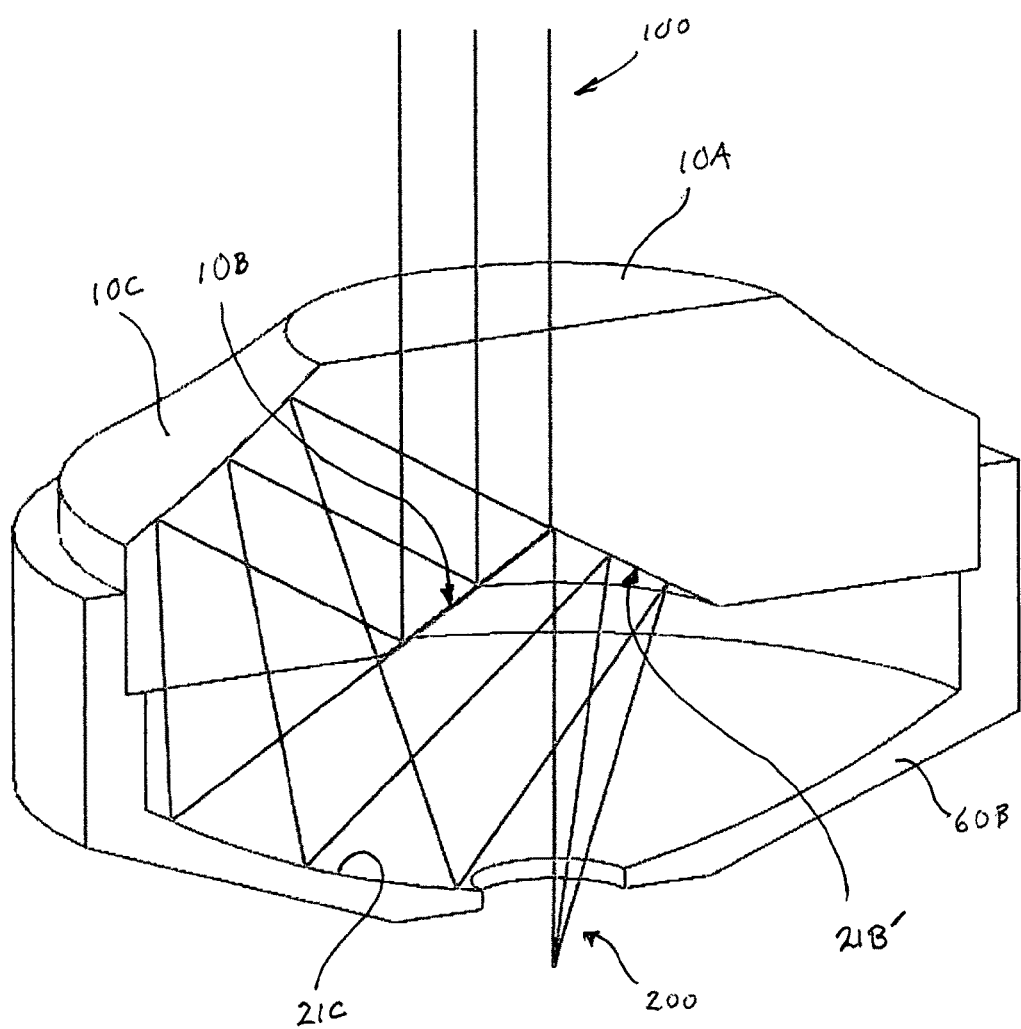
FIG. 16B provides a partially cut-away perspective side view of a reflaxicon system that combines both internal and external reflaxicons as well as using the same central cone as a convex reflector from one direction and a concave reflector from the other, with a solid upper half serving as an internal reflaxicon and having a convex central reflector surface coupled with a hollow lower half serving as an external reflaxicon having a concave central reflector surface.

In addition, FIGS. 15A through 18B provide examples of mixed systems which combine solid (internal) and hollow (external) reflaxicon systems. These systems are also unique in using the same central conical reflective surface as a convex reflective surface for one half of the system and as a concave reflective surface for the other half of the system. Turning to the drawing figures, it will be seen that FIGS. 15A and 15B provide views of a reflaxicon system that combines both an internal reflaxicon and an external reflaxicon, as well as using the same central cone as a convex reflector from one direction and a concave reflector from the other, with the hollow half serving as an external reflaxicon coupled with a solid half serving as an internal reflaxicon. It is also possible to change the reflector from convex to concave and vice versa in each of the embodiments illustrated in FIGS. 15A and 15B, as illustrated in FIGS. 16A and 16B, which provide views of reflaxicon systems that, once again, combine both internal and external reflaxicons and uses the same central cone as a convex reflector from one direction and a concave reflector from the other, but with the aforesaid change.

Figure 17A:
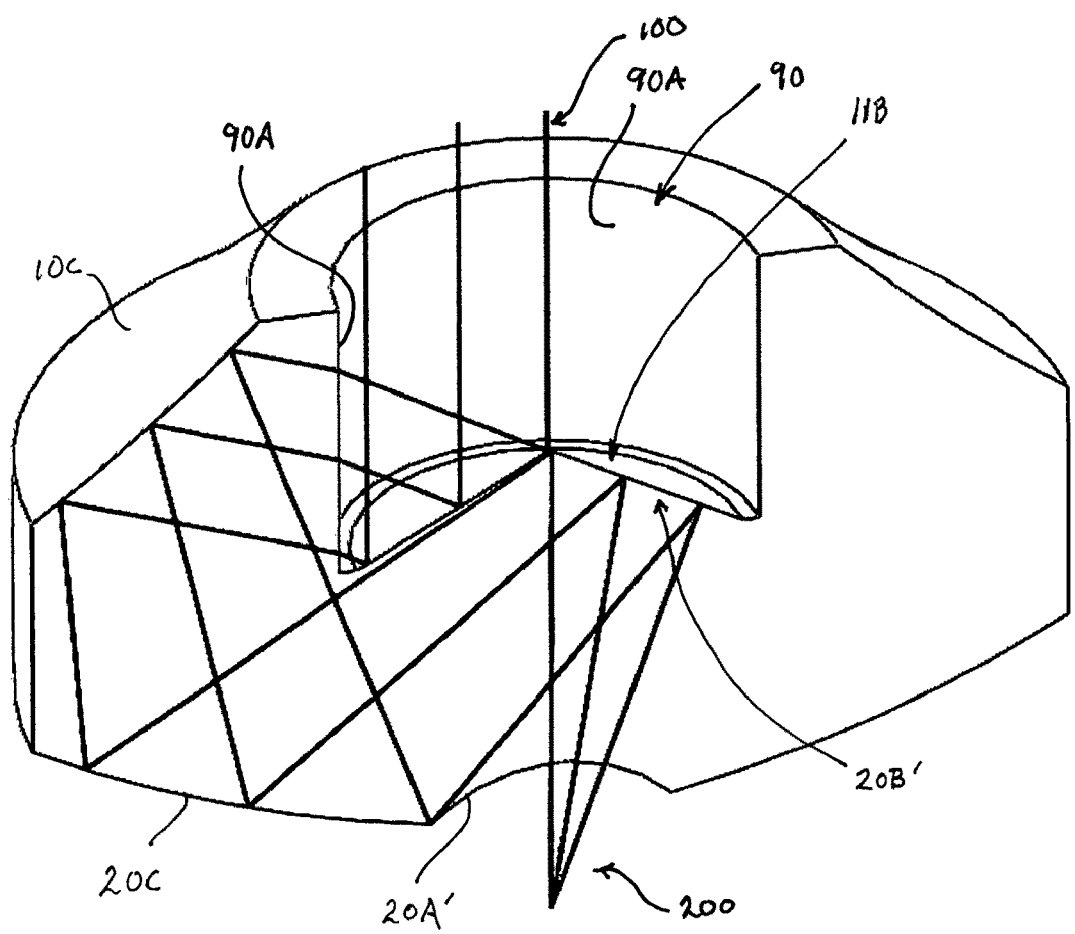
FIG. 17A provides a partially cut-away perspective side view of a first type of solid reflaxicon system using the same central cone as a convex reflector from one direction and a concave reflector from the other.
Figure 17B:
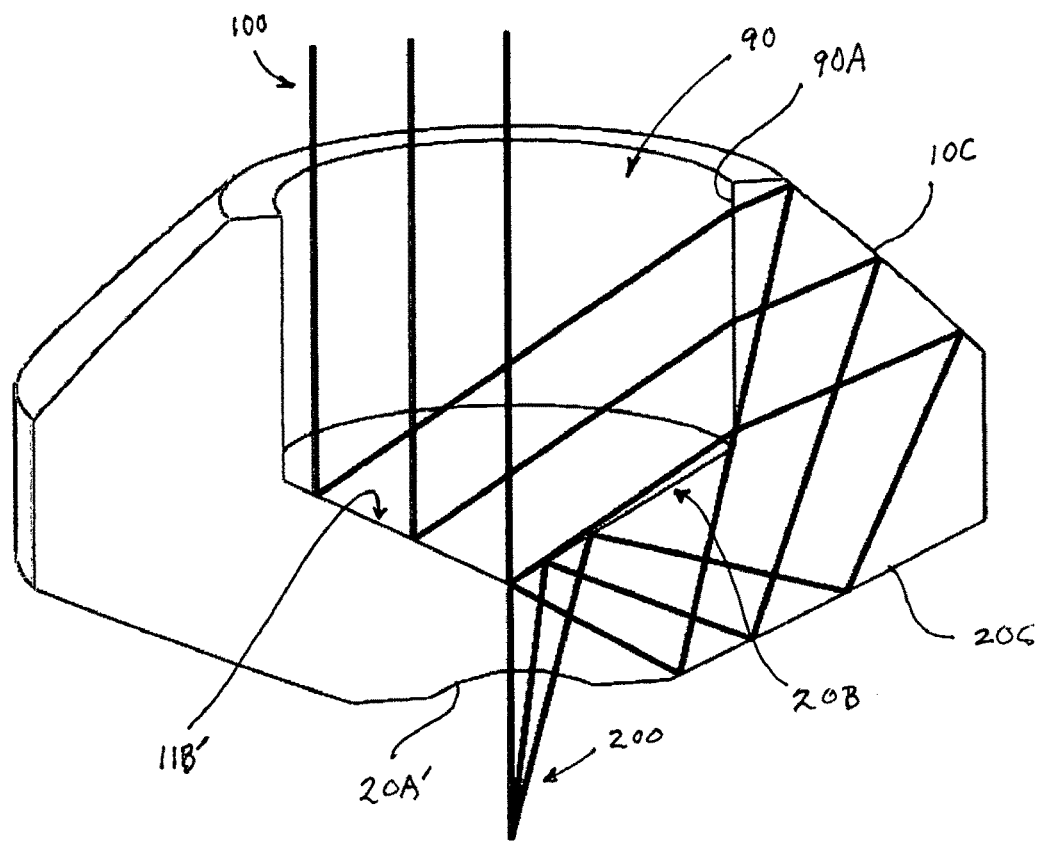
FIG. 17B provides a partially cut-away perspective side view of a second type of solid reflaxicon system using the same central cone as a convex reflector from one direction and a concave reflector from the other.
Figure 18A:
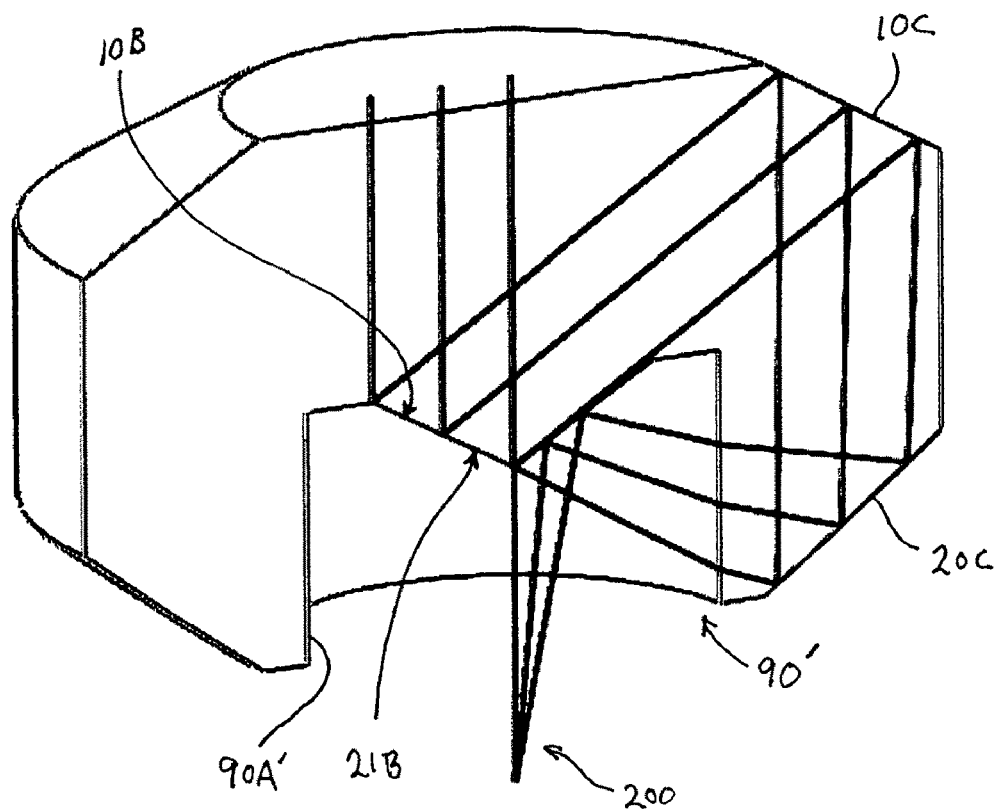
FIG. 18A provides a partially cut-away perspective side view of a third type of solid reflaxicon system using the same central cone as a convex reflector from one direction and a concave reflector from the other.
Figure 18B:
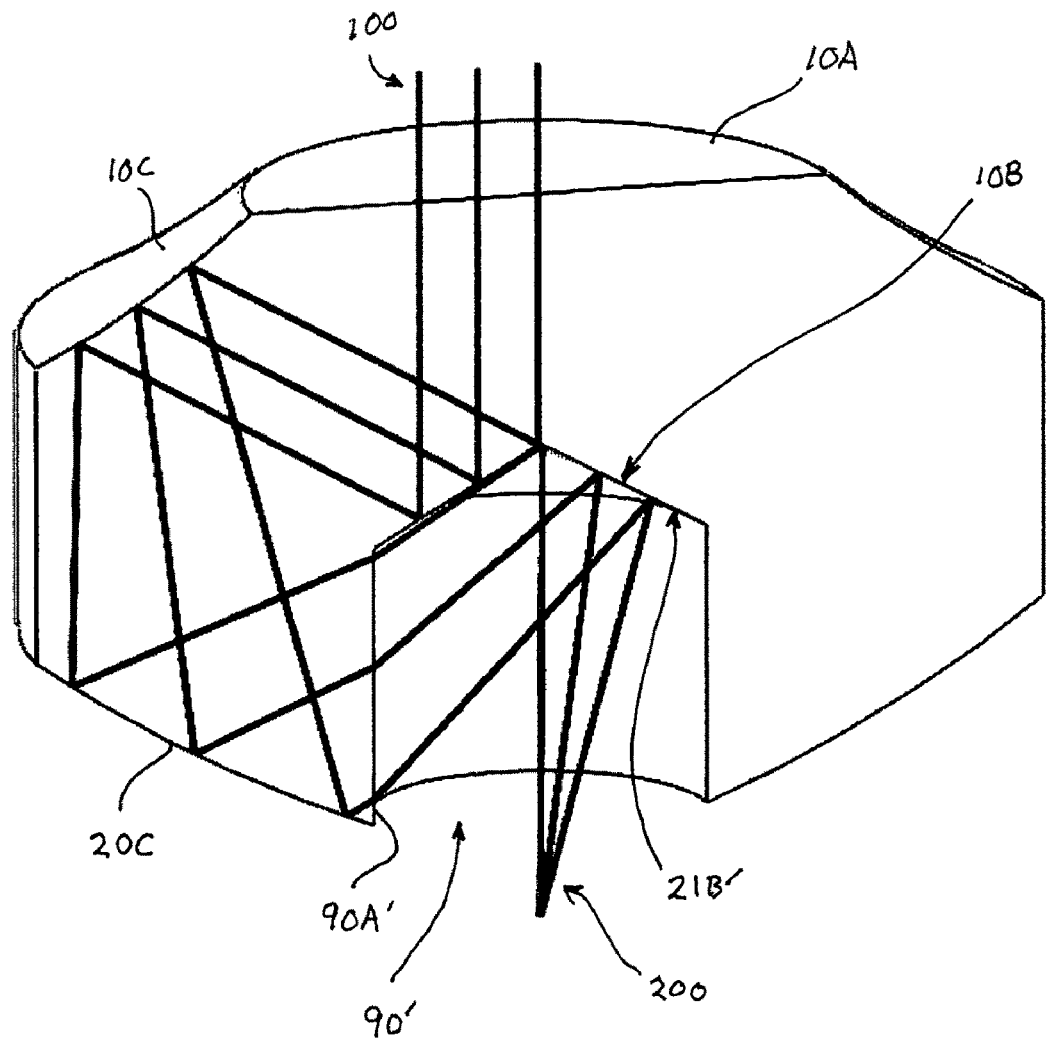
FIG. 18B provides a partially cut-away perspective side view of a fourth type of solid reflaxicon system using the same central cone as a convex reflector from one direction and a concave reflector from the other.
Figure 21A:
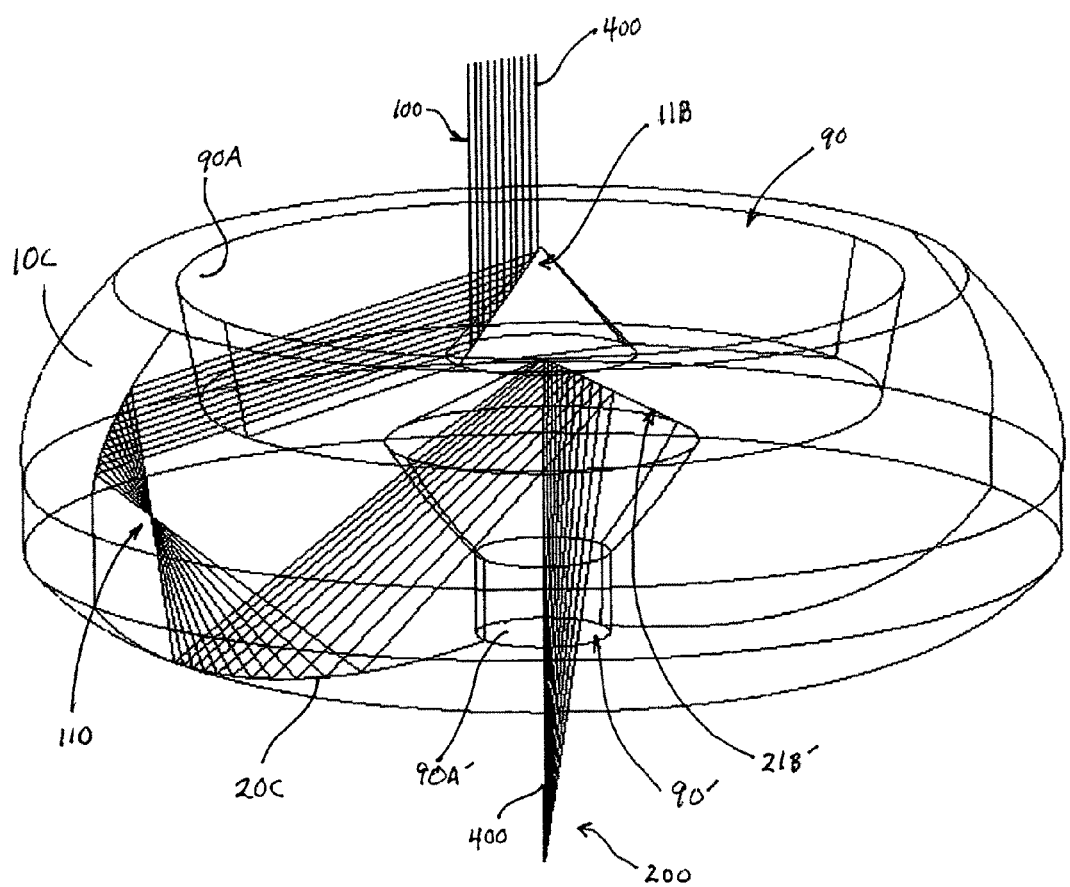
FIG. 21A provides a transparent schematic perspective of a reflaxicon system showing that the distribution of incoming rays is not necessarily conserved even when the ordering of the rays is.
Figure 21B:
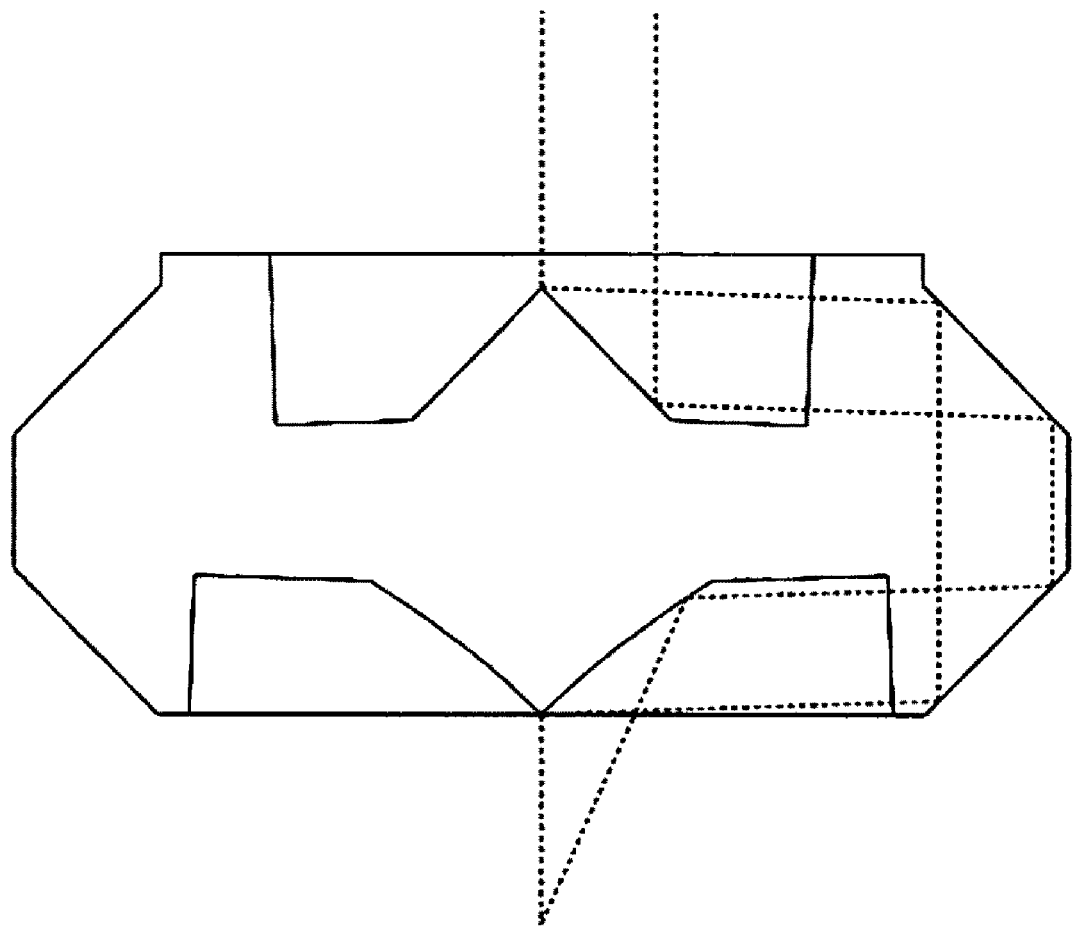
FIG. 21B provides a schematic cross-section of a reflaxicon system formed as one solid piece.

FIGS. 17A through 18B provide examples of complete paired reflaxicon optical systems comprising one solid element. (See, also, FIGS. 21A and 21B). Turning first to FIGS. 17A and 17B, it will be noted that (as with the prior examples) there are two reflaxicons incorporated into the reflaxicon systems illustrated in these figures, and as in the examples shown in FIGS. 16A and 16B, the central conical reflective surface 11B, 11B', 20B, 20B' is used as both a concave (e.g., 11B', 20B') and convex (e.g., 11B, 20B) reflector. Another feature of these embodiments is an incident central well 90 on the incident side of the solid reflaxicon system surrounding the central conical reflective surfaces 11B, 11B', 20B, 20B' with side walls 90A. After the first reflection from the central conical section 11B, 11B', refraction occurs when light enters the medium at side walls 90A. The refractive face (i.e., 90A) could be made to be normal to the incident light and therefore the design would stay fundamentally free of chromatic effects. (See, e.g., FIGS. 21A and 21B). While molding may place some restrictions on the forms that can be produced, FIG. 21B illustrates a one piece design that is generally compatible with molding techniques. Further, as with the other examples shown, the form could be adjusted to serve other optical functions such as a beam expander or relay lens. FIGS. 18A and 18B and 21 share the one piece design of FIGS. 17A and 17B but 18A and 18B show an exiting central well 90' with a refractive interface 90A' where transition from inside to outside the optical medium occurs before the final reflection from the central, conical surface 21B, 21B'. (See, also, FIGS. 21A and 21B for an embodiment having both incident and exiting central wells 90, 90' though the reflaxicons do not share the same central cone).

Figure 19A:
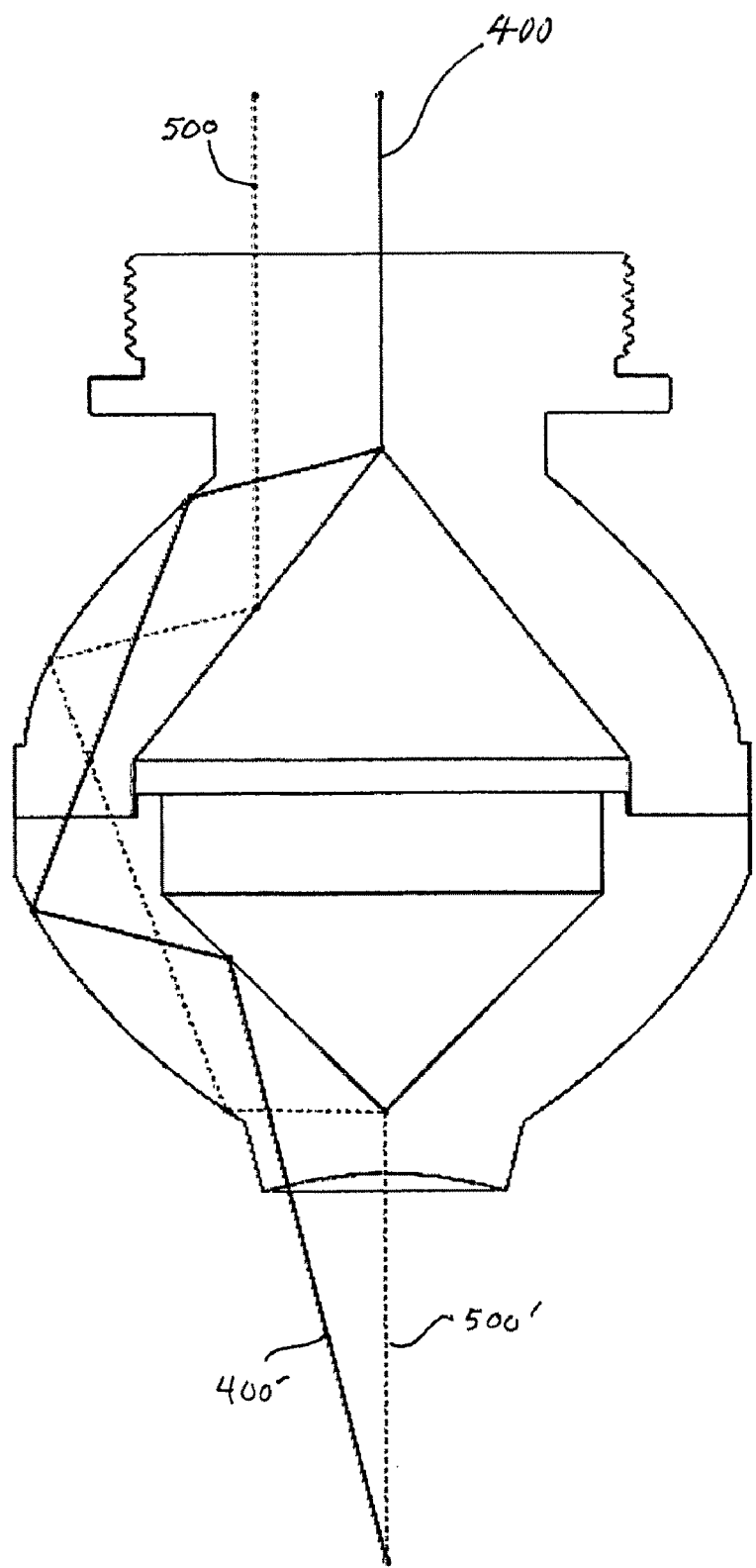
FIG. 19A provides a schematic cross-section of a reflaxicon system designed so that the incident chief ray exits as the marginal ray and vice versa.

One byproduct of the use of reflaxicons in the optical systems presented is often the redistribution or re-ordering of the incident optical energy. In FIG. 19A, by convention, an incident ray that is coincident with the optical axis 300 is referred to by those skilled in the art as the "chief ray" 400. An incident ray that is parallel with the optical axis, but located at the perimeter of the incident beam in object space, is referred to as the "marginal ray" 500. With reflaxicon forms it is possible to intentionally invert the roles of these two key rays. The incident chief ray 400 exits as the exiting marginal ray 400'; the incident marginal ray 500 exits as the exiting chief ray 500'. This inversion is determined by the number of times the two rays cross either each other or the centerline of the optical system. If the sum of these occurrences is an even number, then their positions from entrance to exit will be conserved. (See, e.g., FIG. 10A). However, if the sum of these occurrences is an odd number, the ray that was the incident chief ray 400 to the system will exit as an exiting marginal ray 400' and the incident marginal ray 500 will exit as the exiting chief ray 500'. (See, e.g., FIG. 19A, which illustrates a reflaxicon system in the form of a two piece solid form that is designed to utilize total internal reflection and therefore does not require coatings). In general the rays will cross due to a reflection or an internal focus.

Figure 19B:
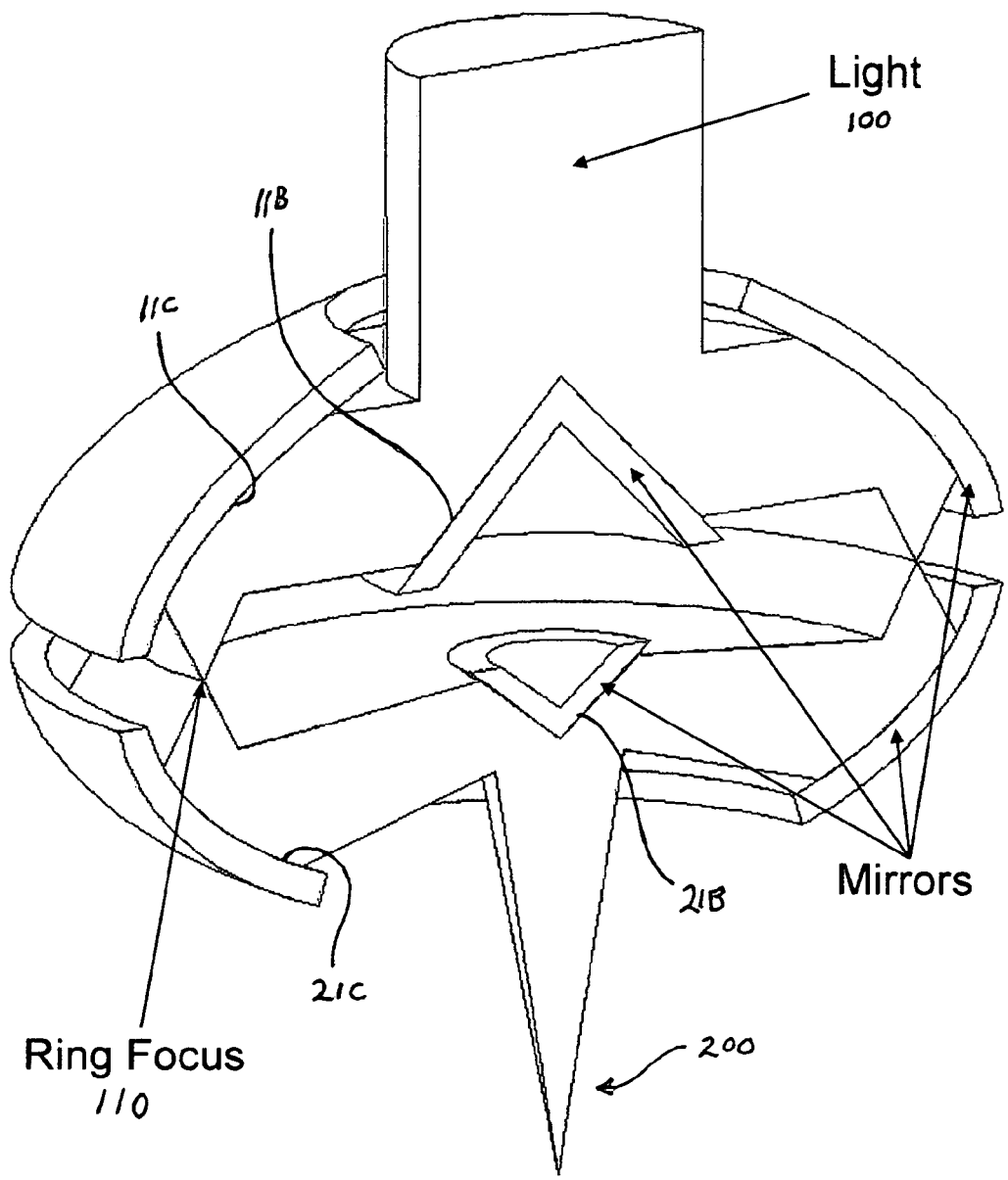
FIG. 19B provides a partially cut-away perspective side view of a reflaxicon system designed so as to create a ring focus between the second and third reflections.

In addition to the forms already discussed it is possible to create a ring focus with any of the reflective surfaces within the system. FIG. 19B shows a ring focus between the second and third reflections. The creation of this ring focus can serve as a powerful design tool because it allows the system to be broken into individual portions separated by the focus. The portions can then be individually optimized for a specific function. As with earlier constructions, reflaxicon pairs with one or more internal ring foci can be constructed as hollow or solid forms and the conical surfaces can be either concave or convex. Also, as with the previous constructions, it is possible to construct a form with an internal ring focus where the center conical surface is used once as a convex cone and a second time as a concave cone. Furthermore, any of the reflective or refractive surfaces can be further tailored through the manipulation of the higher order aspheric deformation terms to achieve other desired optical characteristics.

Figure 20:
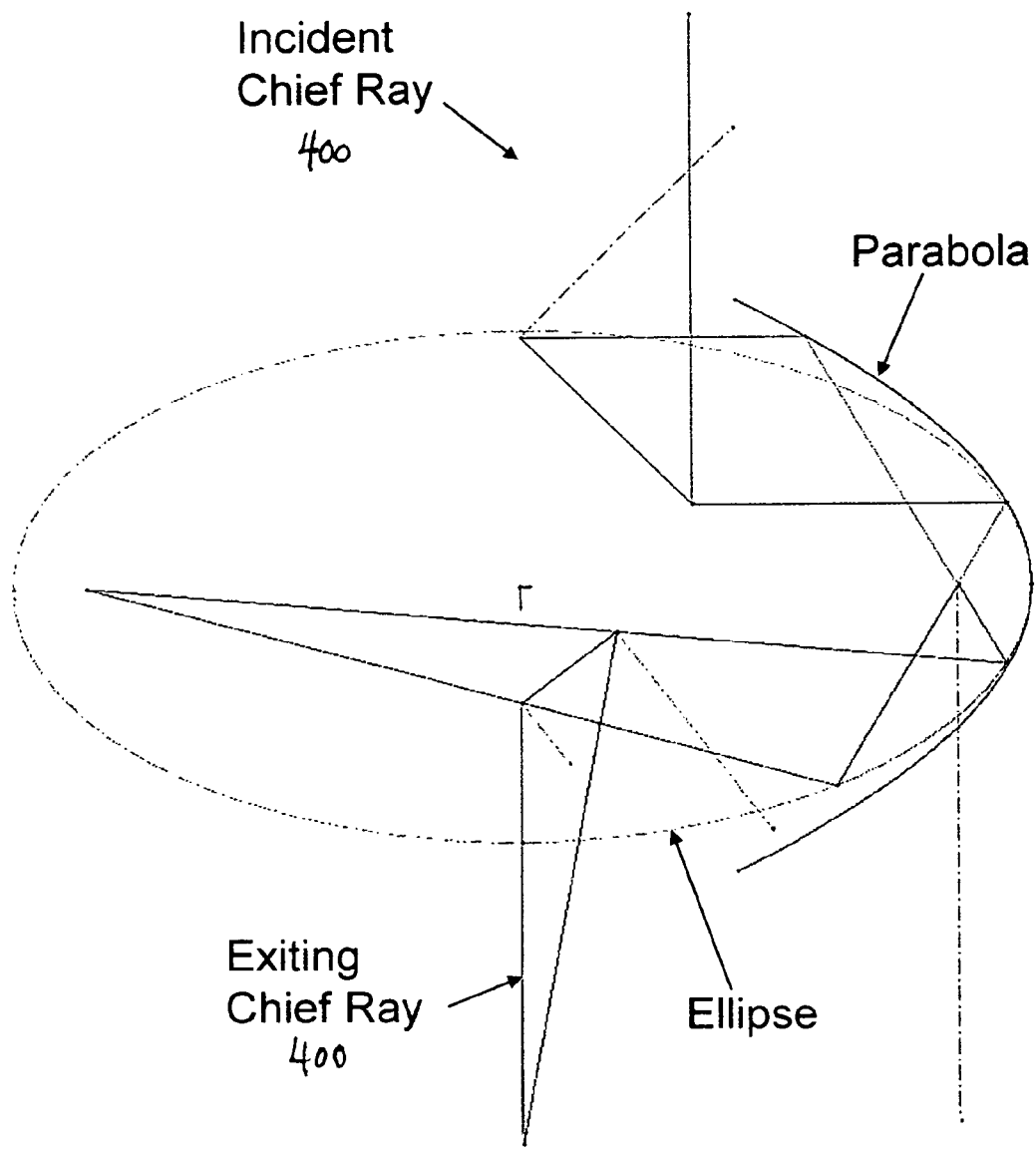
FIG. 20 provides a schematic cross-section of the interrelated geometric forms (well understood in reflective optical systems such as parabolas and ellipses) that are fundamental to the design of a reflaxicon system in accordance with out invention.

When designing a reflaxicon based optical system it is possible to design it in two dimensions as a traditional system. For the purposes of laying out an obscuration free reflaxicon based system, the incident chief ray must be collinear with the exiting chief ray. Once the reflective system has been constructed in two dimensions it can be revolved around an axis coincident with the chief ray to form an axially symmetric system with zero obscuration. Of course the design of the reflective surfaces must be done with this revolution in mind in order to end up with suitable geometry that does not vignette or otherwise obscure any of the light rays. As illustrated in FIG. 20, the design of paired reflaxicon systems in this manner suggests the use of conic sections such as parabolas and ellipses whose properties are well understood in reflective optical systems. Such design philosophy permits obtaining suitable starting designs for further optimization for the specific application.

FIG. 21A shows that the distribution of the incoming rays is not necessarily conserved, even when the ordering of the rays is. In this figure, which provides an example of a complete reflaxicon system symmetrically disposed around an optical axis and comprising one solid element, the chief ray position is maintained but the light rays are not evenly distributed within the focused light, despite the fact that incident light was spatially evenly distributed. The concentration in the distribution follows the incident chief ray for these parabolic/ellipsoidal ring focus forms. Therefore, if the incident chief ray exits as the chief ray, there is a concentration of the light around normal incidence. If the incident chief ray exits as the marginal ray the light rays will be concentrated towards the larger angles of incidence.

Figure 22:
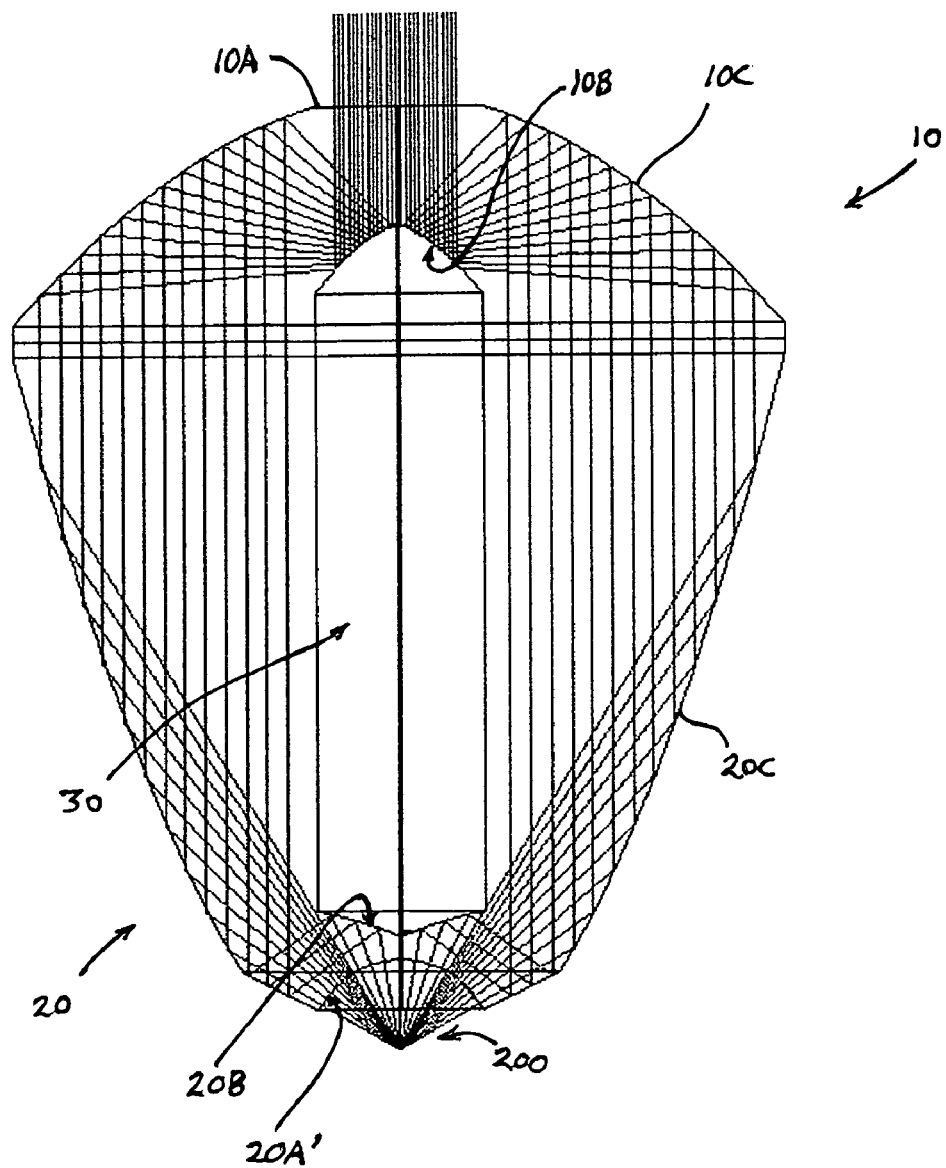
FIG. 22 provides a schematic cross-section illustrating a reflaxicon system where the light rays of the central portion of the numerical aperture follow one path through the system while the light rays from the outer numerical aperture follow a different path and utilize some number of different optical systems.
Figure 23:
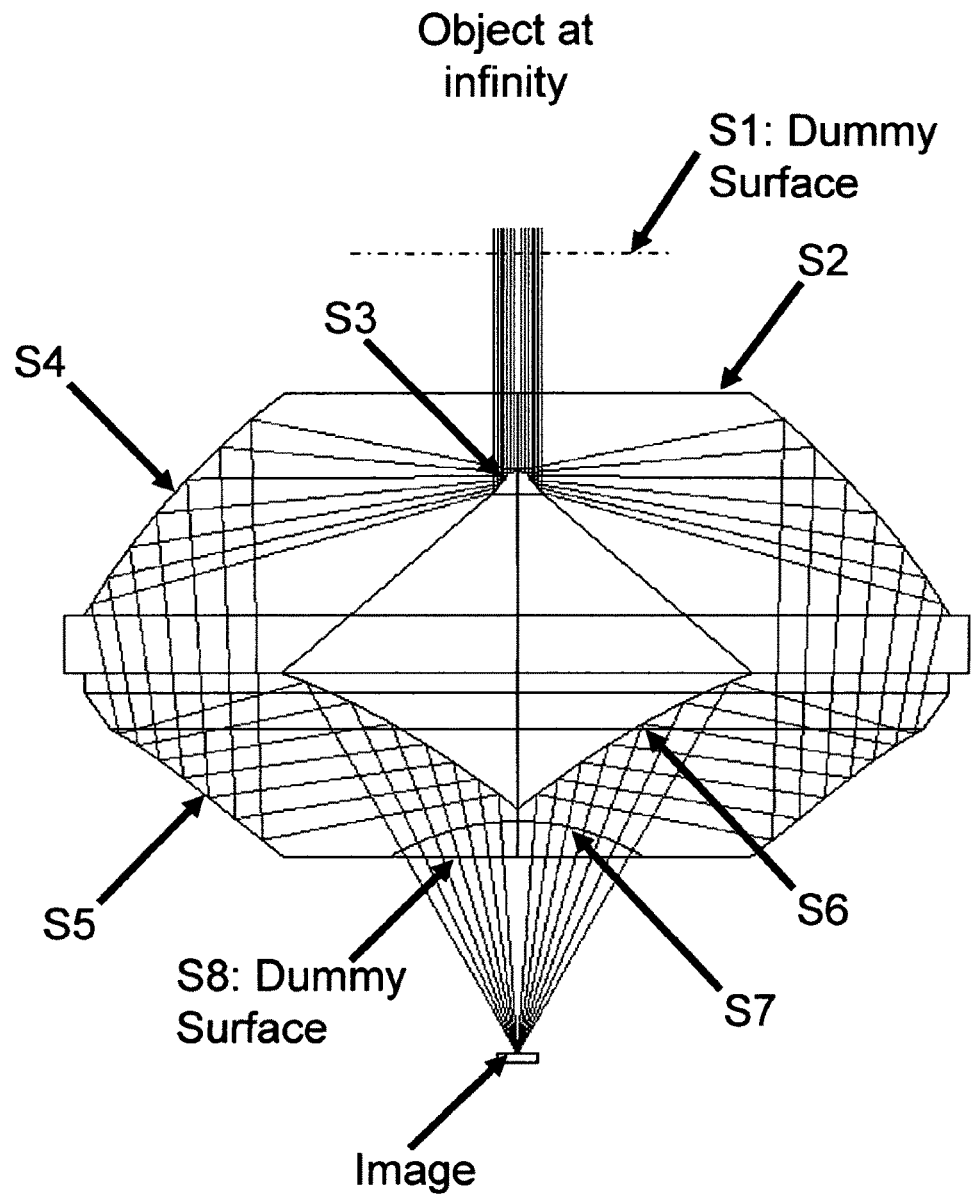
FIG. 23 provides a schematic illustration with relevant surfaces denoted S1-S8, and is presented as a reference for use in interpreting FIGS. 24A, 25A, 26A, 27A and 28A.
Figure 24B:
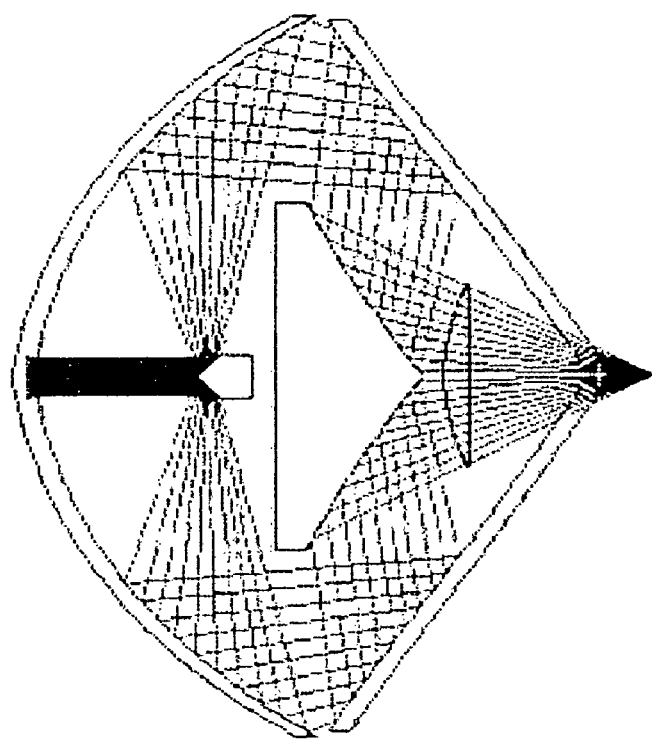
FIG. 24B provides schematic illustrations of hollow and solid reflaxicon systems produced in accordance with the technical details supplied in FIG. 24A.
Figure 24B:
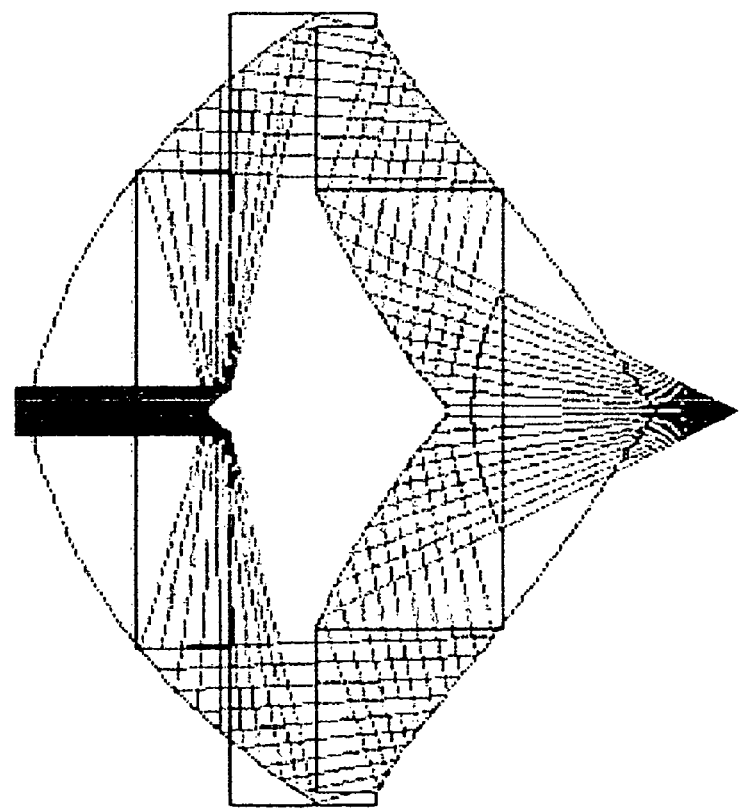
Figure 25B:
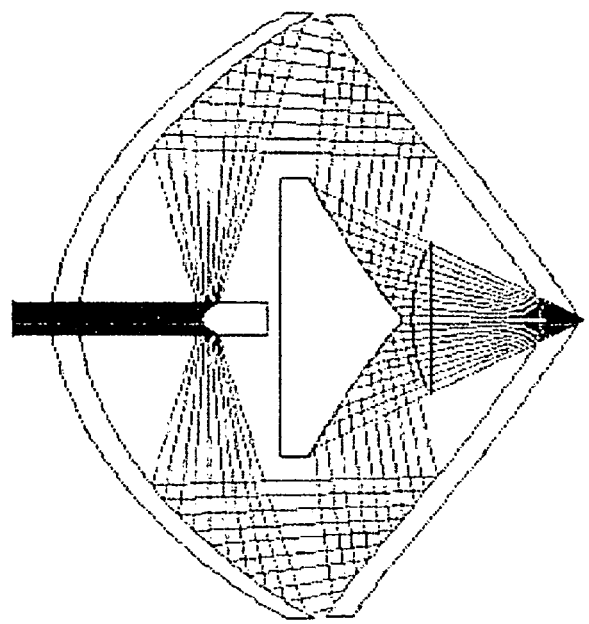
FIG. 25B provides schematic illustrations of hollow and solid reflaxicon systems produced in accordance with the technical details supplied in FIG. 25A.
Figure 25B:
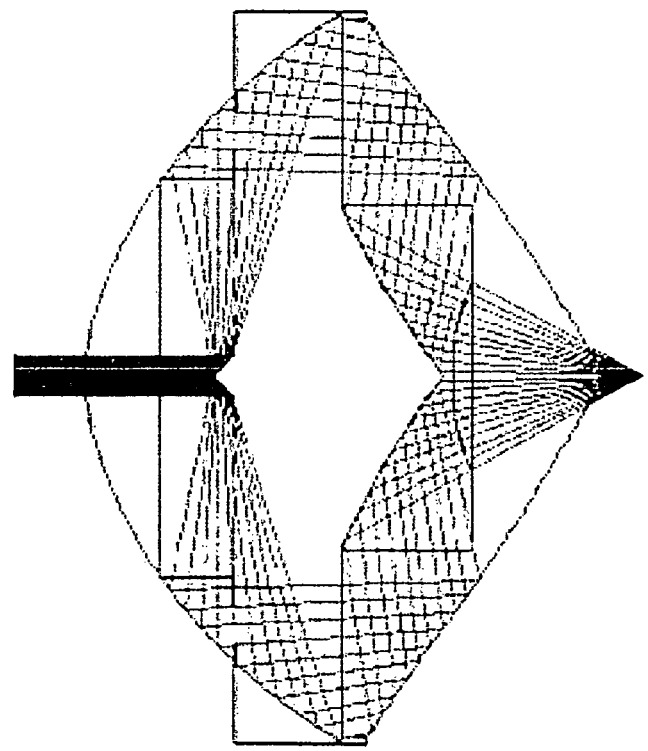
Figure 26B:
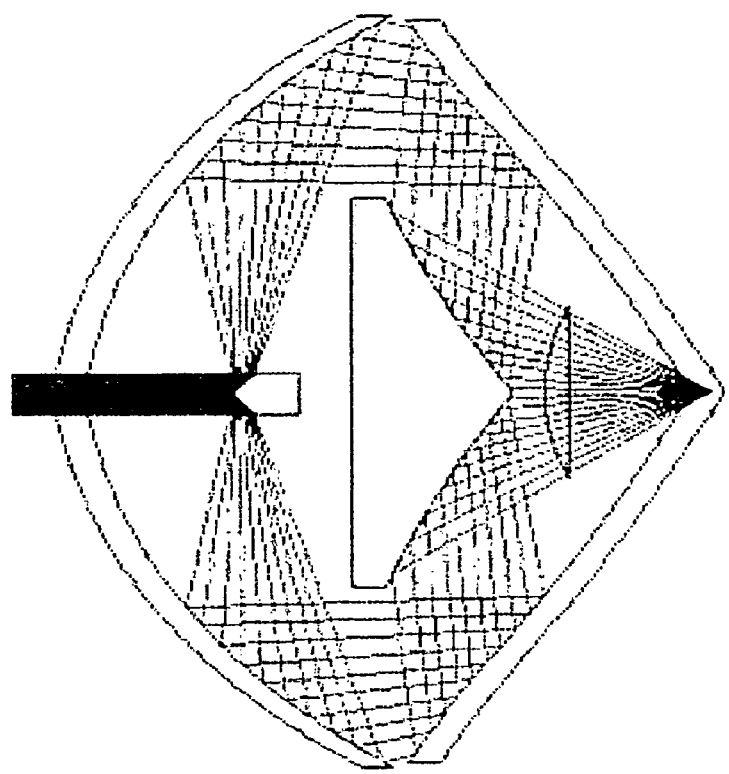
FIG. 26B provides schematic illustrations of hollow and solid reflaxicon systems produced in accordance with the technical details supplied in FIG. 26A.
Figure 26B:
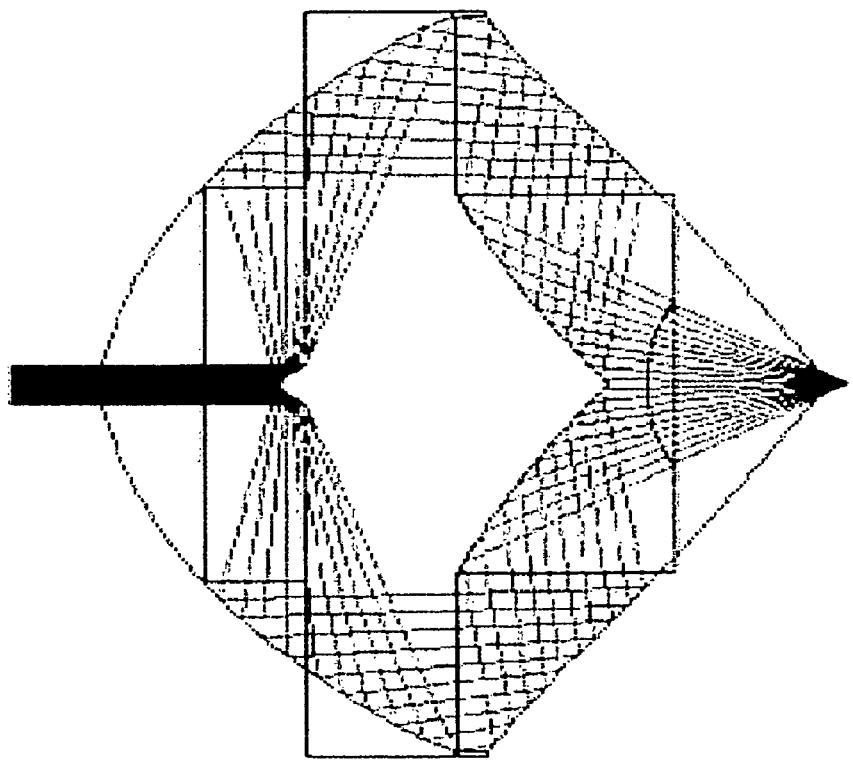
Figure 27B:
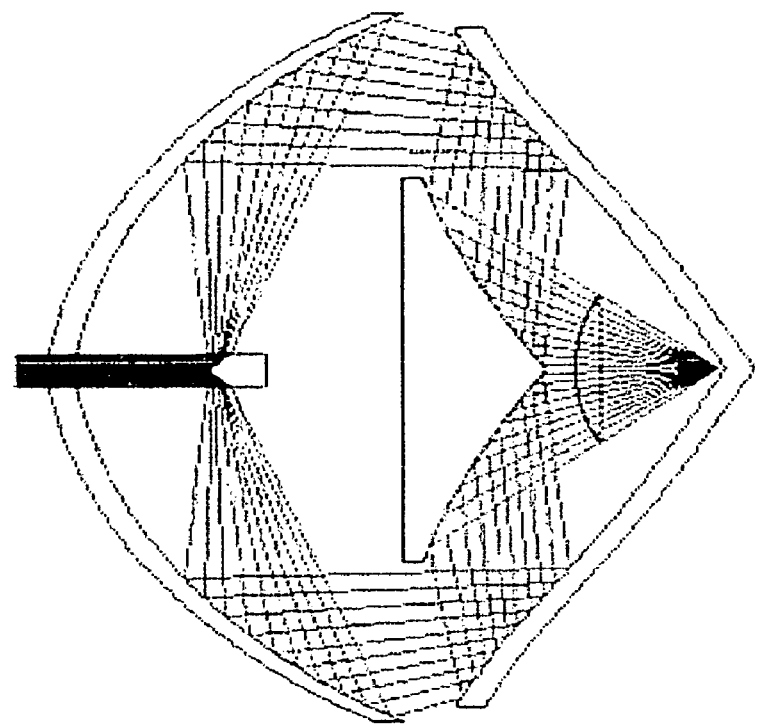
FIG. 27B provides schematic illustrations of hollow and solid reflaxicon systems produced in accordance with the technical details supplied in FIG. 27A.
Figure 27B:
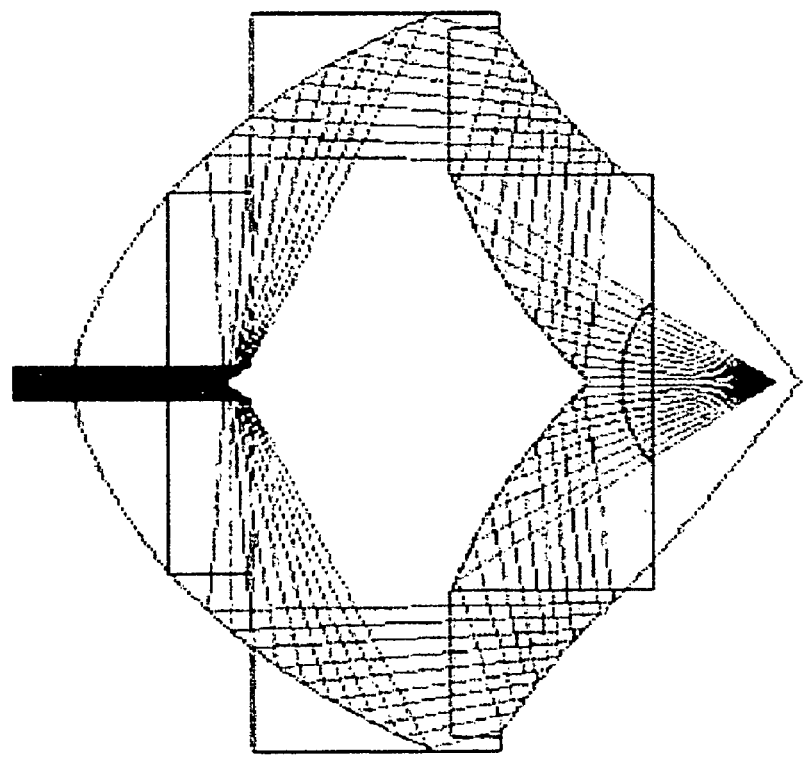
Figure 28B:
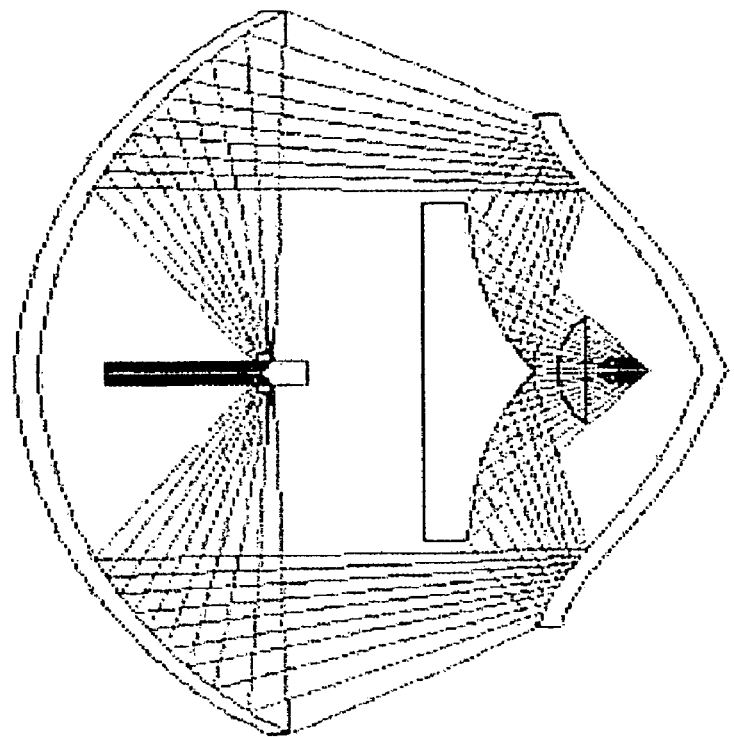
FIG. 28B provides schematic illustrations of hollow and solid reflaxicon systems produced in accordance with the technical details supplied in FIG. 28A.
Figure 28B:
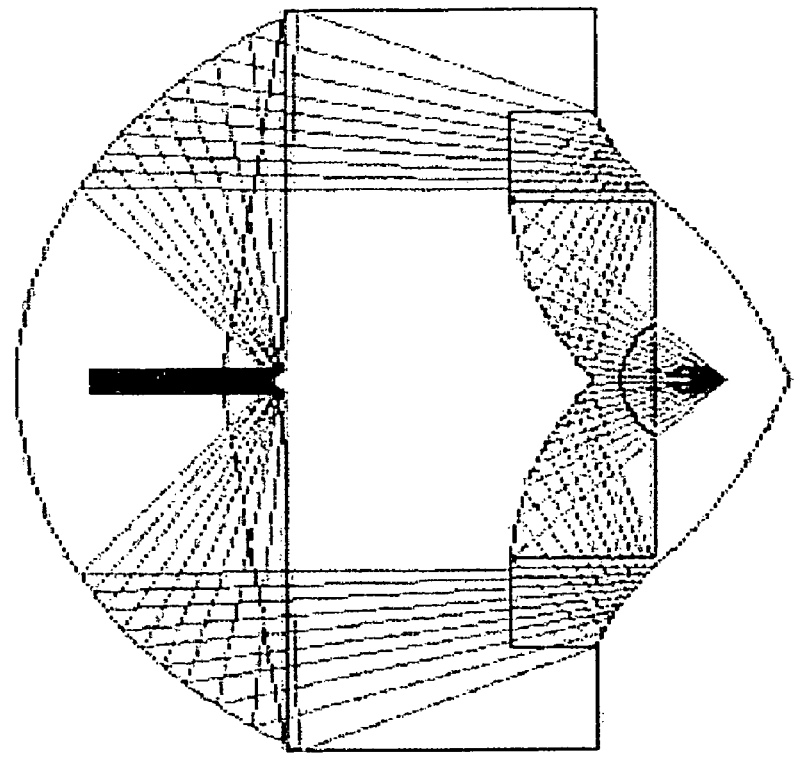

FIG. 22 shows an optical system where the light rays of the central portion of the numerical aperture follow one path through the system while the light rays from the outer numerical aperture follow a different path and utilize some number of different optical systems. All rays are reflected from surfaces 10B and 10C. The central ray path is defined by those rays reflecting first off of 20D and subsequently reflecting off of 20B. The outer ray path is defined by those rays reflecting off of surface 20C and subsequently bypassing surface 20D. Consequently, this figure serves to illustrate the great flexibility of these system forms and shows that multiple optical paths can exist within a single paired reflaxicon optical system.

Figure 29A:
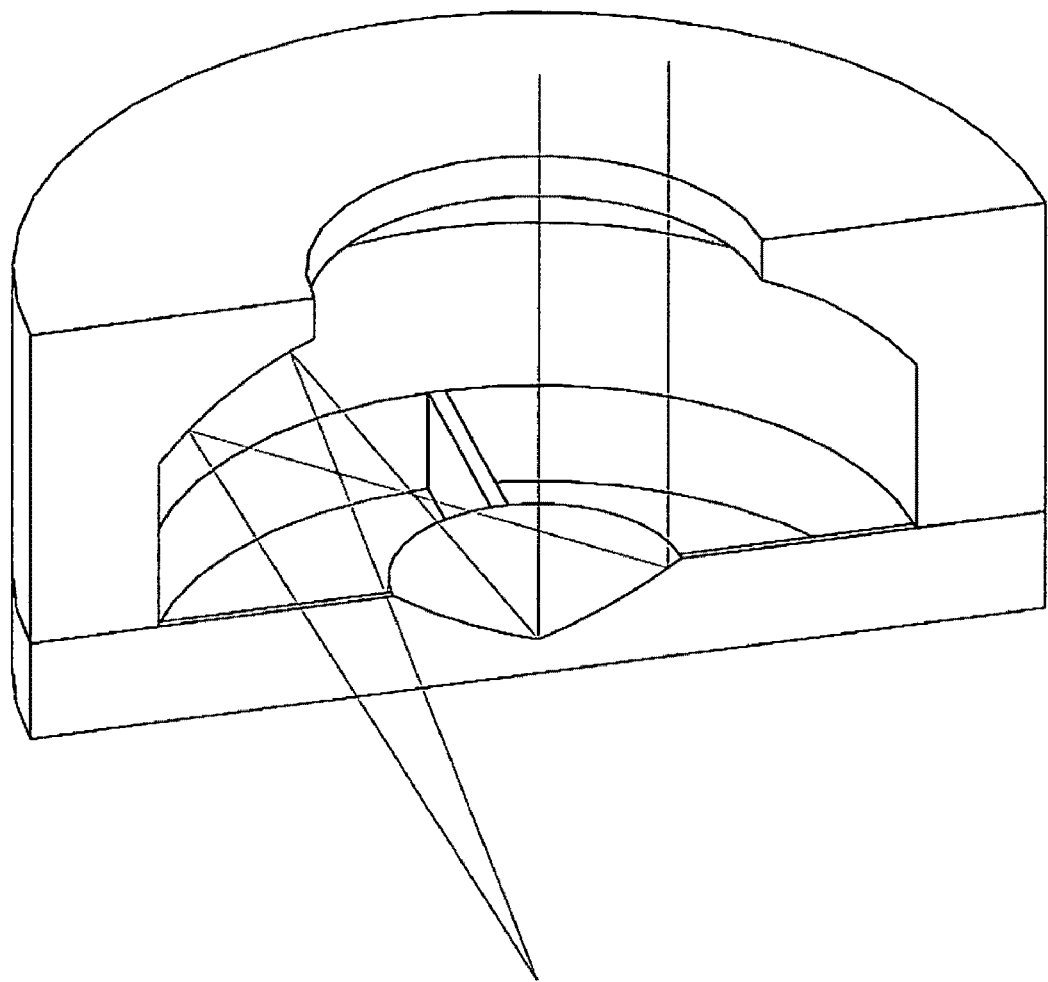
FIG. 29A provides a schematic illustration of a two piece hollow reflaxicon system which provides a theoretical 100% transmission but still has a central occlusion in the converging exit beam.
Figure 29B:
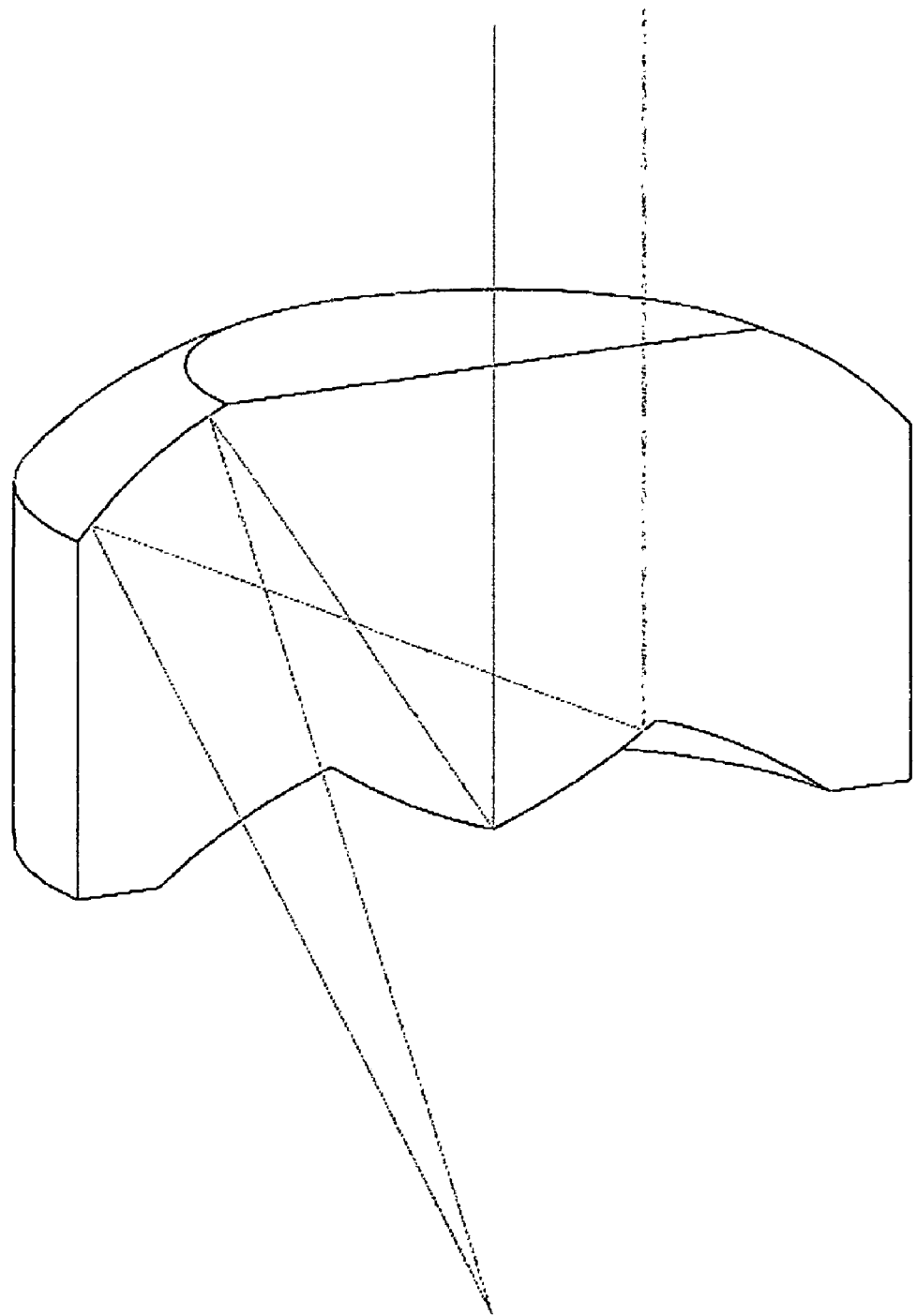
FIG. 29B provides a schematic illustration of a one piece solid reflaxicon system which provides a theoretical 100% transmission but still has a central occlusion in the converging exit beam.

As has been previously discussed, besides designing a reflaxicon system to be deliberately theoretically 100% obscuration-free, it is directly possible to advertently design a non-zero amount of obscuration into a system, while still maintaining a 100% theoretical transmission throughput. It could be considered as a central occlusion in the converging exit beam. Such a feature may be advantageous from an optical performance standpoint but without the typical loss in transmission common to prior art obscured all-reflective or catadiptric systems. If a central occlusion is desired, our reflaxicon systems may alternatively be simplified by using only the first reflaxicon incident portion 10. This is illustrated in FIGS. 29A and 29B, which show a two piece hollow reflaxicon system and a one piece solid reflaxicon system. Both provide a theoretical 100% transmission but still have a central occlusion in the converging exit beam. In the case of these single first reflaxicons, there is a minimum diameter central occlusion which can not be reduced, which is analogous to the inherent minimum central obscuration of centered all-reflective or catadioptric prior art designs.

The numerous embodiments illustrated can be fabricated in either tightly toleranced or loosely toleranced versions of a given nominal design. For tightly toleranced versions, the fabrication method of choice would be to SPDT the optic directly. For hollow reflaxicon systems, the materials of choice would be any diamond turnable metal (aluminum, copper, nickel), but preferrably a nickel coated material would provide the smoothest surface finish. Post polishing using a variety of mechanical, chemical, or electro polishing methods could be employed to further smooth the diamond turned surface to Angstrom level surface roughness. The metal could be coated with a protective coating or an enhanced mirror thin film stack, or it could be left uncoated and still provide high reflectivity. For solid reflaxicon systems requiring light transmission, SPDT of optical polymers are the best option. Calcium fluoride crystal material has also been diamond turned directly, and offers UV transmission to wavelengths below 200 nm. Acrylic provides the best surface finish through diamond turning, but other plastic materials may be suitable as well. Acrylic also is available with UV transmission to a wavelength of 300 nm.

For loosely toleranced versions of a nominal reflaxicon system, injection molding can be employed for both solid and hollow reflaxicon forms. The molding process and mold cavity designs will dictate the achievable reflaxicon designs. The mold inserts would be produced by SPDT. Because the surface irregularity of a molded part will not be as precise as that of a directly SPDT surface, molded reflaxicon systems would be useful in high volume, loose tolerance applications. This may include collection lenses for light sources such as Light Emitting Diodes (LEDs) and other non-imaging applications.

Finally, having attempted to fully describe some of the possibilities of our invention, it must be remembered that numerous other changes are also possible. Accordingly, it is to be understood that the embodiments of the invention herein described are merely illustrative of the application of the principles of the invention. Further, many of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims. Thus, reference herein to details of the illustrated embodiments is not intended to limit the scope of the claims, which themselves recite those features regarded as essential to the invention.

What is claimed is:

1. A reflaxicon system, comprising:
a first reflaxicon, which first reflaxicon includes a first reflaxicon central reflective surface, which surface is substantially cone shaped, and a first reflaxicon distal reflective surface, which first reflaxicon distal reflective surface is substantially truncated cone shaped;
a second reflaxicon located in spaced relationship to said first reflaxicon, which second reflaxicon includes a second reflaxicon central reflective surface, which surface is substantially cone shaped, and a second reflaxicon distal reflective surface, which second reflaxicon distal reflective surface is substantially truncated cone shaped;
wherein there is a light path via reflection between said first reflaxicon central reflective surface and said first reflaxicon distal reflective surface, between said first reflaxicon distal reflective surface and said second reflaxicon distal reflective surface, between said second reflaxicon distal reflective surface and said second reflaxicon central reflective surface such that a light beam can enter said reflaxicon system adjacent to and incident upon said first reflaxicon central, reflective surface, travel through said reflaxicon system via reflection off of said reflective surfaces, and exit said reflaxicon system exiting and adjacent said second reflaxicon central reflective surface; and
wherein at least one of:
said first reflaxicon central reflective surface and said first reflaxicon distal reflective surface are surfaces of a light transmitting solid such that light reflected between said central and distal surfaces takes place in said solid, said second reflaxicon central reflective surface and said second reflaxicon distal reflective surface are surfaces of a light transmitting solid such that light reflected between said central and distal surfaces takes place in said solid, said central reflective conical surfaces have apexes and the apex of one of said central reflective conical surfaces is directed towards the other of said central reflective conical surfaces, said central reflective conical surfaces have apexes and the apexes of both of said central reflective conical surfaces are directed towards the other of said central reflective conical surfaces, the same central cone serves as the first reflaxicon central reflective surface and the second reflaxicon central reflective surface, and at least one of said reflective surfaces is curved to achieve an optical effect.

2. The reflaxicon system of claim 1, wherein at least one of any said reflective surfaces that have been curved to achieve an optical effect have shapes and local slope angles such that the split optical axis is recombined on the exiting side to produce a substantially obscuration-free optical system with, at its limit, lossless transmission, any said reflective surfaces that have been curved to achieve an optical effect have shapes and local slope angles such that a specific percentage of the clear aperture can be centrally obscured for optical performance reasons, any said reflective surfaces that have been curved to achieve an optical effect have shapes and local slope angles such that an arbitrary central obscuration is permitted either with, or without, regard to optical performance reasons, any said light transmitting solid including said first reflaxicon central reflective surface and said first reflaxicon distal reflective surface includes an input surface adjacent said first reflaxicon central reflective surface where incident light enters said first reflaxicon, and any said light transmitting solid including said second reflaxicon central reflective surface and said second reflaxicon distal reflective surface includes an output surface adjacent said second reflaxicon central reflective surface where exiting light exits said second reflaxicon; and any said input and output surfaces comprise a curved surface.

3. The reflaxicon system of claim 2, wherein said output surface is curved to eliminate refraction of exiting light at the output surface.

4. The reflaxicon system of claim 2, wherein at least one of said first reflaxicon central reflective surface and said first reflaxicon distal reflective surface, and said second reflaxicon central reflective surface and said second reflaxicon distal reflective surface, are symmetrically disposed with respect to an optical axis.

5. The reflaxicon system of claim 1, wherein both of said reflaxicons are comprised of light transmitting solids, said solids are in immediate contact along juncture surfaces through which light is transmitted, and at least one of said juncture surfaces include interlocking surfaces that assist in maintaining the said axicons in proper spaced and axial alignment, and a housing for said reflaxicons is provided having internal features that assist in maintaining the said reflaxicon in proper spaced and axial alignment.

6. The reflaxicon system of claim 1, wherein at least some portion of a reflective surface of a said light transmitting solid is adjacent an air space and total internal reflection at said portion of said reflective surface, which forms the interface between said light transmitting solid and said air space, accounts for at least a part of said portion's reflectivity.

7. The reflaxicon system of claim 5, wherein any said housing includes an air space adjacent some portion of a distal reflective surface and total internal reflection at said portion of said distal reflective surface, which forms the interface between said light transmitting solid and said air space, accounts for at least a part of said portion's reflectivity.

8. The reflaxicon system of claim 6, wherein at least some portion of one of said reflective surfaces is reflectively coated in an area where incident light will not be totally internally reflected.

9. The reflaxicon system of claim 1, further including a housing for said reflaxicons having internal features that maintain the reflective surfaces of said reflaxicons in proper spaced and axial alignment.

10. The reflaxicon system of claim 9, said housing including a first portion holding said first reflaxicon distal reflective surface, a second portion holding said first reflaxicon central reflective surface and said second reflaxicon central reflective surface, and a third portion holding said second reflaxicon distal reflective surface.

11. The reflaxicon system of claim 10, wherein at least one of: said first reflaxicon distal reflective surface is formed by an interior surface of said first portion, said first reflaxicon central reflective surface and said second reflaxicon central reflective surface are formed by exterior surfaces of said second portion, and said second reflaxicon distal reflective surface is formed by an interior surface of said third portion.

12. The reflaxicon system of claim 7, wherein said reflaxicon system and housing are adapted for uses as a microscope objective.

13. The reflaxicon system of claim 2, wherein both of said reflaxicons are comprised of light transmitting solids, and both said input surface and said output surface are curved surfaces, said curved surfaces being adapted to refractively affect incident or exiting light, such that said curved surfaces adapt the reflaxicon to act as one of a relay, a microscope objective, and a beam expander.

14. The reflaxicon system of claim 11, wherein said reflaxicon system and housing are adapted for use as a microscope objective.

15. The reflaxicon system of claim 14, wherein one of said first reflaxicon and said second reflaxicon is a light transmitting solid and the other of said first reflaxicon and said second reflaxicon is not a light transmitting solid.

16. The reflaxicon system of claim 14, wherein at least one of light reflections between said first reflaxicon central reflective surface and said first reflaxicon distal reflective surface take place within a light transmitting solid, light reflections between said first reflaxicon distal reflective surface and said second reflaxicon distal reflective surface take place within a light transmitting solid, and light reflections between said second reflaxicon distal reflective surface and said second reflaxicon central reflective surface take place at least partly in air, and light reflections between said second reflaxicon central reflective surface and said second reflaxicon distal reflective surface take place within a light transmitting solid, light reflections between said second reflaxicon distal reflective surface and said first reflaxicon distal reflective surface take place within a light transmitting solid, and light reflections between said first reflaxicon distal reflective surface and said first reflaxicon central reflective surface take place at least partly in air.

17. The reflaxicon system of claim 1, wherein said reflaxicon system is adapted to cause at least one of: a chief ray entering the reflaxicon system to exit as a marginal ray, a marginal ray entering the reflaxicon system to exit as the chief ray, and a redistribution of incident light such that there is a concentration of exiting light around the chief ray or the marginal rays.

18. The reflaxicon system of claim 17, wherein said reflaxicon system is adapted to create a ring focus.

19. The reflaxicon system of claim 1, wherein at least one of a chief ray entering the reflaxicon system, marginal rays entering the reflaxicon system, and rays intermediate said chief and marginal rays, traverse the said reflaxicon system one of without reflection, via reflection of all reflective surfaces, and via reflection off of less than all reflective surfaces but not without reflection.

20. A method for constructing a reflaxicon system, comprising:
providing a first reflaxicon, which first reflaxicon includes a first reflaxicon central reflective surface, which surface is substantially cone shaped and symmetrically defines a first reflaxicon optical axis, and a first reflaxicon distal reflective surface, which first reflaxicon distal reflective surface is substantially truncated cone shaped, and is symmetrically disposed around said first reflaxicon optical axis;
providing a second reflaxicon, which second reflaxicon includes a second reflaxicon central reflective surface, which surface is substantially cone shaped and symmetrically defines a second reflaxicon optical axis, and a second reflaxicon distal reflective surface, which second reflaxicon distal reflective surface is substantially truncated cone shaped, and is symmetrically disposed around said second reflaxicon optical axis;
arranging said first and second reflaxicons in spaced relationship with their optical axes aligned such that there is a light path via reflection between said first reflaxicon central reflective surface and said first reflaxicon distal reflective surface, between said first reflaxicon distal reflective surface and said second reflaxicon distal reflective surface, between said second reflaxicon distal reflective surface and said second reflaxicon central reflective surface such that a light beam can enter said reflaxicon system adjacent to and incident upon said first reflaxicon central reflective surface, travel through said reflaxicon system via reflection off of said reflective surfaces, and exit said reflaxicon system exiting and adjacent said second reflaxicon central reflective surface;
providing that at least one of said reflective surfaces is further curved to achieve an optical effect; and
wherein at least one of:
said curved surfaces have shapes and local slope angles chosen to be such that the split optical axis is recombined on the exiting side to produce a substantially obscuration-free optical system with, at its limit, lossless transmission;
said curved surfaces have shapes and local slope angles chosen to be such that a specific percentage of the clear aperture can be centrally obscured for optical performance reasons; and said curved surfaces have shapes and local slope angles chosen to be such that an arbitrary central obscuration is permitted either with, or without, regard to optical performance reasons.

21. A reflaxicon system, comprising:
a first reflaxicon, which first reflaxicon includes a first reflaxicon central reflective surface, which surface is substantially cone shaped, and a first reflaxicon distal reflective surface, which first reflaxicon distal reflective surface is substantially truncated cone shaped;
a second reflaxicon located in spaced relationship to said first reflaxicon, which second reflaxicon includes a second reflaxicon central reflective surface, which surface is substantially cone shaped, and a second reflaxicon distal reflective surface, which second reflaxicon distal reflective surface is substantially truncated cone shaped;
wherein there is a light path via reflection between said first reflaxicon central reflective surface and said first reflaxicon distal reflective surface, between said first reflaxicon distal reflective surface and said second reflaxicon distal reflective surface, between said second reflaxicon distal reflective surface and said second reflaxicon central reflective surface such that a light beam can enter said reflaxicon system adjacent to and incident upon said first reflaxicon central reflective surface, travel through said reflaxicon system via reflection off of said reflective surfaces, and exit said reflaxicon system exiting and adjacent said second reflaxicon central reflective surface; and
wherein said reflaxicon system is enclosed in a housing and adapted for use as a microscope objective.

22. The reflaxicon system of claim 21,
wherein at least one of said first reflaxicon central reflective surface and said first reflaxicon distal reflective surface, and said second reflaxicon central reflective surface and said second reflaxicon distal reflective surface, are surfaces of a light transmitting solid such that light reflected between said central and distal surfaces takes place in said solid;
wherein any said light transmitting solid including said first reflaxicon central reflective surface and said first reflaxicon distal reflective surface includes an input surface adjacent said first reflaxicon central reflective surface where incident light enters said first reflaxicon, and any said light transmitting solid including said second reflaxicon central reflective surface and said second reflaxicon distal reflective surface includes an output surface adjacent said second reflaxicon central reflective surface where exiting light exits said second reflaxicon; and
wherein any said input and output surfaces comprise one of a planar surface and a curved surface.

23. The reflaxicon system of claim 22, wherein any said output surface is curved to eliminate refraction of exiting light at the output surface.

24. The reflaxicon system of claim 22, wherein at least one of said first reflaxicon central reflective surface and said first reflaxicon distal reflective surface, and said second reflaxicon central reflective surface and said second reflaxicon distal reflective surface, are symmetrically disposed with respect to an optical axis.

25. The reflaxicon system of claim 21, wherein both of said reflaxicons are comprised of light transmitting solids, said solids are in immediate contact along juncture surfaces through which light is transmitted, and at least one of: said juncture surfaces include interlocking surfaces that assist in maintaining the said axicons in proper spaced and axial alignment, and a housing for said reflaxicons is provided having internal features that assist in maintaining the said reflaxicons in proper spaced and axial alignment.

26. The reflaxicon system of claim 21, wherein at least some portion of a reflective surface of a said light transmitting solid is adjacent an air space and total internal reflection at said portion of said reflective surface, which forms the interface between said light transmitting solid and said air space, accounts for at least a part of said portion's reflectivity.

27. The reflaxicon system of claim 25, wherein any said housing includes an air space adjacent some portion of a distal reflective surface and total internal reflection at said portion of said distal reflective surface, which forms the interface between said light transmitting solid and said air space, accounts for at least a part of said portion's reflectivity.

28. The reflaxicon system of claim 26, wherein at least some portion of one of said reflective surfaces is reflectively coated in an area where incident light will not be totally internally reflected.

29. The reflaxicon system of claim 21, wherein said housing for said reflaxicons has internal features that maintain the reflective surfaces of said reflaxicons in proper spaced and axial alignment.

30. The reflaxicon system of claim 29, said housing including a first portion holding said first reflaxicon distal reflective surface, a second portion holding said first reflaxicon central reflective surface and said second reflaxicon central reflective surface, and a third portion holding said second reflaxicon distal reflective surface.

31. The reflaxicon system of claim 30, wherein at least one of said first reflaxicon distal reflective surface is formed by an interior surface of said first portion, said first reflaxicon central reflective surface and said second reflaxicon central reflective surface are formed by exterior surfaces of said second portion, and said second reflaxicon distal reflective surface is formed by an interior surface of said third portion.

32. The reflaxicon system of claim 21, wherein at least one of the apex of one of said central reflective conical surfaces is directed towards the other of said central reflective conical surfaces, and the apexes of both of said central reflective conical surfaces are directed towards the other of said central reflective conical surfaces.

33. The reflaxicon system of claim 22, wherein both of said reflaxicons are comprised of light transmitting solids, and both said input surface and said output surface are curved surfaces, said curved surfaces being adapted to refractively affect incident or exiting light, such that said curved surfaces adapt the reflaxicon to act as a microscope objective.

34. The reflaxicon system of claim 21, wherein the same central cone serves as the first reflaxicon central reflective surface and the second reflaxicon central reflective surface.

35. The reflaxicon system of claim 34, wherein one of said first reflaxicon and said second reflaxicon is a light transmitting solid and the other of said first reflaxicon and said second reflaxicon is not a light transmitting solid.

36. The reflaxicon system of claim 34, wherein at least one of:
light reflections between said first reflaxicon central reflective surface and said first reflaxicon distal reflective surface take place within a light transmitting solid, light reflections between said first reflaxicon distal reflective surface and said second reflaxicon distal reflective surface take place within a light transmitting solid, and light reflections between said second reflaxicon distal reflective surface and said second reflaxicon central reflective surface take place at least partly in air; and light reflections between said second reflaxicon central reflective surface and said second reflaxicon distal reflective surface take place within a light transmitting solid, light reflections between said second reflaxicon distal reflective surface and said first reflaxicon distal reflective surface take place within a light transmitting solid, and light reflections between said first reflaxicon distal reflective surface and said first reflaxicon central reflective surface take place at least partly in air.

37. A reflaxicon system, comprising:
a first reflaxicon, which first reflaxicon includes a first reflaxicon central reflective surface, which surface is substantially cone shaped, and a first reflaxicon distal reflective surface, which first reflaxicon distal reflective surface is substantially truncated cone shaped; and
wherein there is a light path via reflection between said first reflaxicon central reflective surface and said first reflaxicon distal reflective surface, such that a light beam can enter said reflaxicon system adjacent to and incident upon said first reflaxicon central reflective surface, travel through said reflaxicon system via reflection off of said reflective surfaces, and exit said reflaxicon system; and
wherein at least one of:
said first reflaxicon central reflective surface and said first reflaxicon distal reflective surface are surfaces of a light transmitting solid such that light reflected between said central and distal surfaces takes place in said solid, and
at least one of said reflective surfaces is curved to achieve an optical effect.

38. The reflaxicon system of claim 37,
wherein any said light transmitting solid including said first reflaxicon central reflective surface and said first reflaxicon distal reflective surface includes an input surface adjacent said first reflaxicon central reflective surface where incident light enters said first reflaxicon, and
wherein any said input surfaces comprises a curved surface.

39. The reflaxicon system of claim 38, wherein any said output surface is curved to eliminate refraction of exiting light at the output surface.

40. The reflaxicon system of claim 39, wherein: said first reflaxicon central reflective surface and said first reflaxicon distal reflective surface are symmetrically disposed with respect to an optical axis.

41. The reflaxicon system of claim 37, wherein at least some portion of a reflective surface of a said light transmitting solid is adjacent an air space and total internal reflection at said portion of said reflective surface, which forms the interface between said light transmitting solid and said air space, accounts for at least a part of said portion's reflectivity.

42. The reflaxicon system of claim 41, further comprising a housing for said reflaxicon system, which housing includes an air space adjacent some portion of a distal reflective surface, and total internal reflection at said portion of said distal reflective surface, which forms the interface between said light transmitting solid and said air space, accounts for at least a part of said portion's reflectivity.

43. The reflaxicon system of claim 41, wherein at least some portion of one of said reflective surfaces is reflectively coated in an area where incident light will not be totally internally reflected.

44. A method for constructing a reflaxicon system, comprising:
providing a first reflaxicon, which first reflaxicon includes a first reflaxicon central reflective surface, which surface is substantially cone shaped and symmetrically defines a first reflaxicon optical axis, and a first reflaxicon distal reflective surface, which first reflaxicon distal reflective surface is substantially truncated cone shaped, and is symmetrically disposed around said first reflaxicon optical axis;

arranging said first reflaxicon in spaced relationship with their optical axes aligned such that there is a light path via reflection between said first reflaxicon central reflective surface and said first reflaxicon distal reflective surface, which light path travels through said reflaxicon system via reflection off of said reflective surfaces, and exits said reflaxicon system;

providing that at least one of said reflective surfaces is further curved to achieve an optical effect; and wherein at least one of:

said curved surfaces have shapes and local slope angles chosen to be such that a specific percentage of the clear aperture can be centrally obscured for optical performance reasons; and said curved surfaces have shapes and local slope angles chosen to be such that an arbitrary central obscuration is permitted either with, or without, regard to optical performance reasons.

* * * * *